(12) United States Patent
Picker et al.

(10) Patent No.: US 8,538,420 B2
(45) Date of Patent: Sep. 17, 2013

(54) MULTI-BAND WIRELESS CELLULAR SYSTEM AND METHOD

(75) Inventors: Dan Picker, San Diego, CA (US); Ronen Vengosh, Menlo Park, CA (US)

(73) Assignee: PureWave Networks, Inc, Santa Clara, CA (US)

( * ) Notice: Subject to any disclaimer, the term of this patent is extended or adjusted under 35 U.S.C. 154(b) by 0 days.

(21) Appl. No.: 13/329,257

(22) Filed: Dec. 17, 2011

(65) Prior Publication Data

US 2013/0072186 A1 Mar. 21, 2013

Related U.S. Application Data

(60) Provisional application No. 61/536,103, filed on Sep. 19, 2011, provisional application No. 61/556,250, filed on Nov. 6, 2011.

(51) Int. Cl.
*H04W 4/00* (2009.01)

(52) U.S. Cl.
USPC ........ 455/432.1; 455/444; 455/454; 455/448; 455/449; 455/552.1

(58) Field of Classification Search
USPC ............ 455/444, 432.1, 454, 448, 449, 552.1
See application file for complete search history.

(56) References Cited

U.S. PATENT DOCUMENTS

| | | | | |
|---|---|---|---|---|
| 4,989,230 A * | 1/1991 | Gillig et al. | ................. | 455/552.1 |
| 5,021,801 A | 6/1991 | Smith et al. | | |
| 5,535,259 A * | 7/1996 | Dent et al. | ................. | 455/452.1 |
| 5,913,177 A | 6/1999 | Meredith et al. | | |
| 6,101,176 A * | 8/2000 | Honkasalo et al. | ........... | 370/335 |
| 6,151,310 A | 11/2000 | Dent | | |
| 6,405,048 B1 * | 6/2002 | Haartsen | ........................ | 455/464 |
| 7,590,422 B1 * | 9/2009 | Chow et al. | ................... | 455/436 |
| 7,881,722 B2 * | 2/2011 | Gunnarsson et al. | ......... | 455/450 |
| 8,126,496 B2 * | 2/2012 | Brisebois et al. | ............. | 455/522 |
| 8,311,005 B2 * | 11/2012 | Sundaresan et al. | .......... | 370/329 |
| 2002/0102976 A1 * | 8/2002 | Newbury et al. | ............... | 455/436 |
| 2003/0109257 A1 * | 6/2003 | Nilsson et al. | ................ | 455/436 |
| 2003/0171124 A1 * | 9/2003 | Kataoka | ........................ | 455/453 |
| 2004/0185884 A1 * | 9/2004 | Marin et al. | ................... | 455/466 |
| 2005/0070288 A1 * | 3/2005 | Belkin et al. | ................... | 455/439 |
| 2006/0234777 A1 | 10/2006 | Vannithamby et al. | | |
| 2006/0270411 A1 * | 11/2006 | Grayson | ........................ | 455/444 |
| 2007/0008929 A1 * | 1/2007 | Lee et al. | ....................... | 370/331 |
| 2007/0178839 A1 | 8/2007 | Rezvani et al. | | |
| 2007/0238460 A1 * | 10/2007 | Yamen | .......................... | 455/436 |
| 2007/0259664 A1 * | 11/2007 | Blakstad Poolsaar et al. | ........................... | 455/435.2 |
| 2007/0297385 A1 * | 12/2007 | Ishizu et al. | ................... | 370/342 |
| 2008/0113666 A1 * | 5/2008 | Monte et al. | ................... | 455/427 |
| 2008/0305801 A1 * | 12/2008 | Burgess et al. | ............... | 455/444 |
| 2009/0040972 A1 * | 2/2009 | Robson et al. | ................. | 370/329 |

(Continued)

FOREIGN PATENT DOCUMENTS

WO WO 2010/111839 A1 * 10/2010
WO WO2010111839 A1 10/2010

*Primary Examiner* — Kamran Afshar
*Assistant Examiner* — Mong-Thuy Tran

(57) ABSTRACT

A single wireless cellular system provides cellular service using first and second radio bands, belonging to two different Operators, respectively. The first radio band is located higher in frequency than the second radio band. Subscriber Stations, associated with either of the Operators, or with a third Operator, may perform partial roaming between the two bands within the single wireless cellular system, in order to optimize data throughputs, coverage, or both.

25 Claims, 59 Drawing Sheets

(56) References Cited

U.S. PATENT DOCUMENTS

| | | | |
|---|---|---|---|
| 2009/0047931 A1* | 2/2009 | Nanda et al. | 455/411 |
| 2009/0059854 A1* | 3/2009 | Nishio et al. | 370/329 |
| 2009/0170472 A1 | 7/2009 | Chapin et al. | |
| 2010/0130212 A1* | 5/2010 | So et al. | 455/444 |
| 2010/0167728 A1* | 7/2010 | Venkitaraman et al. | 455/434 |
| 2010/0167740 A1* | 7/2010 | Vakil et al. | 455/436 |
| 2011/0105132 A1* | 5/2011 | Vasudevan et al. | 455/448 |
| 2012/0039226 A1* | 2/2012 | Yang et al. | 370/311 |
| 2012/0046057 A1* | 2/2012 | Pesola et al. | 455/509 |
| 2012/0052793 A1* | 3/2012 | Brisebois et al. | 455/1 |
| 2012/0207133 A1* | 8/2012 | Wong | 370/331 |
| 2013/0084855 A1* | 4/2013 | Ekici et al. | 455/432.1 |

* cited by examiner

MULTI-BAND WIRELESS CELLULAR SYSTEM AND METHOD

CROSS-REFERENCE TO RELATED APPLICATIONS

This application claims the benefit of U.S. Provisional Patent Application No. 61/536,103, filed Sep. 19, 2011. This application also claims the benefit of U.S. Provisional Patent Application No. 61/556,250, filed Nov. 6, 2011.

BACKGROUND

Wireless cellular systems, like all radio systems, operate at a particular radio frequency band. Given equivalent investments in infrastructure in low-band systems and high-band systems, propagation distance will tend to be greater at lower frequency bands. Hence, radio coverage area will tend to be greater in the lower frequency bands. Coverage in many geographic areas will overlap, at least part, between a cellular system operating at a low frequency band, and a cellular system operating at a high frequency band. Moving Subscriber Stations that are in communication with the high-band system may lose communication with such high-band system, while maintaining communication with the low-band system. However, the high-band and low-band systems in a specific geographic area are typically operated by different Operators, and these two Operators may also differ from the Operator with whom a moving subscriber station is associated (defined below as the subscriber station's "own operator"). In order to maximize coverage area for moving Subscriber Stations, to enhance system utilization, and to achieve other advantages, there is needed a system and a method for providing continuous coverage to Subscriber Stations moving into and out of the radio coverage areas of a high-band operator and a low-band operator.

BRIEF SUMMARY

One embodiment is a system operative to optimize usage of wireless Base Stations servicing at least two wireless cellular Operators. In one form of such a system, there are N wireless Base Stations deployed across a predetermined geographic area. The wireless Base Stations provide at least partial wireless cellular coverage in the predetermined geographic area, using a first radio band belonging to a first Operator, wherein at least K of the N wireless Base Stations also provide wireless cellular coverage using a second radio band belonging to a second Operator, wherein K is less than N, and wherein the first radio band is located higher in frequency than the second radio band. The system is configured to enhance a level of wireless cellular service provided by the first Operator, by causing Subscriber Stations associated with the first Operator to roam into the second radio band when out of range of the first radio band.

One embodiment is a method for supporting two-band wireless cellular operation by a single wireless cellular system servicing at least two Operators. In one particular form of such embodiment, a wireless cellular system, operating via a first radio band belonging to a first Operator associated with a Subscriber Station, fails to deliver a predetermined level of wireless cellular service to the Subscriber Station. The wireless cellular system locates a second radio band belonging to a second Operator, operative to deliver the predetermined level of wireless cellular service to the Subscriber Station. The wireless cellular system, operating via the second radio band, delivers that at least predetermined level of service to the Subscriber station.

One embodiment is a method for enhancing wireless cellular service provided by at least two Operators. In one particular form of such embodiment, a wireless cellular system generates simultaneously a first Radio Access Network (RAN), and a second RAN, using a first and second radio bands, respectively, wherein said radio bands belong to first and second Operators, respectively, and the first radio band is located higher in frequency than the second radio band. The wireless cellular system enhances a level of wireless cellular service provided by the first Operator, by causing Subscriber Stations associated with the first Operator and which are poorly covered by the first RAN, to perform partial roaming from the first RAN to the second RAN.

One embodiment is a method for optimizing placement of wireless Base Stations servicing at least two Operators. In one particular form of such embodiment, a wireless cellular system operators N wireless Base Stations deployed across a predetermined geographic area, the wireless Base Stations operative to provide wireless cellular coverage in the predetermined area using a first radio band belonging to a first Operator. Also, the wireless cellular system provides wireless cellular coverage in the predetermined geographic area, using a second radio band belonging to a second Operator, by configuring K wireless Base Stations out of the N wireless Base Stations, to cover wirelessly the predetermined geographic area using a second radio band belonging to a second Operator, wherein K is less than N, and the first radio band is located higher in frequency than the second radio band. Also, the wireless cellular system enhances a level of wireless cellular service provided by the first Operator, by causing Subscriber Stations associated with the first Operator to roam into the second radio band when out of range of the first radio band.

BRIEF DESCRIPTION OF THE DRAWINGS

Embodiments of the present invention are herein described, by way of example only, with reference to the accompanying drawings. With specific reference now to the drawings, it is stressed that the particulars shown are by way of example and for purposes of illustrative discussion of embodiments of the present invention only, and are presented in order to provide what is believed to be the most useful and readily understood description of the principles and conceptual aspects of embodiments of the present invention. In this regard, no attempt is made to show structural details of embodiments in more detail than is necessary for a fundamental understanding of the invention. In the drawings.

DETAILED DESCRIPTION

Figure 1A:
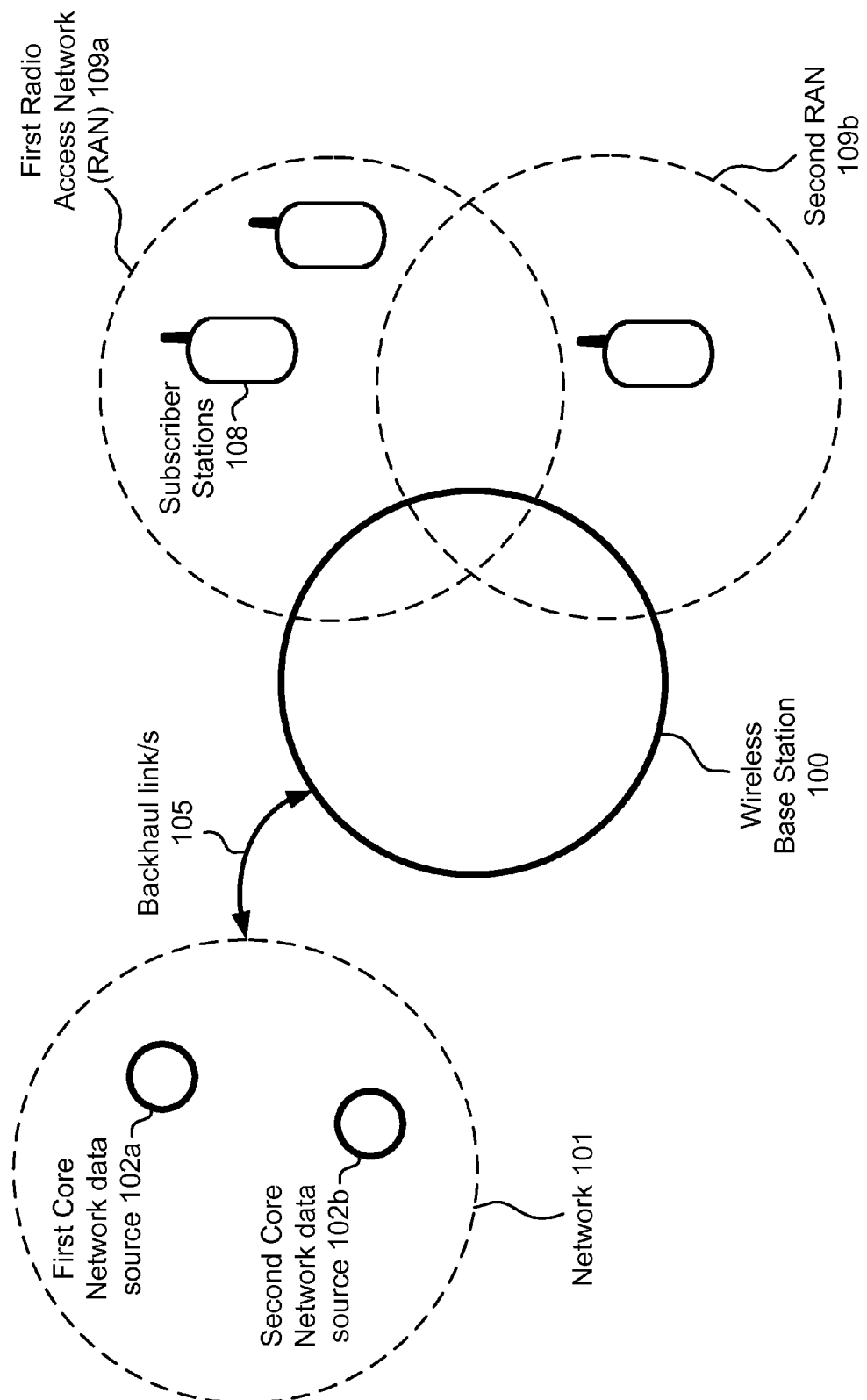
FIG. 1A illustrates one embodiment of components comprising a system of a wireless Base Station (BS) communicating with multiple Radio Access Networks (RANs)

A number of terms are used in the presentation of embodiments, among which are the following:

An "Analog-Digital Interface", also called a "Two-Way Analog-Digital Interface", is a converter between two components of a system that converts analog signals to digital signals, or digital signals to analog signals, depending on the need. One example of an Analog-Digital Interface is an interface between a Baseband subsystem and radio transceiver chain. Each of the components listed may have additional sub-components, some of which are listed in the embodiments described herein. Different configurations of the components are described in some of the embodiments. Different communication paths and processes between components are described in some of the embodiments. The components, sub-components, configurations, and communication paths and processes, presented herein, are intended to present only some of the embodiments, and are illustrative only.

"Associated with" describes the relationship between a Subscriber Station and an Operator. The Subscriber Station is owned by a consumer or other third party customer. This consumer or customer subscribes to a particular Operator to receive wireless service. The Subscriber Station is said to be "associated with" the Operator to whom the consumer or customer has subscribed for this particular Subscriber Station. The Subscriber Station is not owned by the Operator, and so it is not stated, indeed it would be incorrect to state, that the Subscriber Station is "owned by" the Operator. The term used herein is "associated with".

A "wireless Base Station", or "Base Station", is a collection of hardware and software that communicates to Subscriber Stations over the RAN, using any of a variety of standardized or proprietary protocols, in TDD or FDD mode, and on one or more channels of wireless Access Spectrum. If a Base Station can operate on multiple radio channels of spectrum that are considered to be relatively closely separated from each other (or even adjacent to one another), the Base Station is referred to as a "multi-carrier Base Station". If a multi-carrier Base Station can operate on widely separated frequencies then it may additionally be referred to as a "multi-band Base Station". A "multi-mode Base Station" is a Base Station that supports multiple wireless protocols. Non-limiting examples of such wireless protocols include LTE and WiFi. The wireless Base Station generates the RAN.

By industry convention, and also herein, "Base Station" includes not just the hardware processing device in which radio processing and baseband processing occurs, but also the radio transceiver chain connected to such hardware processing device, and the antennas in physical connection with the radio transceiver chain. In some embodiments, each such hardware processing device is connected to one radio transceiver chain, and each radio transceiver chain is connected to one antenna. However, it is possible to have multiple antennas connected to one radio transceiver chain. It is also possible to have one antenna in connection with multiple radio transceiver chains, in which case there would be a power combiner that combines the signals from the radio transceiver chains into the one antenna. It is also possible to split one radio transceiver chain to multiple hardware processing devices, so that the multiple hardware devices feed signals to the radio transceiver chain. It is also possible to have one hardware processing device connected to multiple radio transceiver chains. All of the possible configurations discussed herein come within the term "Base Station".

A "Baseband Processor" (BP) is a device, typically a chip or a part of a chip in a Base Station, that manages and performs signal processing and radio control functions. Modulation and demodulation of communication signals are typically performed by a BP. A BP is a component of a wireless Base Station, and also typically appears in advanced consumer wireless equipment, although the configuration of the BP device will vary depending on many factors, including, among others, whether it will function in the wireless BS or in the consumer wireless device.

A "Core Network" is a part of a mobile communication network that provides various services to Subscriber Stations who are connected to the Core Network via a RAN. An Operator's Core Network is the aggregation point of data to and from multiple Base Stations, and typically includes equipment and software for subscriber authentication, monitoring, metering, billing, control, and overall administration of the network. A Base Station communicates to the Core Network over the Base Station's "backhaul interface", which may be either wired or wireless.

A "downlink communication" or "downlink path" is communication from a network to remote stations. One example is communication from Core Network data sources to Subscriber Stations. Conversely, "uplink communication" or "uplink path" is communication from remote stations to a network. One example is communication from Subscriber Stations to Core Network data sources.

A "Gateway device" is a device through which passes all traffic to and from a set of Base Stations. Most Operators organize their networks with one or more Gateway devices, although strictly speaking, this is not essential. Communication between a Base Station and a Gateway is generally governed by a standard or proprietary protocol, and will usually vary to some degree among Operators, even when all the Operators are using a technical standards-based approach. This protocol, whether standard for multiple Operators or proprietary to one Operator, is almost always carried "in-band". "In-band" means that the communication protocol between a Base Station and a Gateway is logically multiplexed with the data itself on the Base Station's backhaul interface.

Some Base Stations also communicate directly with one another, rather than through a Gateway. One typical reason for such communication is to exchange time-sensitive information related to inter-Base Station subscriber handover operations. Another typical reason for such communication is to help implement or improve load-balancing between Base Stations. Inter-Base Station communication, for whatever reason it is implemented, is typically governed by standard or proprietary protocols, and such protocols, even if standard, will usually vary among Operators and even among manufacturers of infrastructure equipment.

A "network Tunnel" or "Tunnel" is a network communications channel between two networks. It is used to transport another network protocol by encapsulation of the protocol packets. Tunnels are often used for connecting two disjoint networks that lack a native routing path to each other, via an underlying routable protocol across an intermediate transport network. In IP tunneling, every IP packet, including addressing information of its source and destination IP networks, is encapsulated within another packet format native to the transit network. At the borders between the source network and the transit network, as well as the transit network and the destination network, Gateways are used that establish the end-points of the IP tunnel across the transit network. IP Tunnels are logical, rather than physical, interfaces. Examples of network Tunnels are IP Tunnels and Generic Routing Encapsulation (GRE).

An "Operator" is a company or other entity that provides wireless services to subscribers. An Operator may operate regionally, nation-wide, or even globally. An Operator may utilize either Licensed or Unlicensed spectrum, or a combination of both. Each portion of an Operator's spectrum may be deployed as half-duplex, time division duplex (TDD), full-duplex, or frequency division duplex (FDD). An Operator's spectral allocation may be uniform across its service area, or may vary from region to region. If multiple Operators function in different and non-overlapping geographic regions, the same frequency range may be allocated to different Operators in different regions.

A "host Operator" is an Operator which has been requested to allow access to a Subscriber Station not associated with that Operator. The host Operator allows the Subscriber Station to access the host Operator's RAN, and the host Operator then provides either roaming or partial roaming services to the Subscriber Station. The phrase "first Operator" also means the "host Operator", where "first Operator" contrasts with "second Operator" and/or "other Operator", neither of which is the "host Operator".

An operator with whom a Subscriber Station is associated is also called the Subscriber Station's "own Operator".

A "Radio Access Network" (RAN) is a part of a mobile communication system that implements radio access technology. In a wireless communication system, the RAN sits between the Subscriber Station and the Core Network. The RAN is generated by the wireless BS.

"Roaming" is a situation where a Subscriber Station associated with a particular Operator, encounters a wireless network belonging to a different Operator, where frequency encountered by the Subscriber Station is supported by the different Operator, and the Subscriber Station receives service from that different Operator.

"Partial Roaming", as used herein, is roaming, except that a Subscriber Station makes connection with the wireless BS of a host Operator, as in ordinary roaming, but unlike ordinary roaming, connections for this Subscriber Station do not travel over the network infrastructure of the host Operator, but only on the network infrastructure of the Subscriber Station's own Operator, and the Subscriber station does not have data communication with the data source of the first Operator, but has data communication only with the data source of the second Operator. In this way, the Subscriber Station, which is associated with the second Operator, uses wireless spectrum resources of the first Operator, but does not use network resources of the first Operator during the course of data communication between a data source and the Subscriber Station.

A "roaming Subscriber Station", or "roaming SS", is a Subscriber Station that is in communicative connection with a wireless Base Station (BS) of a host Operator, which is an Operator with whom the roaming Subscriber Station is not associated. This may be ordinary roaming, in which the SS is connected via the BS on a network infrastructure of the host Operator to a data source of the host Operator, or partial roaming, in which the SS is connected via the BS on a network infrastructure of another Operator (the SS's own Operator) to the Core Network data source of the other Operator.

"Subscriber Stations" are wireless communication devices used by customers of an Operator. Such Subscriber Stations are typically, but not necessarily and not always, locked to all or a subset of the radio frequencies licensed to that Operator. Some possible non-limiting categories of Subscriber Stations include handsets, dongles, customer premises equipment (CPE) for wireless communication, and hot spot equipment for wireless communication. Non-limiting examples of handsets include cellular telephones of all kinds, PDAs, wireless data devices, pages, and other consumer radio equipment.

"Wireless Access Spectrum" is the radio spectrum on which a RAN operates, and hence the radio spectrum is utilized by both Subscriber Stations to access the wireless Base Station and the wireless Base Station to communicate with Subscriber Stations.

There is a need for a practical way by which various Operators may collaborate and share infrastructure equipment and other resources. The sharing of resources by multiple Operators can be advantageous to all parties. Devices, systems, and methods are presented herein for a wireless Base Station (BS) capable of substantially simultaneously providing service to subscribers of multiple Operators. Depending upon the particular deployment requirements or equipment capabilities, each Operator may be operating on the same or different frequencies. If frequencies are different, they may be adjacent, closely separated, or widely separated. The wireless BS will distinguish and logically separate and route the traffic between each Subscriber Station and the Core Network providing service to that Subscriber Station. The wireless BS may support different logical or different physical interfaces between the wireless BS and each Operator.

Where limited wireless or processing resources are shared among the Operators, load balancing techniques and methods may be deployed to govern the allocation of these resources. Non-limiting examples of shared resources include Subscriber Stations of multiple Operators sharing the same frequency, Operators sharing one or more radio chains, shared antennas, shared transmit power, shared backhaul, and one or more processors which process communication for multiple Operators. For these and other cases of shared resource utilization, load balancing techniques and methods may apply within a single Base Station, or among a group of Base Stations on a network. Such load balancing techniques and methods may be distributed, or controlled centrally, or have dynamically shifting control as the needs change. Considerations in the selection and deployment of load balancing techniques may be technical or financial or both. Such considerations may affect the load balancing algorithms and decisions. As an example of a consideration that is both technical and financial, one Operator may be heavily loaded at a particular time while another Operator may be lightly loaded at the same time. By agreement between the Operators, the heavily loaded Operator may off-load capacity by utilizing resources normally allocated to the lightly loaded Operator. An agreement like this would typically include financial compensation from the heavily loaded Operator to the lightly loaded Operator, and such compensation may be cost per usage, fixed cost per period or by event, variable cost depending on such factors as time and relative loading, or on any other basis agreed upon by the Operators.

Many possible embodiments of a multi-Operator BS may be imagined. A very few non-limiting examples include the following:

(1) According to one multi-Operator BS scenario, at least Subscriber Devices of one Operator in the geographic region of interest may not have the capability to roam onto another Operator's licensed spectrum. This could be because such Subscriber Devices of a first Operator do not contain the appropriate frequency support to function on the frequency of the second Operator, or because such Subscriber Devices are locked onto the first Operator's network, or because such Subscriber Devices are locked out of the other Operator's network.

In one embodiment, this problem may be handled by either a multi-carrier or multi-band Base Station, with one or more distinct carriers allocated to each Operator. The relative amounts of spectrum allocated among the Operators could impact the allocation of carriers among the Operators. In this embodiment, the Base Station may support multiple logical core-network interfaces, one for each Operator, and the interfaces may be either standardized or customized for each different Operator. Communication may be multiplexed onto the same physical backhaul interface, with each message or even each packet labeled with unique routing information to connect the message or packet to its corresponding core network gateway. However, and alternatively, each logical interface may utilize different physical interfaces.

In this embodiment, load balancing of shared Base Station resources between Operators may apply to any or all of antennas, transmit power, backhaul resources, and processing power.

(2) According to a second multi-Operator BS scenario, at least some subscriber devices of a first Operator in the geographic region of interest do have the capability to roam onto another Operator's licensed spectrum.

For this case, in one embodiment such roaming may be handled by either a multi-carrier or a multi-band Base Station, depending at least in part upon the specific spectrum allocations to the Operators. A Subscriber Station may, by default, connect to its own Operator's spectrum, in which case communication will be effected as explained in scenario (1) above. However, in the event that the Operator's network is heavily loaded, prior art architecture does not allow the Base Station to direct the subscriber to a more lightly loaded Operator's spectrum. In one embodiment, instead of the typical prior art roaming situation, by which a local Operator's network handles the session and later bills the subscriber's Operator per pre-agreement, the Base Station will support multiple logical Core Network interfaces, one such interface for each Operator, and the traffic from the redirected subscriber will be routed to its own Operator's core interface. (Such interface may be logical or physical, or dynamically shifting between logical and physical.) The Base Station, in combination with relevant Core Network elements, can keep track of this shared usage so that the proper financial compensation may be made between Operators.

In this embodiment, load balancing of shared Base Station resources between Operators may apply to spectrum, antennas, transmit power, backhaul resources, processing power, or any of the other elements previously identified as possible shared resources.

(3) According to a third multi-Operator BS scenario, the Base Station and at least some Subscriber Stations in a geographic region of interest, support one or more ranges of unlicensed spectrum or protocols. Various non-limiting examples of an unlicensed protocol are Bluetooth, WiFi, and WiMAX, but there are many such examples of technologies. Often, but not exclusively, such technologies may operate at relatively low power, or may operate in one of the non-licensed bands such as 915 MHz, 2.45 Gz, or 5.8 GHz. This third scenario can occur in combination with either scenario (1) or scenario (2), above.

In one embodiment of a scenario with unlicensed spectrum or protocols, usage on unlicensed spectrum is handled by either a multi-carrier Base Station or multi-band Base Station (depending upon the specific spectrum allocations of the Operators). If multiple protocols are involved, in which a second Operator employs a protocol not used by a first Operator, a multi-mode Base Station may support the different protocols.

In this third scenario of unlicensed spectrum or protocols, licensed operation is handled as in the case of either scenarios (1) or (2) above. At the same time, unlicensed spectrum may be budgeted or simply shared among the participating Operators, or the unlicensed spectrum may be used as a resource that is allocated and charged for by the owner of the Base Station. The owner of the Base Station may be one of the Operators, or may be a separate party. In any event, traffic allocated to unlicensed spectrum supported by a Base Station will again be routed to and from the Operator's Core Network. Such routing may be logical or physical or dynamically changing between logical and physical.

The general architecture for some of the embodiments described herein call for a number of components, including: (1) Subscriber Stations, (2) RANs, (3) antenna and radio chains, the latter including power amplifiers, low noise amplifiers, and one or more transceivers. Each radio chain may operate on the same channel (single-carrier capability), different but closely separated channels (multi-carrier capability), or widely separated channels (multi-band capability), (4) a Baseband subsystem, (5) a network processor that may implement, among other things, an array of logical core network interfaces, each of which multiplex into one or more physical backhaul interfaces, (6) backhaul links, and (7) core Networks.

Each of the components listed may have additional sub-components, some of which are listed in the embodiments described herein. Different configurations of the components are described in some of the embodiments. Different communication paths and processes between components are described in some of the embodiments. The components, sub-components, configurations, and communication paths and processes, presented herein, are intended to present only some of the embodiments, and are illustrative only.

FIG. 1A illustrates one embodiment of components in a system. In FIG. 1A, there is a wireless Base Station (BS) 100, which is connected by one or more Backhaul links 105 to an IP Network 101. Said IP Network includes two or more sources of data. Here, the sources are data that come from a first Core Network, First Core Network data source 102a, and from a second Core Network, Second Core Network data source 102b. The wireless BS 100 also generates two or more Random Access Networks (RANs), here First RAN 109a and Second RAN 109b. Each RAN network communicates with one or more Subscriber Stations. In FIG. 1A, Subscriber Stations 108 are communicatively connected to First RAN 109a.

Figure 1B:
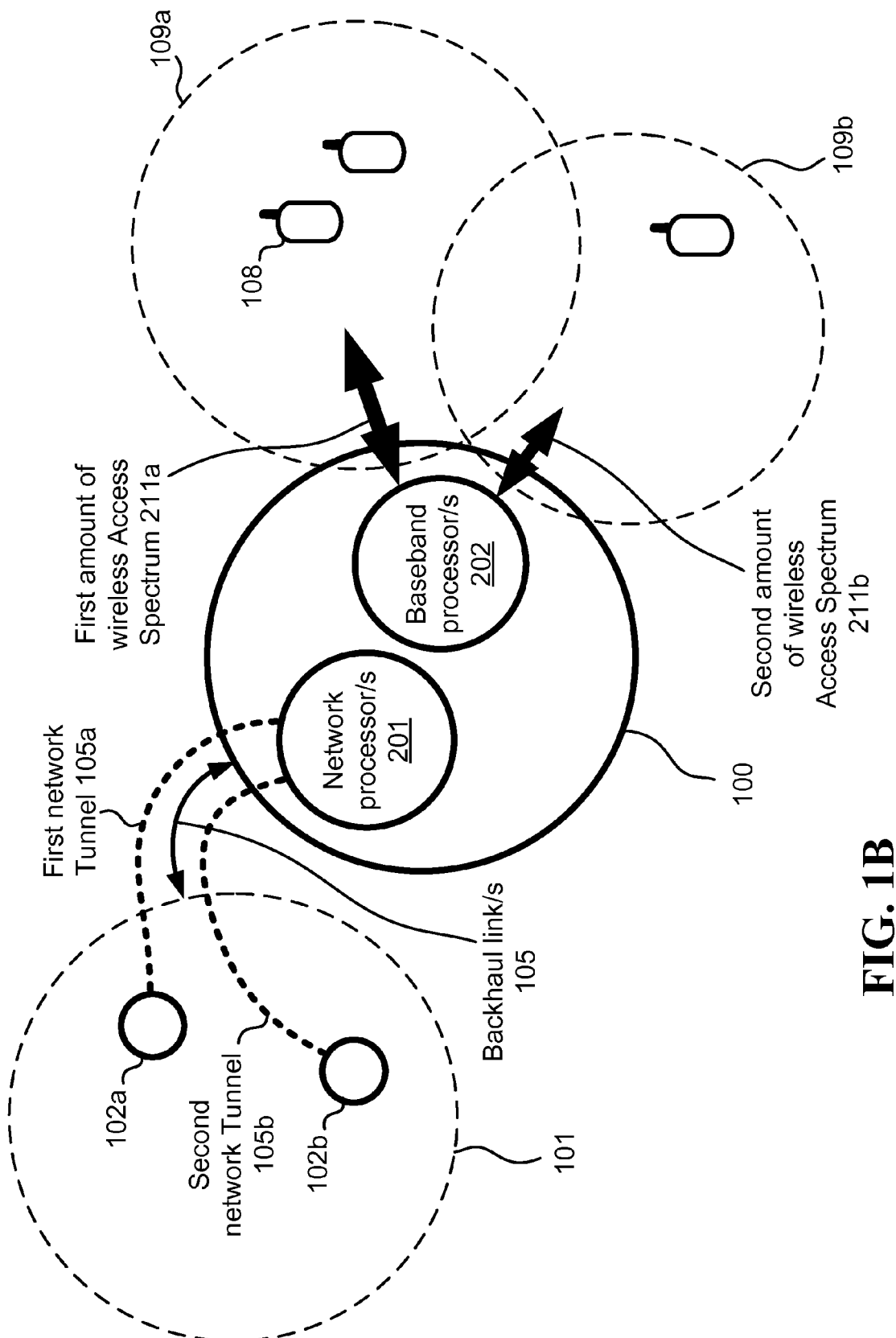
FIG. 1B illustrates one embodiment of components comprising a system of a wireless Base Station (BS) communicating with multiple Radio Access Networks (RANs), in which there is illustrated the allocation of spectrum to the RANs, components of wireless BS, and communication paths between the wireless BS and the Core Networks.

FIG. 1B illustrates one embodiment of components in a system. The wireless BS 100 includes at least two major components, which are one or more Network processors 201 that communicate with IP Network 101 via the physical Backhaul links 105. The Backhaul links 105 are physical links, which may be microwave, cable, or any other communication medium. Backhaul links 105 provide a path for the logical links, which are the network Tunnels connecting Core Network data sources with the Network processors 102. In FIG. 1B, First network Tunnel 105a communicatively connects First Core Network data source 102a with Network processors 201, and Second Core Network data source 102b with Network processors 201. The Network processors 201 are also communicatively connected with Baseband processor/s 202, which generate using one or more radio chains, and one or more radio antennas, the RANs, here First RAN 109a and Second RAN 109b. In the initial setup of the embodiment illustrated in FIG. 1B, a First amount of wireless Access Spectrum 211a has been allocated to First RAN 109a, and a Second amount of wireless Access Spectrum has been allocated to Second RAN 109b.

Figure 1C:
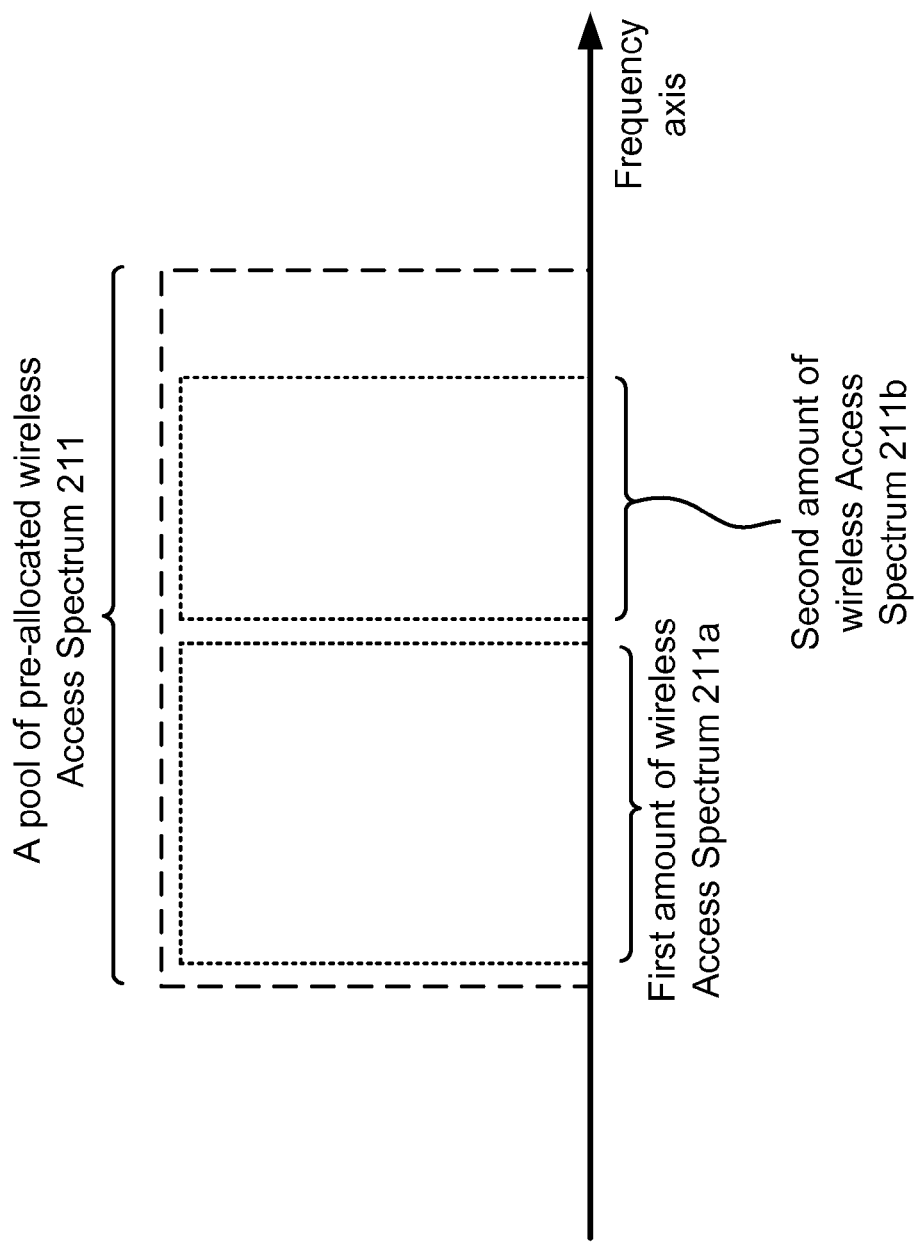
FIG. 1C illustrates one embodiment a possible allocation of wireless Access Spectrum to two Radio Access Networks (RANs)

FIG. 1C illustrates one embodiment a possible allocation of wireless Access Spectrum to two Radio Access Networks (RANs). A certain amount of wireless Access Spectrum has been pre-allocated 211 to a wireless BS and to an associated plurality of two or more RANs. Further, all or part of the pre-allocated wireless Access Spectrum 211 may be dynamically allocated as a First amount of wireless Access Spectrum 211a to a First RAN 109a or as a Second amount of wireless Access Spectrum 211b to a Second RAN 109b. In FIG. 1C, not all of 211 has been allocated to 211a or 211b. Rather, there is a small amount of frequency between 211a and 211b that has not been allocated, possibly as a guard frequency against inter-Operator interference. Similarly, there is a small amount of frequency on the left of 211a, in a frequency lower than the lowest boundary of the 211a range, that has not been allocated, and this, too, might be a guard frequency. In addition, there is a greater amount of frequency at a higher range than 211b, still within 211 but to the right of 211b, that has not been allocated, and this may be partially a guard frequency, possibly a reserve, possibly allocated to a different Operator or a different purpose. The main point is that the total frequency in 211a and 211b combined may equal, or maybe less than, but may not exceed, the pre-allocated wireless Access Spectrum 211. Further, the allocation of 211 between 211a and 211b may be done at the same time as the allocation of 211, or may be done after the allocation of 211, but in all cases, no frequency is allocated among Operators until there has been or is simultaneously a pool of pre-allocated wireless Access Spectrum 211.

Figure 2:
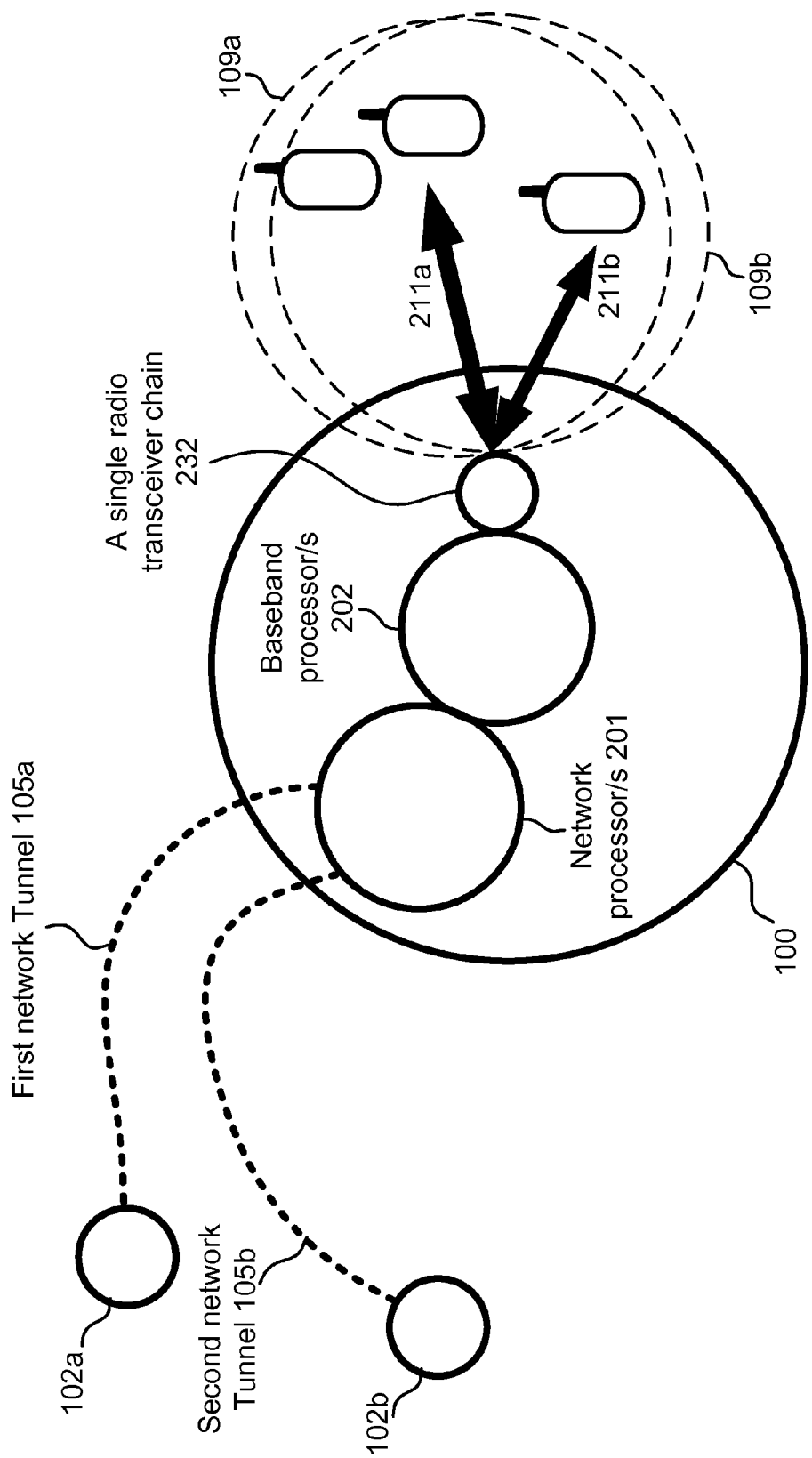
FIG. 2 illustrates one embodiment of components comprising a system of a wireless Base Station (BS) communicating with multiple Radio Access Networks (RANs), in which two RANs are sharing one radio transceiver chain.

FIG. 2 illustrates one embodiment of components comprising a system of a wireless Base Station (BS) 100 generating multiple Radio Access Networks (RANs) 109a & 109b, in which the two RANs 109a & 109b are sharing one radio transceiver chain 232. In FIG. 2, there is a single radio transceiver chain 232 utilized by the Baseband processors 202 to generate the RANs 109a and 109b. As described previously, a First amount of wireless Access Spectrum 211*a* has been allocated to First RAN 109*a*, and a Second amount of wireless Access Spectrum 211*b* has been allocated to Second RAN 109*b*. Since both 109*a* and 109*b* communicate with wireless BS 100 through the same radio transceiver chain 232, the coverage areas of 109*a* and 109*b* will be either the same or very similar.

Figure 3:
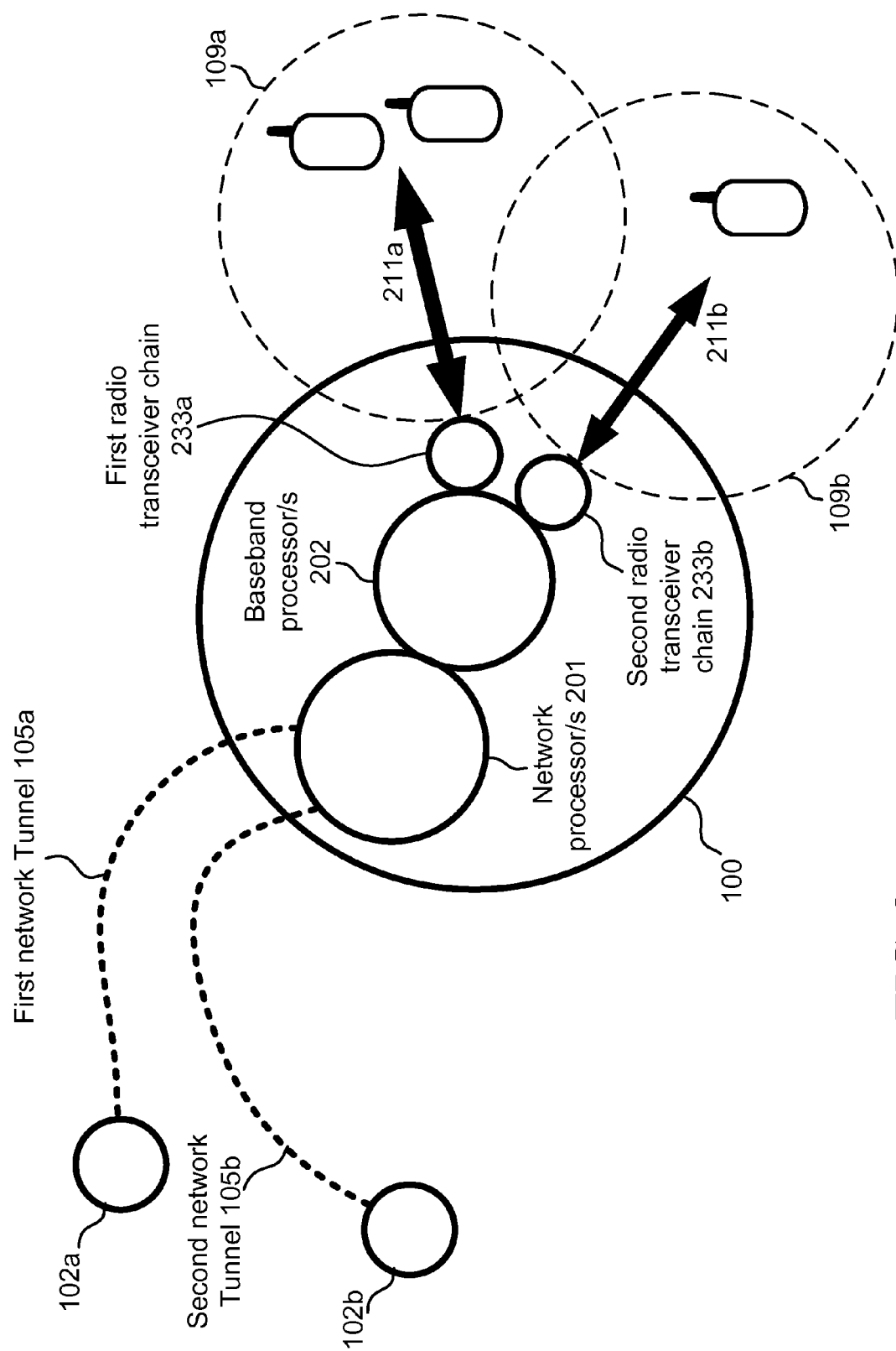
FIG. 3 illustrates one embodiment of components comprising a system of a wireless Base Station (BS) communicating with multiple Radio Access Networks (RANs), in which each of two RANs has its own radio transceiver chain, and the RANs share other resources within the wireless BS.

FIG. 3 illustrates one embodiment of components comprising a system of a wireless Base Station (BS) 100 communicating with multiple Radio Access Networks (RANs) 109*a* & 109*b*, in which each of two RANs 109*a* & 109*b* has its own radio transceiver chain 233*a* & 233*b*, and the RANs 109*a* & 109*b* share other resources within the wireless BS 100. FIG. 3 has the same components has does FIG. 2, except FIG. 3 does not have a single radio transceiver chain 232. Rather, FIG. 3 has two transceiver chains, which are First radio transceiver chain 233*a* that is utilized by Baseband processor/s 202 to generate First RAN 109*a* using the First amount of wireless Access Spectrum 211*a*, and Second radio transceiver chain 233*b* that is utilized by Base Band processor/s 202 to generate Second RAN 109*b* using the Second amount of wireless Access Spectrum 211*b*. As shown in FIG. 3, since each RAN has its own radio transceiver chains, the RAN coverage areas are essentially independent. The coverage areas might not overlap at all, might overlap slightly as is shown in FIG. 3, or might overlap substantially as is shown in FIG. 2.

In one embodiment, there is a wireless Base Station (BS) 100 system to directly communicate with Core Network data sources 102*a* & 102*b*, on one side, and to directly provide multiple corresponding Radio Access Networks (RANs) 109*a* & 109*b* on the other side. This system may include a network processor 201 operative to maintain at least two network Tunnels 105*a* & 105*b* extending directly to at least two corresponding Core Network data sources 102*a* & 102*b*, one or more Baseband processors 202 operative to create at least two RANs 109*a* & 109*b* substantially simultaneously, and one or more radio transceiver chains 232, 233*a* and 233*b*, operative to accommodate the one or more Baseband processors 202 in creating the at least two RANs 109*a* & 109*b* substantially simultaneously. In one configuration of the embodiment, the system may be configured to split dynamically a pool of pre-allocated wireless Access Spectrum 211 between the at least two RANs 109*a* & 109*b* according to one or more criteria, reconfigure the at least one Baseband Processor 202 to maintain the at least two RANs 109*a* & 109*b* according to the split of spectrum between the two RANs 109*a* & 109*b*, and operate the at least two RANs 109*a* & 109*b* using data communicated with the corresponding at least two Core Network data sources 102*a* & 102*b* via the corresponding at least two network Tunnels 105*a* & 105*b*.

In an alternative embodiment of the embodiment just described, at least one of the criteria used to split dynamically a pool of pre-allocated wireless Access Spectrum 211 between at least two RANs 109*a* & 109*b*, is based on dynamic data rate requirements of at least one of the Core Network data sources 102*a* & 102*b*.

In another alternative embodiment of the embodiment described above, at least one of the criteria used to split dynamically a pool of pre-allocated wireless Access Spectrum 211 between at least two RANs 109*a* & 109*b*, is based on measuring data rates over at least one of the RANs 109*a* & 109*b*.

In another alternative embodiment of the embodiment just described, at least one of the criteria used to split dynamically a pool of pre-allocated wireless Access Spectrum 211 between at least two RANs 109*a* & 109*b*, is based on measuring data rates over at least one of the network Tunnels 105*a* & 105*b*.

In another alternative embodiment of the embodiment just described, the dynamic split of pre-allocated wireless Access Spectrum creates at least two amounts of wireless Access Spectrum, and each amount of wireless Access Spectrum after the split is allocated to one of the at least two RANs.

In one possible configuration of the alternative embodiment in which each amount of wireless Access Spectrum after the split is allocated to one of the at least two RANs, at least one of the amounts of wireless Access Spectrum 211*a* & 211*b* allocated to the RANs 109*a* & 109*b*, is smaller than the other amount of allocated wireless Access Spectrum 211*a* & 211*b*. In other words, either 211*a* is greater than 211*b*, or 211*b* is greater than 211*a*, but in this embodiment 211*a* is not equal to 211*b*.

Figure 4:
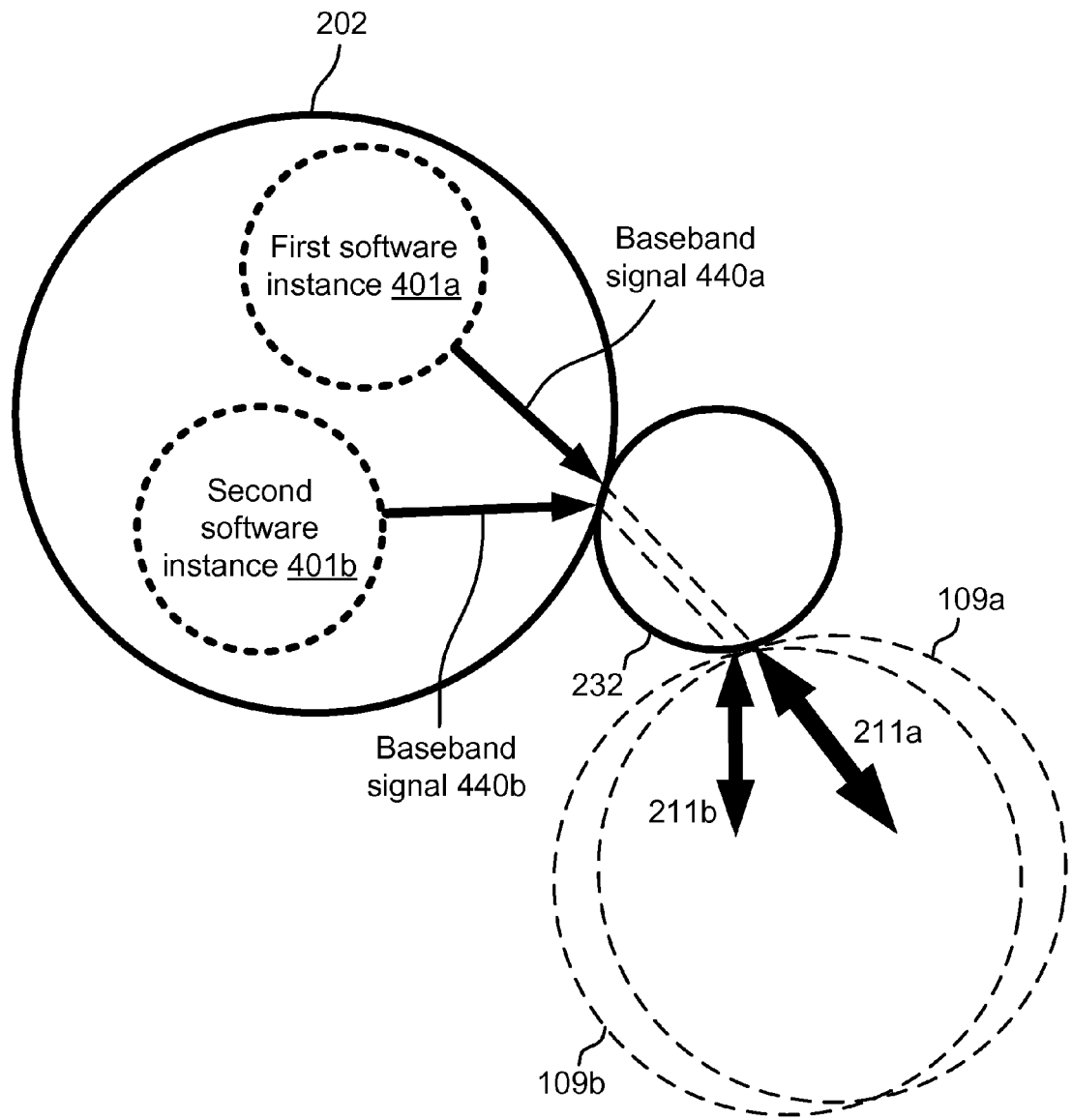
FIG. 4 illustrates one embodiment of a Baseband Processor included as part of a system of a wireless Base Station (BS) communicating with multiple Radio Access Networks (RANs), in which two RANs are sharing one radio transceiver chain.

FIG. 4 illustrates one embodiment of a Baseband processor 202 in a system of a wireless Base Station (BS) 100 generating multiple Radio Access Networks (RANs) 109*a* & 109*b*, in which two RANs 109*a* & 109*b* are sharing one radio transceiver chain 232. In this embodiment, the Baseband processor 202 may be reconfigured by programming. In one possible embodiment, reconfiguration by programming is implemented by two software changes, termed in FIG. 4, "First software instance 401*a*" and "Second software instance 401*b*". In 401*a*, the software instance is associated with First RAN 109*a*, and 401*a* creates Baseband signal 440*a*, having a bandwidth that is dynamically related to the amount of wireless Access Spectrum 211*a* allocated to First RAN 109*a*. Correspondingly, in 401*b* the software instance is associated with Second RAN 109*b*, and 401*b* creates Baseband signal 440*b*, having a bandwidth that is dynamically related to the amount of wireless Access Spectrum 211*b* allocated to First RAN 109*b*. In FIG. 4, the relative bandwidth between 109*a* and 109*b* are intimately related, since the total amount of bandwidth allocated to two RANs 109*a* & 109*b* cannot exceed the initial allocation 211. Similarly, the relative bandwidths of the Baseband signals 440*a* & 440*b* are intimately related, since the two bandwidths together cannot exceed the allocation 211.

Figure 5:
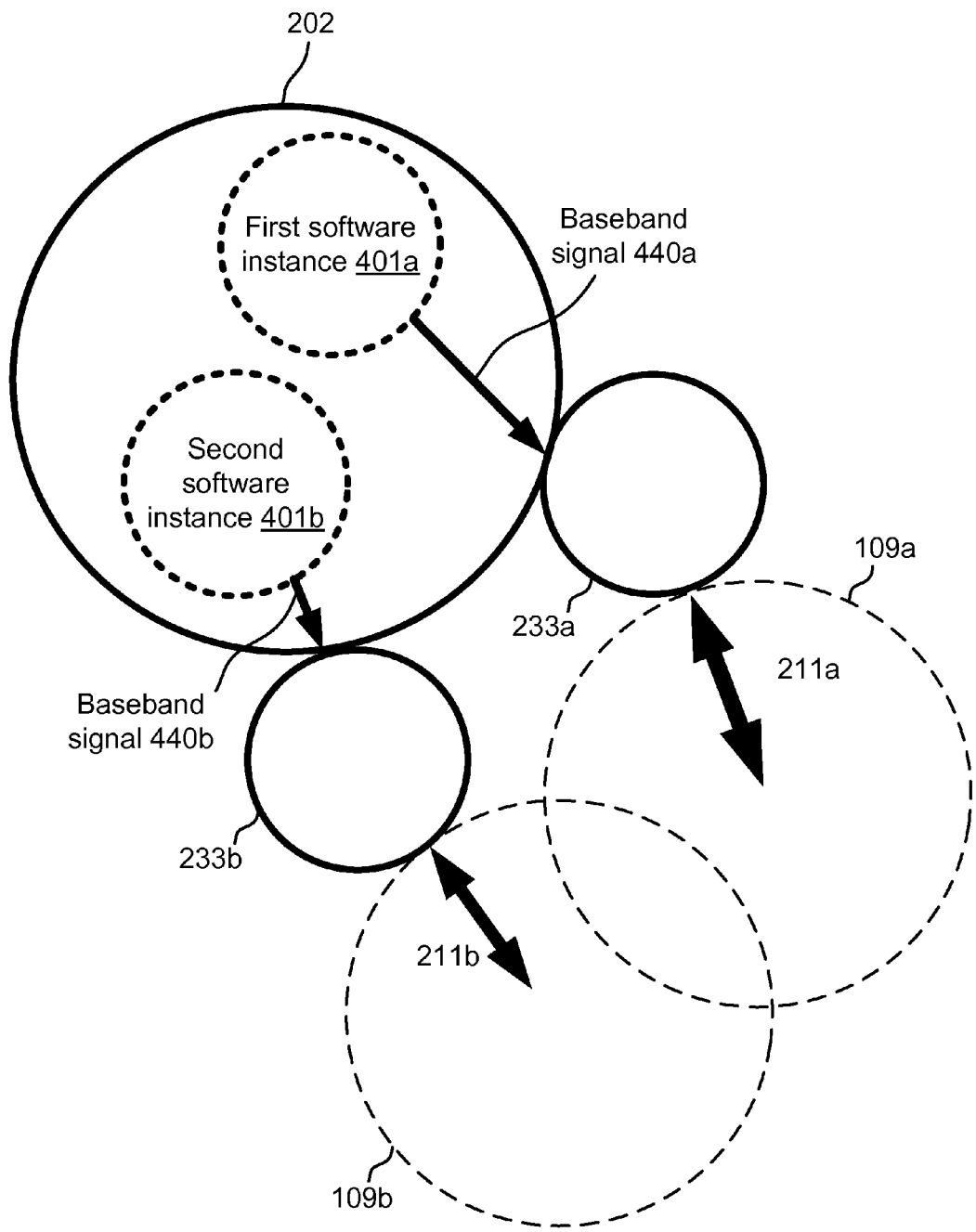
FIG. 5 illustrates one embodiment of a Baseband Processor included as part of a system of a wireless Base Station (BS) communicating with multiple Radio Access Networks (RANs), in which each of two RANs has its own radio transceiver chain, and the RANs share other resources within the wireless BS.

FIG. 5 illustrates one embodiment of a Baseband processor 202 in a system of a wireless Base Station (BS) 100 generating multiple Radio Access Networks (RANs) 109*a* & 109*b*, in which each of two RANs 109*a* & 109*b* has its own radio transceiver chain, 233*a* for First RAN 109*a* and 233*b* for Second RAN 109*b*. In this embodiment, First software instance 401*a* creates Baseband signal 440*a*, which the Baseband processor 202 communicates to the First radio transceiver chain 233*a*, which communicates Baseband signal 440*a* over allocated frequency 211*a* to First RAN 109*a*. Also in this embodiment, Second software instance 401*b* creates Baseband signal 440*b*, which the Baseband processor 202 communicates to the Second radio transceiver chain 233*b*, which communicates Baseband signal 440*b* over allocated frequency 211*b* to Second RAN 109*b*.

Figure 6A:
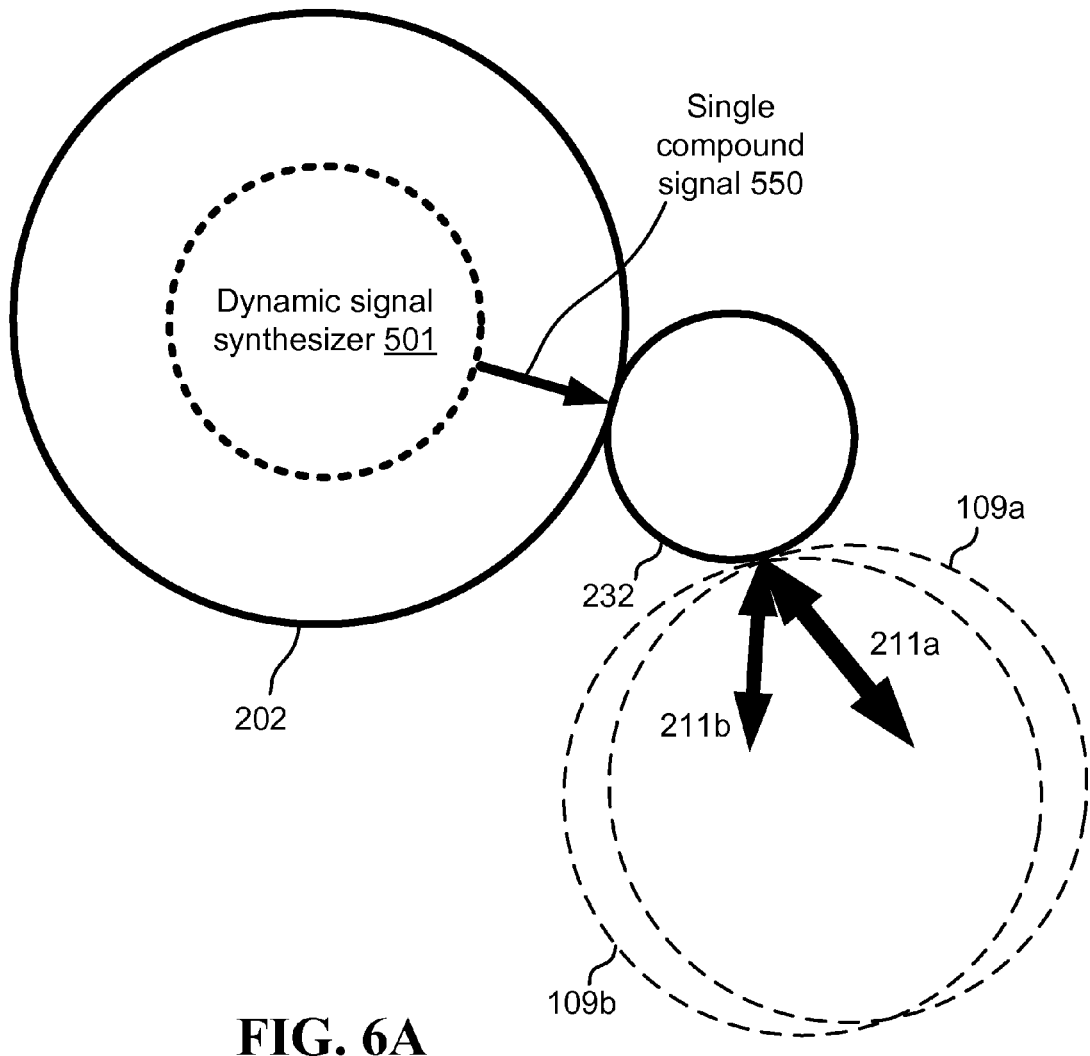
FIG. 6A illustrates one embodiment of the functioning of a Baseband Processor in a system comprising a wireless Base Station (BS) communicating with multiple Radio Access Networks (RANs), in which two RANs are sharing one radio transceiver chain.
Figure 6B:
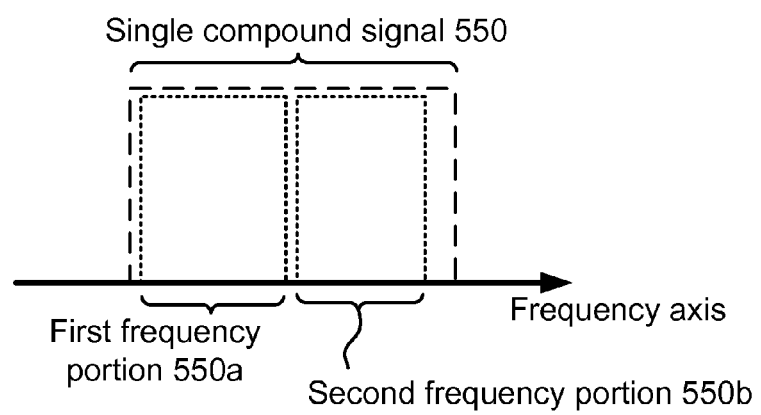
FIG. 6B illustrates one embodiment of a possible allocation of wireless Access Spectrum to two Radio Access Networks (RANs), in which the allocation can be changed dynamically.

FIG. 6A and FIG. 6B illustrate one embodiment of a Baseband processor 202 in a system of a wireless Base Station (BS) 100 generating multiple Radio Access Networks (RANs) 109*a* & 109*b*, in which two RANs 109*a* & 109*b* are sharing one radio transceiver chain 232. In this embodiment, the Baseband processor 202 may be reconfigured by programming. In one possible embodiment, reconfiguration by programming is implemented by a Dynamic signal synthesizer 501 dynamically synthesizing a single compound signal 550 on Baseband processor 202. The single compound signal 550 has at least two frequency portions 550*a* & 550*b*, in which each frequency portion is associated with one of the RANs 109a & 109b, and each of the frequency portions 550a & 550b is dynamically related to the amount of wireless Access Spectrum allocated 211a & 211b to the RANs 109a & 109b. As an example, 501 creates compound signal 550 which includes a frequency portion 550a associated with First RAN 109a and dynamically related to First amount of wireless Access Spectrum 211a, and which also includes frequency portion 550b associated with Second RAN 109b and dynamically related to Second amount of wireless Access Spectrum 211b. In this sample embodiment, the dynamic signal synthesizer 501 fills the role formerly filled by First software instance 401a and Second software instance 401b in FIG. 4. Since FIG. 6A, like FIG. 4, has only one radio transceiver chain 232, the coverage areas of 109a and 109b overlap substantially.

In one embodiment, a wireless Base Station (BS) 100 system directly communicates with Core Network data sources 102a & 102b, on one side, and directly provides multiple corresponding Radio Access Networks (RANs) 109a & 109b on the other side, in which different amounts of wireless Access Spectrum have been allocated to RANs 109a & 109b, the following additional elements may appear. (1) The at least one Baseband processor 202 is programmable to an alternative configuration. (2) The Baseband processor 202 is reconfigured by at least two software instances 401a & 401b on Baseband processor 202, each software instance associated with at least one of the RANs 109a & 109b, and each software instance 401a & 401b creates a Baseband signal 440a & 440b that has a bandwidth dynamically related to the amount of wireless Access Spectrum allocated to the RAN by the dynamic split of wireless Access Spectrum. For example, 401a creates 440a that is dynamically related to 211a, and 401b creates 440b that is dynamically related to 211b. In one alternative embodiment of this embodiment, there is only one radio transceiver chain 232, and the Baseband signals 440a & 440b of the least two software instances 401a & 401b are fed to this one chain 232, thereby generating the at least two RANs 109a & 109b, each RAN driven by one of the corresponding Baseband signals 109a by 401a and 109b by 401b. In a different alternative embodiment of the embodiment described above, there are two radio transceiver chains 233a & 233b rather than the one chain 232, so 401a creates 440a that is fed to transceiver chain 233a which then generates First RAN 109a, and 401b creates 440b that is fed to transceiver chain 233b which then generates Second RAN 109b.

In one embodiment a wireless Base Station (BS) 100 system directly communicates with Core Network data sources 102a & 102b, on one side, and directly provides multiple corresponding Radio Access Networks (RANs) 109a & 109b on the other side, in which different amounts of wireless Access Spectrum have been allocated to RANs 109a & 109b, the following additional elements may appear. (1) The at least one Baseband processor 202 is programmable to an alternative configuration. (2) The Baseband processor 202 is reconfigured by a dynamic signal synthesizer 501 dynamically synthesizing a single compound signal 550 on the at least one Baseband processor 202, the compound signal 550 having at least two frequency portions 550a & 550b, each of the two frequency portions 550a & 550b associated with one of the at least two RANs 109a & 109B, and each of the frequency portions 550a & 550b is dynamically related to the amount of wireless Access Spectrum 550a & 550b allocated for each of the RANs 109a & 109b by the frequency split.

In an alternative embodiment of the embodiment described immediately above, there is a single radio transceiver chain 232, and the single compound signal 550 is fed to the single radio transceiver chain 232, thereby generating the at least two RANs 109a & 109b, in which each is driven by one of the two frequency portions 550a & 550b. In one possible configuration of this alternative embodiment of the embodiment described immediately above, each of the two RANs is either WiMAX or LTE, the single compound signal 550 is an Orthogonal Frequency Division Multiple Access (OFDMA) signal, and the two frequency portions 550a & 550b comprises at least one unique sub-channel of the OFDMA signal.

Figure 7:
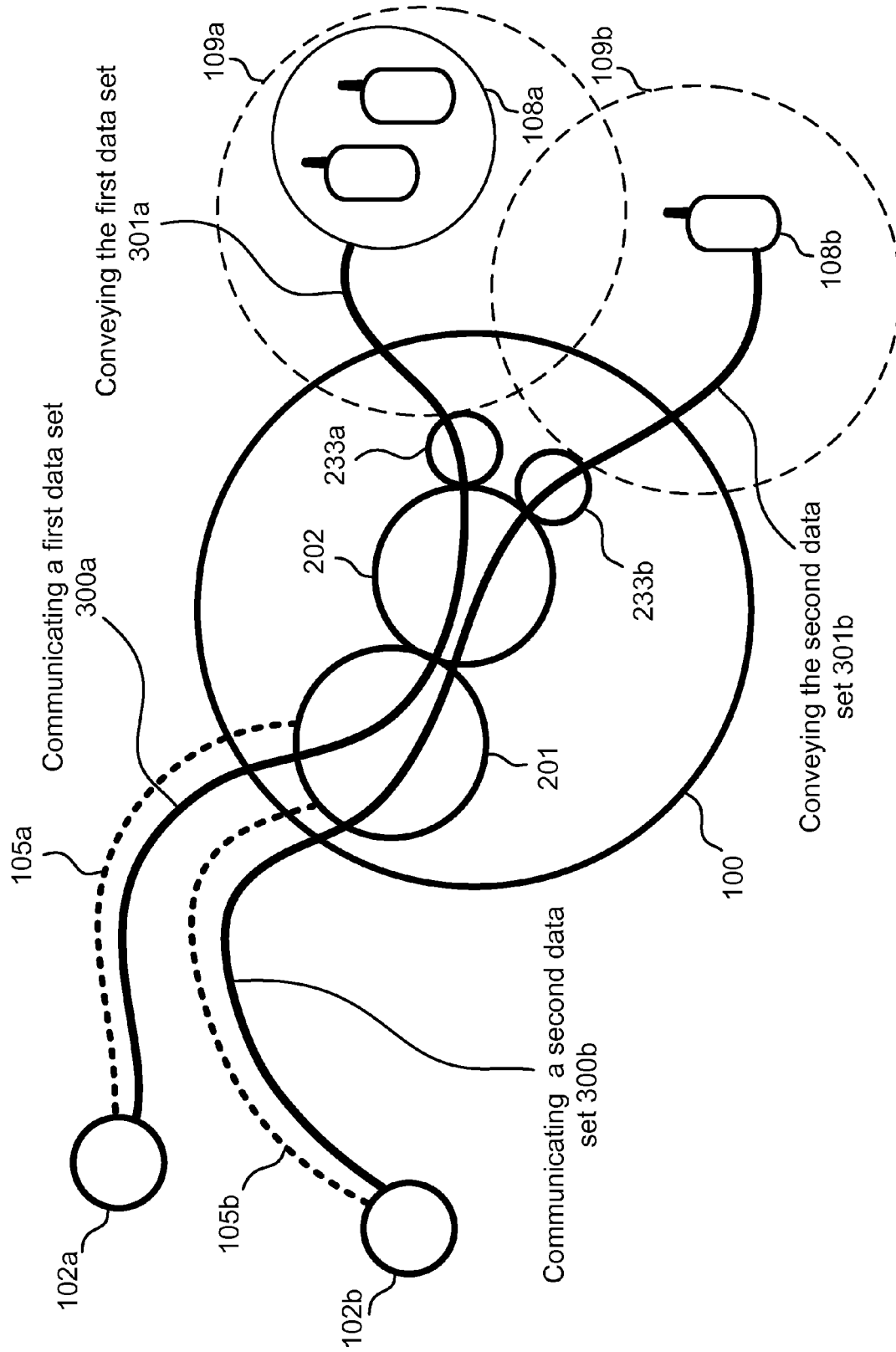
FIG. 7 illustrates one embodiment of components comprising a system of a wireless Base Station (BS) communicating with multiple Radio Access Networks (RANs), in which is also illustrated one possible configuration of a communication link from multiple Core Networks through a wireless Base Station to multiple RANs and then to multiple sets of wireless Subscriber Stations.

FIG. 7 illustrates one embodiment of components comprising a system communicating between Core Network data sources 102a & 102b and wireless Subscriber Stations 108a & 108b, in which a first data set is communicated 300a from First Core Network data source 102a via the logical link network Tunnel 105a to wireless Base Station 100, then to Network processor 201, Baseband processor 202, and First radio transceiver chain 233a, after which the first data set is conveyed 301a by the wireless BS 10 to the First RAN 109a, and finally to a first set of wireless Subscriber Stations 108a. Also in this embodiment, a second data set is communicated 300b from Second Core Network data source 102b via the logical link network Tunnel 105b to wireless Base Station 100, then to Network processor 201, Baseband processor 202, and Second radio transceiver chain 233b, after which the second data set is conveyed 301b by the wireless BS 10 to the Second RAN 109a, and finally to a second set of wireless Subscriber Stations 108b. FIG. 7 illustrates the communication path for both data sets between each Core Network and its corresponding set of wireless Subscriber Stations. Of course, data traffic travels in both direction, from Core Networks through various stages to wireless Subscriber Stations, and from wireless Subscriber Stations through various stages to Core Networks.

Figure 8:
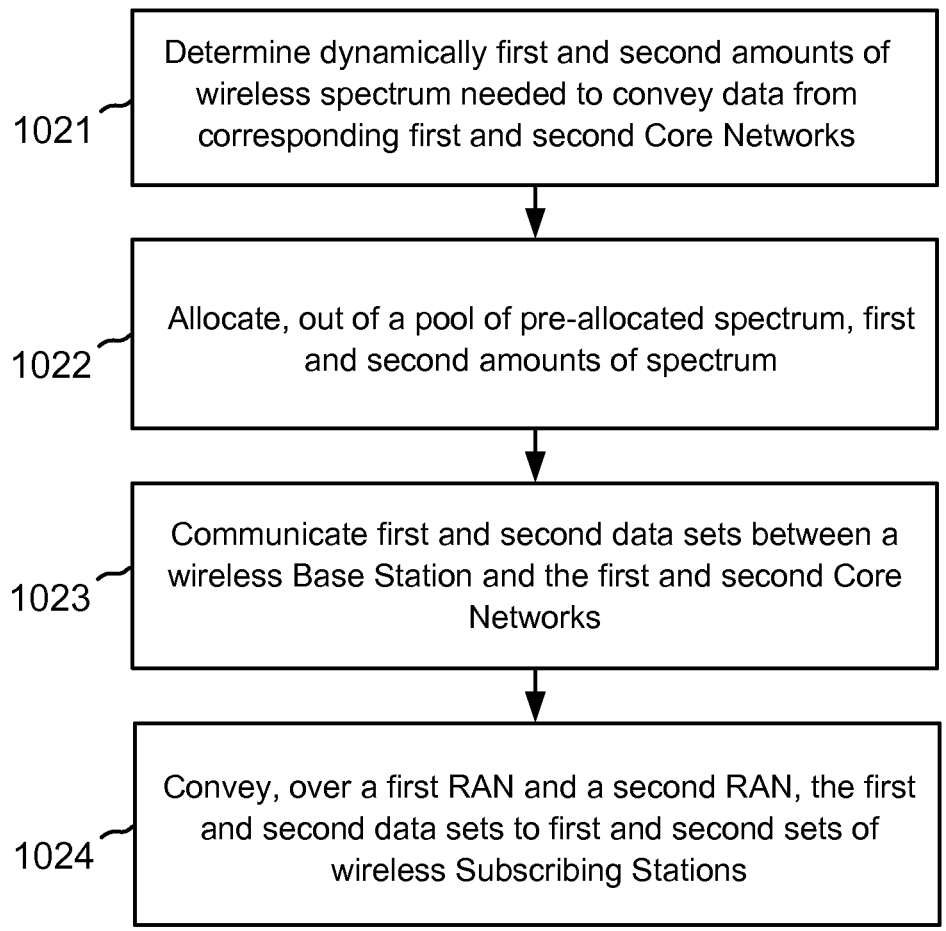
FIG. 8 illustrates one embodiment of the elements of a method for dynamically generating a plurality of Radio Access Networks (RAN) by a single wireless Station (BS)

FIG. 8 is a flow diagram illustrating one method for dynamically generating a plurality of Radio Access Networks (RAN) 109a & 109b by a single wireless Base Station (BS) 100. In step 1021, determining dynamically first and second amounts of wireless Access Spectrum 211a & 211b needed by a wireless BS 100 to wirelessly convey data from a first and a second corresponding Core Network data sources 102a & 102b. In step 1022, allocating the first and the second amounts of wireless Access Spectrum 211a & 211b, out of a pool of pre-allocated wireless Access Spectrum 211 belonging to the wireless BS 100, to a first RAN 109a and a second RAN 109b, respectively, of the wireless BS respectively. In step 1023, the wireless BS 100 communicating first and second data sets 300a & 300b, with the first and the second Core Network data sources 102A & 102b, respectively. In step 1024, the wireless BS 100 conveying the first and second data sets 301a & 301b, over the first and second RANs 109a & 109b, respectively, to first and second sets of wireless Subscriber Stations (SS) 108a & 108b, respectively.

In a first possible implementation of the method just described, further determining from time to time the first and the second amounts of wireless Access Spectrum 211a & 211b needed by the wireless BS 100 to wirelessly convey 301a & 301b the first and second data sets, and allocating from time to time the first and the second amounts of wireless Access Spectrum 211a & 211b.

In this first possible implementation of the method just described, one further possible implementation is that the first and second amounts of wireless Access Spectrum 211a & 211b are determined, at least in part, from first and second data rates associated with communicating the data sets 300a & 300b. In this further possible implementation of the possible implementation of the method just described, the first and second data rates associated with communicating the data sets 300a & 300b may be measured, or such data rates may be determined by querying the first and second Core Network data sources 102a & 102b, or it is possible to both measure the data rates and also query the Core Network data sources 102a & 102b.

In this first possible implementation of the method described above for dynamically generating a plurality of RANs 109a & 109b by a single wireless BS 100, a second further possible implementation is that at some point in time most of the pool of pre-allocated wireless Access Spectrum 211 is allocated as the first amount of wireless Access Spectrum 211a to the First RAN 109a. In this same second further possible implementation, in an additional embodiment, at some point in time most of the pool of pre-allocated wireless Access Spectrum 211 is allocated as the second amount of wireless Access Spectrum 211b to the Second RAN 109b.

In a second possible implementation of the method described above, further communicating the first and second data sets 300a & 300b with the first and second Core Network data sources 102a & 102b, using at least one Backhaul link 105.

In this second possible implementation of the method described above, one further possible implementation is that at least one Backhaul link 105 comprises a first network Tunnel 105a, connecting the first Core Network data source 102a with the wireless BS 100, and connecting the second Core Network data source 102b with the wireless BS 100.

In this same further possible implementation to the second possible implementation of the method described above, an additional embodiment would include the following additional elements. (1) The wireless BS 100 is an integrated Pico-Base Station. (2) The network Tunnels 105a & 105b are directly connected to the first and second Core Network data sources 102a & 102b, respectively. (3) The Pico-Base Station substantially does not require a dedicated infrastructure to facilitate connectivity with the Core Network data sources 102a & 102b other than the at least one Backhaul link 105 and an IP Network 101 comprising the Core Network data sources 102a & 102b.

In this second possible implementation of the method described above, a second further possible implementation is that the first data set is communicated 300a over a first Backhaul link, and a second data set is communicated over a second Backhaul link. Element 105 shows a single Backhaul link, but in this further possible implementation, there are two Backhaul links, although that is not illustrated in the Figures.

In a third possible implementation of the method described above, the First Core Network data source 102a belongs to a first Operator, the Second Core Network data source 102b belongs to a second Operator, the First RAN 109a is associated with an identity of the first Operator, and the Second RAN 109b is associated with an identity of the second Operator. The phrase "associated with" in this sense means that the name of the network is broadcast within the RAN transmissions. Hence, a First RAN 109a associated with the identity of the first Operator will broadcast, together with the RAN 109a transmissions, the name of the first network or the other identity of the first network chosen by the first Operator. Similarly, a Second RAN 109b associated with the identity of the second Operator will broadcast, together with the RAN 109b transmissions, the name of the second network or the other identity of the second network chosen by the second Operator.

Figure 9:
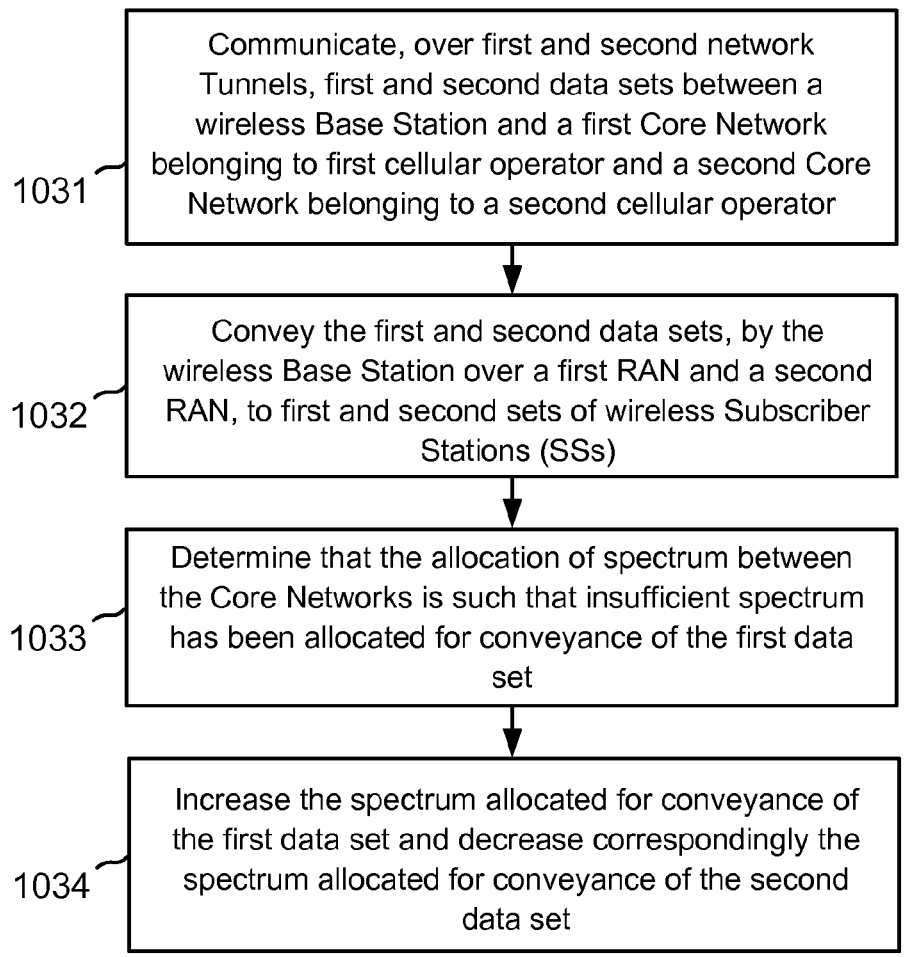
FIG. 9 illustrates one embodiment of the elements of a method for servicing multiple Operators via a single wireless Base Station (BS) utilizing dynamic allocation of spectrum.

FIG. 9 is a flow diagram illustrating one method for servicing multiple cellular Operators via a single wireless Base Station (BS) 100, utilizing dynamic allocation of spectrum. In step 1031, a wireless BS 100 communicating first 300a and a second 300b data sets with a First Core Network data source 102a belonging to a first cellular Operator and with a Second Core Network data source 102b belonging to a second cellular Operator respectively, over first and second network Tunnels 105a & 105b, respectively. In step 1032, the wireless BS 100 utilizing first and second amounts of wireless Access spectrum 211a & 211b, respectively, to convey the first 301a and second 301b data sets over first 109a and second 109b RANs, respectively, to first and second sets of wireless Subscriber Stations (SS) 108a & 108b, respectively. In step 1033, determining that the first amount of wireless Access Spectrum 211a is not sufficient to convey 300a the first data set. In step 1034, increasing the first amount of wireless Access Spectrum 211a at the expense of the second amount of wireless Access Spectrum 211b, thereby making the first amount of wireless Access Spectrum 211a better suited to convey 301a the first data set.

In a first possible implementation of the method just described, increasing the first amount of wireless Access Spectrum 211a at the expense of the second amount of wireless Access Spectrum 211b further comprises determining a third amount of wireless Access Spectrum that can be reduced from the second amount of wireless Access Spectrum 211b without substantially impairing the ability of the second amount of wireless Access Spectrum 211b to convey 301b the second data set, reducing the third amount of Wireless Access Spectrum from the second amount of wireless Access Spectrum 211b, and adding the third amount of wireless Access Spectrum to the first amount of wireless Access Spectrum 211a.

In a second possible implementation of the method described above, increasing the first amount of wireless Access Spectrum 211a at the expense of the second amount of wireless Access Spectrum 211b further comprises determining a third amount of wireless Access Spectrum to be reduced from the second amount of wireless Access Spectrum 211b and to be added to the first amount of wireless Access Spectrum 211a, such that the third amount of wireless Access Spectrum is operative to substantially equate the ability of the first amount of wireless Access Spectrum 211a to convey 301a the first data set with the ability of the second amount of wireless Access Spectrum 211b to convey 301b the second data set, reducing the third amount of Wireless Access spectrum from the second amount of wireless Access Spectrum 211b, and adding the third amount of wireless Access Spectrum to the first amount of wireless Access Spectrum 211a.

It is noted that: (1) In some embodiments, there is a fully-integrated Base Station with an ability to handle multiple bands. (2) In some embodiments, there is an array of assignable Core Network interfaces which allow multiple Operators to share the same Base Station equipment and the same physical backhaul interface. (3) In some embodiments, there is load balancing between Operators to share one or more of wireless Access Spectrum, radio antennas, available radio transmit power, backhaul, and Baseband processing power. (4) In some embodiments, both licensed and unlicensed frequencies are supported in a fully-integrated Base Stations. (5) In some embodiments, there is dynamic reallocation of wireless Access Spectrum from a relatively lightly loaded Operator to a relatively heavily loaded Operator. (6) In some embodiments, a dedicated Gateway separates traffic between the Core Networks and the Base Station. (7) In some embodiments, a fully integrated multi-Operator Base Station allows multiple Operators to share many different kinds of resources, such as, but not by limitation, wireless Access Spectrum, antenna, radio chain, transmit power, processing, backhaul to a centralized processing unit, and others. (8) Various of embodiments described herein offer the flexibility of a compact and fully integrated Base Station that permit balancing in the employment of many different kinds of resources, including, by example and not by limitation, wireless Access Spectrum, antenna, radio chain, transmit power, processing, and backhaul to a centralized processing unit that is itself part of that Base Station. (9) A multi-Operator Base Station would be ideal for wholesalers who build networks to be leased out to Operators. In other words, the availability of a multi-Operator Base Station allows new designs for networks intended specifically to allow the sharing of resources.

Figure 10A:
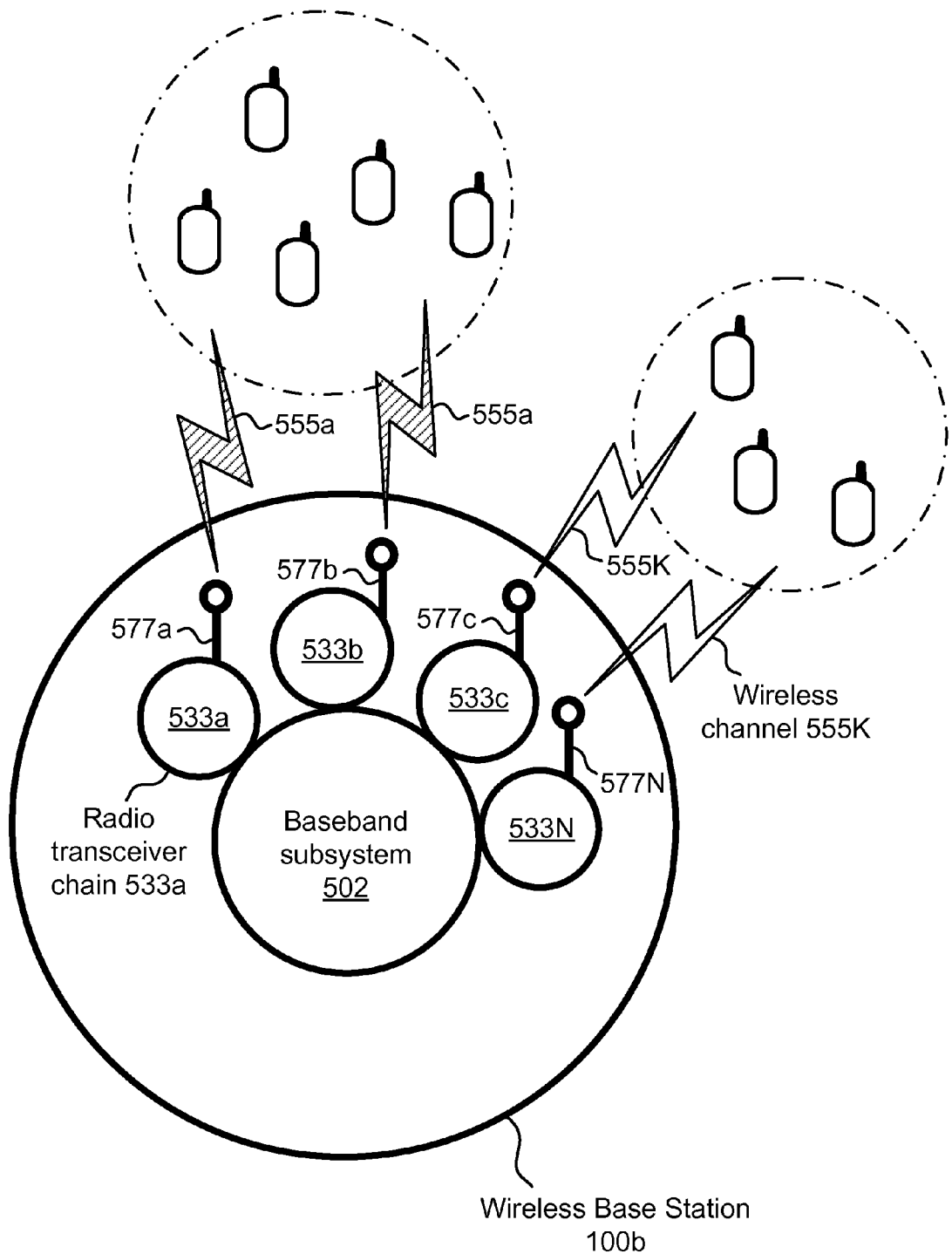
FIG. 10A illustrates one embodiment of components comprising a system for assigning dynamically a plurality of transceiver chains among a varying number of wireless channels.

FIG. 10A illustrates one embodiment of components in a system. In FIG. 10A, there is a wireless Base Station (BS) 100b, which includes a Baseband subsystem 502 communicatively connected to multiple radio transceiver chains 533a, 553b, 553c, and 533N. Each radio chain is communicatively connected to an antenna. In FIG. 10A, radio transceiver chain 533a is communicatively connected to antenna 577a, 553b to 577b, 533c to 577c, and 533N to 577N. Each antenna communicates over a wireless channel with a group of Subscriber Stations. In FIG. 10A, there are two wireless channels, which are illustrated as 555a and 555K. 555a is the radio channel that is used by the two antennas 577a and 577b. 555K is the wireless channel that is used by antenna 577c and 577N.

Figure 10B:
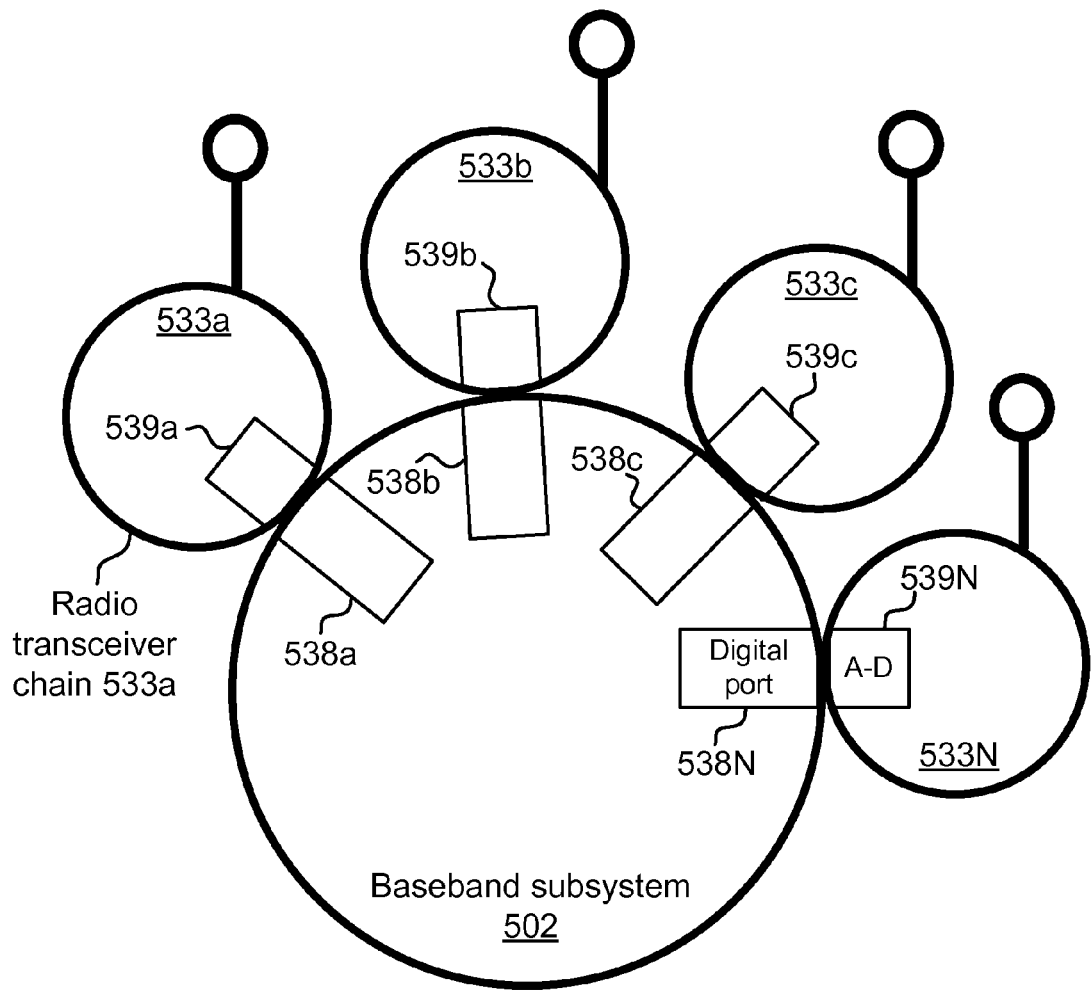
FIG. 10B illustrates one embodiment of a digital interface of a Baseband processor subsystem within a system for assigning dynamically a plurality of transceiver chains among a varying number of wireless channels.

FIG. 10B illustrates one embodiment of components in a system. In Baseband subsystem 502, there are N digital ports, illustrated by 538a, 538b, 538c, and 538N. Each digital port is connected to an Analog-Digital interface located in a radio transceiver chain. Thus, digital port 538a is connected to Analog-Digital interface 539a located within radio transceiver chain 533a. Similarly, 538b is connected to 539b within 533b, 538c is connected to 539c within 533c, and 538N is connected to 539N within 533N. One possible conversion, but not the only possibility, is a digital communication from the Baseband subsystem 502 to any one of the digital ports, then converted by the Analog-Digital interface connected to that digital port, and then communicated via the corresponding radio transceiver chain to a one or more Subscriber Stations. For example, a digital signal from 502 to 538a, converted to analog by 539a, and then transmitted by 533a to a group of Subscriber Stations. Another possible conversion, but not the only possibility, is an analog communication from a Subscriber Station, to a radio transceiver chain, converted from analog to digital by the Analog-Digital interface within the radio transceiver chain, then communicated to the corresponding digital port, and finally communicated to the Baseband subsystem. For example, an analog signal from a Subscriber Station to radio transceiver chain 533b, converted to digital by Analog-Digital interface 539b, communicated to Digital port 538b, and then communicated to Baseband subsystem 502.

In FIG. 10B, separate paths are not shown within the Baseband subsystem 502 to the Subscriber Stations. The intent is that the Baseband subsystem 502 is sufficiently strong that it communicates directly with each of the subsystems, including subsystem 538a-539a-533a, subsystem 538b-539b-533b, subsystem 538c-539c-533c, and subsystem 538N-539N-533N.

Figure 10C:
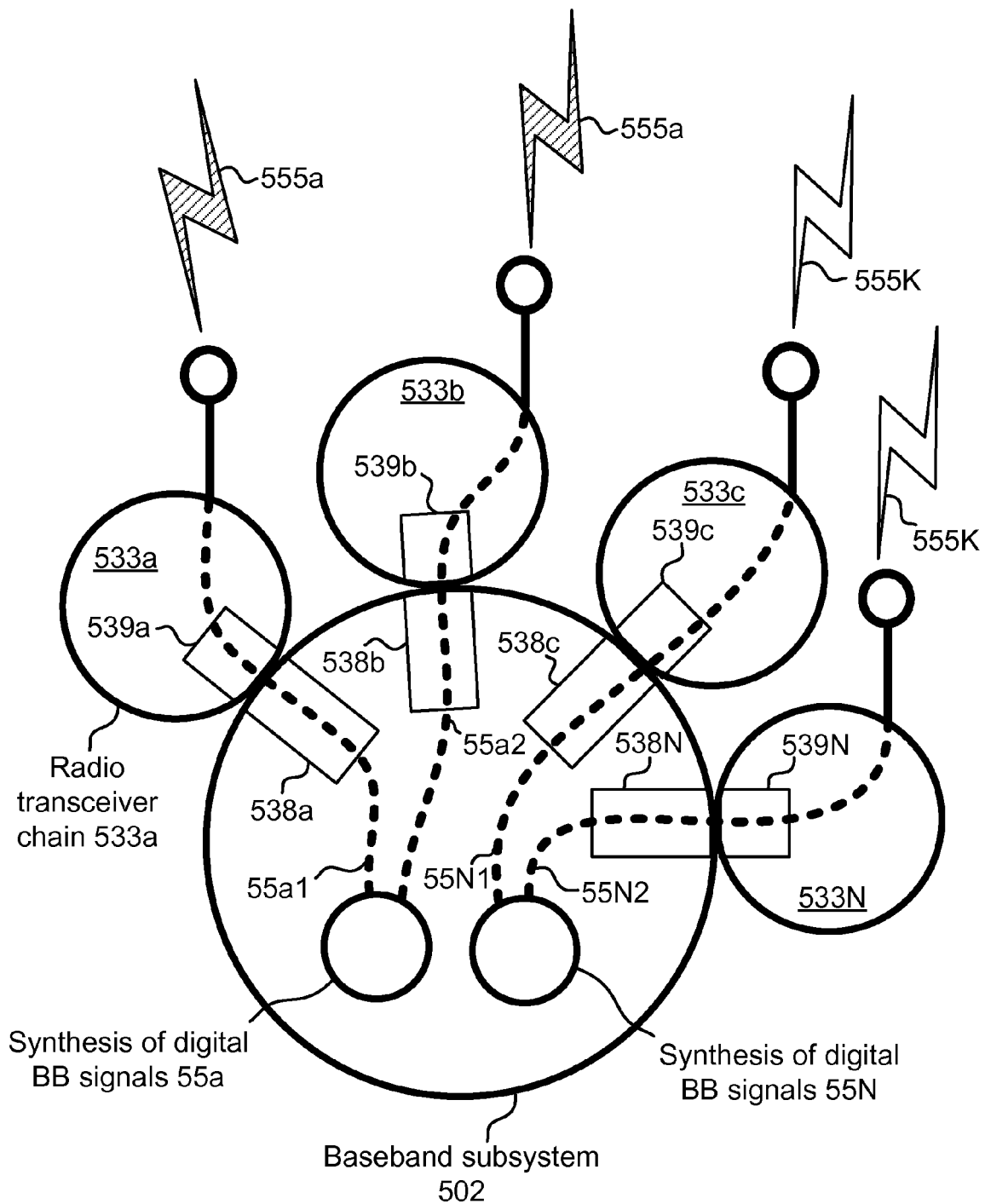
FIG. 10C illustrates one embodiment of multiple signal paths in a Baseband processor subsystem within a system including two distinct radio channels.

FIG. 10C illustrates one embodiment of multiple signals within a Baseband system 502. In FIG. 10C, Synthesis of digital Baseband signals 55a creates two signals, each of which ultimately communicates with Subscriber Stations over wireless channel 555a. One such signal is 55a1 created by 55a and conveyed to 538a, then to 539a and to 533a, then over wireless channel 555a to Subscriber Stations. Similarly, a signal 55a2 synthesized from 55a is conveyed from 55a to 538b to 539b to 533b, then over the same wireless channel 555a to Subscriber Stations. The use of the same wireless channel 555a for both signals, indicates that the same communication is being sent by multiple signals, at substantially the same time, from the Baseband system 502 to the Subscriber Stations, or conversely that a communication from one Subscriber Station will be received on wireless channel 555 and will travel via both 533a to 502 and 533b to 502. A similar process occurs between Synthesis of digital Baseband signal 55N and Subscriber Stations via wireless channel 555K, in which one signal 55N1 is conveyed from 502 to 538c to 539c to 533c to 555K to the Subscriber Stations, or vice versa from one Subscriber Station to 555k, to 533c, to 539c, to 538c to 55N within Baseband subsystem 502. A second signal 55N2 is conveyed from 502 to 538N to 539N to 533N to 555K to the Subscriber Stations, or conversely from a Subscriber Station to 555K to 533N to 539N to 538N and to 55N within Baseband subsystem 502.

Letter K representing the number of wireless channels 555a-555K in use at any particular time, is by intent not the same as letter N representing the number of radio transceiver chains 553a-553 N. K may be equal N, indicating a one-to-one match between number of wireless channels 555a-555K in operation and number of signals 55a1 & 55a2 and 55N1 & 55N2 from 502 through syntheses of digital signals 55a & 55N to radio transceiver chains 533a-533N, hence to antennas 577a-577N and Subscriber Stations. K may be less than N, indicating there are fewer wireless channels 555a-555K than signals 55a1 & 55a2 and 55N1 & 55N2, and this may occur when a transmission is to be repeated in two more simultaneously conveyed signals. When a transmission is made on two or more signals as opposed to only one signal, even when all the signals are propagated on the same radio frequency, that transmission will typically have a higher radio system gain than a transmission on only one signal, which means generally that a transmission with multiple signals can have, in comparison to a transmission with one signal, any of a higher quality link (typically measured by S/N ratio), a greater distance propagation, a greater penetration power, higher data rate, or a combination of any of the foregoing.

In some embodiments, the number of Syntheses of digital Baseband signals 55a & 55N may be dynamically altered to meet temporal system demands. In some embodiments, the number of wireless channels 555a-555K may be dynamically altered to meet temporal system demands. The number of each of these elements, the Syntheses and the wireless channels, is independent from the numbers of the other elements, except that K channels may not exceed N communication paths, and the number of syntheses may not exceed N digital Baseband signals.

There are many alternative embodiments in the generation of signals to and from antennas the Subscriber Stations. For example, antennas may be a single antenna connected to a radio transceiver chain, or there may be phased array signals in use, or MIMO signal in use, or any other communication configuration. For example, there may be phased-array coherent reception, Maximal Ratio Combining (MRC), Minimum Mean Square Error (MMSE), Maximum Likelihood (ML), or any other number of algorithms in the transmission or reception of a wireless signal.

In one embodiment, there is a wireless Base Station (BS) system 100b, operative to assign dynamically a plurality of radio transceiver chains 533a-533N among a varying number of wireless channels 555a-555N. This wireless BS system 100b may include a Baseband (BB) subsystem 502, which itself may include N digital ports 538a-538N, operative to synthesize 55a & 55N N digital Baseband (BB) signals 55a1

& 555a2 and 55n1 & 55n2 associated with K wireless channels 555a & 555K, wherein (1) N is equal to at least 2, (2) K is equal to at most N, and (3) K is equal to at least 1. The wireless BS system 100b may also include N radio transceiver chains 533a-533N, each of which may be connected to one of the N digital ports 538a-538N of the BB subsystem 502 via an Analog-Digital interface 539a-539N. The wireless BS system 100b may be configured to (A) set dynamically K according to a first criterion, wherein K is a number between 1 and N, (B) assign dynamically the N radio transceiver chains 533as-533N among the K wireless channels 555a-555K according to a second criterion such that each radio transceiver chain 533a-533N is assigned to only one of the wireless channels 555a-555K, (C) synthesize 55a-55N, by the BB subsystem 502, the N digital BB signals 55a1 & 55a2 and 55N1 & 55N2 associated with the K wireless channels 555a-555K, and (D) input the N digital BB signals to the N radio transceiver chains 533a-533N via the corresponding N digital ports 538a-538N and the corresponding Analog-Digital interfaces 539a-539N, thereby transmitting the K wireless channels 555a-555K via the N radio transceiver chains 533a-533N. This embodiment will be called "the Dynamic Assignment embodiment", and seven alternatives to this embodiment are described below.

In a first alternative embodiment of the Dynamic Assignment embodiment, the number of wireless channels K 555a-555K is smaller than the number of radio transceiver chains N 533a-533N, which may mean that at least one of the wireless channels 555a-555K is transmitted via at least two of the radio transceiver chains 533a-533N. In one configuration of this alternative embodiment, at least two of the N digital Baseband signals 55a1 & 55a2 and 55N1 & 55N2 driving the at least two of the radio transceiver chains 533a-533N comprise at least two Multiple Input Multiple Output (MIMO) signals, thereby transmitting the at least one of the wireless channels using a MIMO scheme. In a second configuration of this alternative embodiment, at least two of the N digital Baseband signals 55a1 & 55a2 and 55N1 & 55N2 driving the at least two of the radio transceiver chains 533a-533N comprise at least two phased-array signals, thereby transmitting the at least one of the wireless channels 555a-555K using a phased-array scheme comprising the at least two of the radio transceiver chains 533a-533N.

Figure 11:
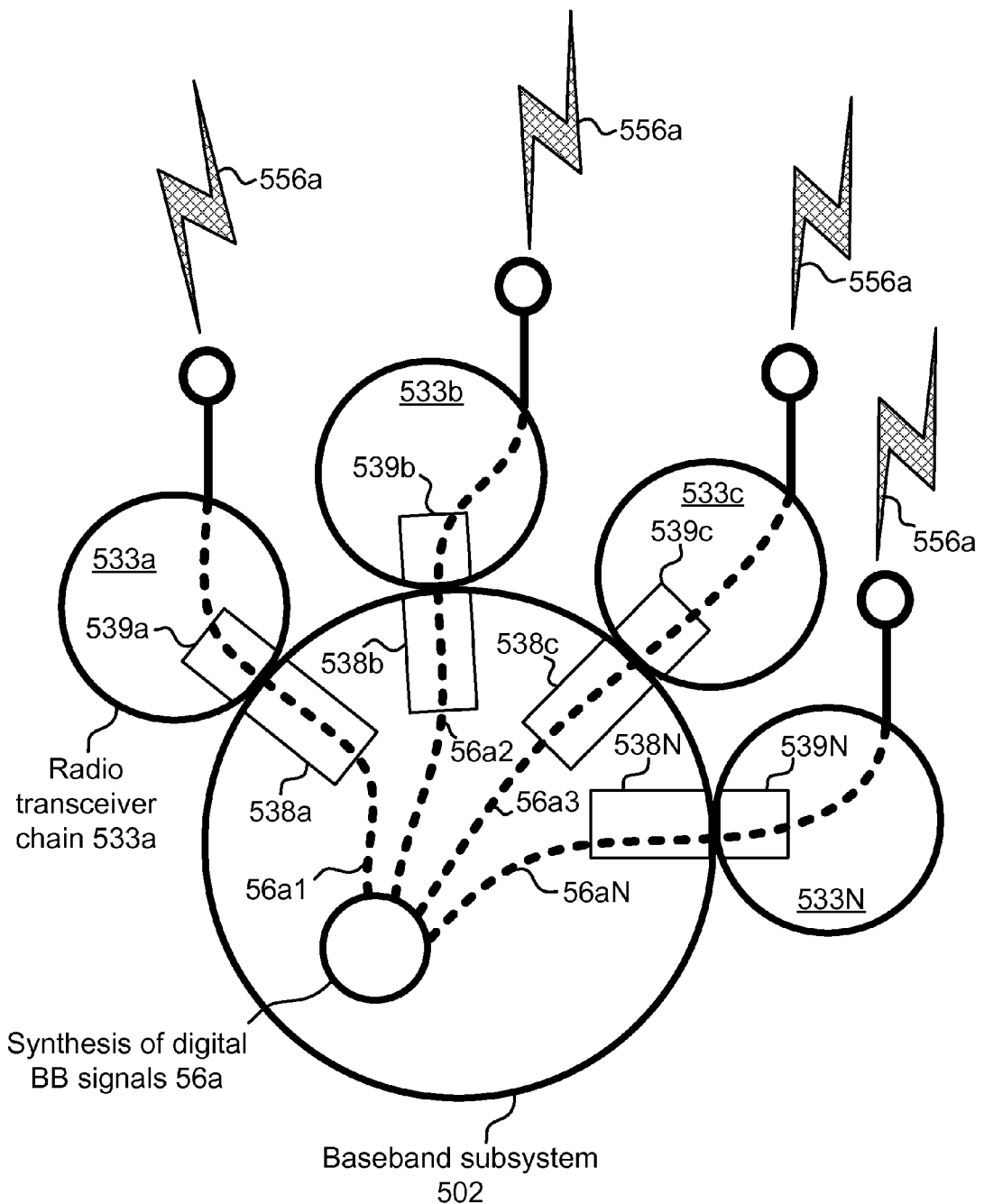
FIG. 11 illustrates one embodiment of multiple signal paths in Baseband processor subsystem within a system including one radio channel.

FIG. 11 illustrates one embodiment of multiple signals within a Baseband system 502. FIG. 11 is different in two respects from FIG. 10C. First, there is only one Synthesis of digital Baseband signals 56a in FIG. 11, as opposed to two in FIG. 10C. The meaning is that all of the N digital Baseband signals in FIG. 11 56a1, 56a2, 56a3, and 56aN, are generated by a signal Synthesis 56a within the Baseband subsystem 502. Second, in FIG. 11 there is only one wireless channel 556a, driven by the same four radio transceiver chains 533a-533N, whereas in FIG. 10C there were two wireless channels from the same four radio transceiver chains 533a-533N. Where there are more chains driving one wireless channel, as there are here in FIG. 11, (1) the system gain for this wireless channel will be higher, in both directions, that is, from the radio transceiver chains to the Subscriber Stations, and from the Subscriber Stations to the radio transceiver chains, or (2) the data capacity of this wireless channel will increase.

Figure 12:
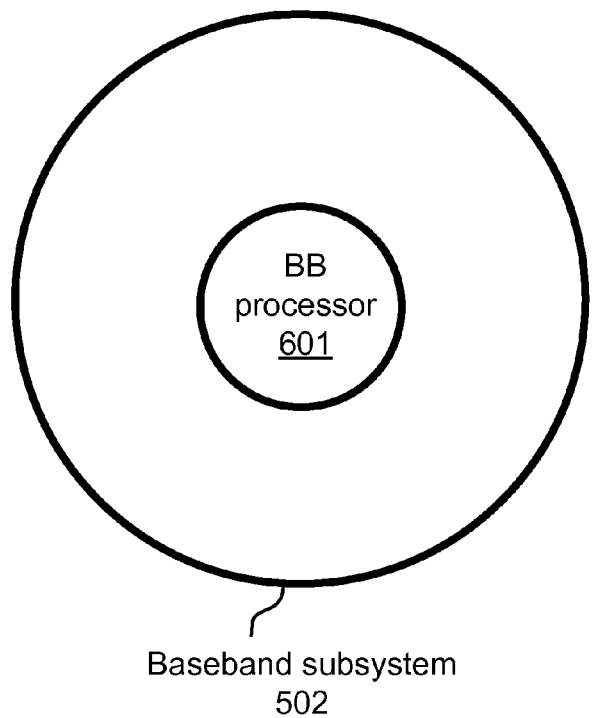
FIG. 12 illustrates one embodiment of a Baseband processor subsystem.

FIG. 12 illustrates one embodiment of a Baseband subsystem 502 in a wireless BS system 100b, operative to assign dynamically a plurality of radio transceiver chains 533a-533N among a varying number of wireless channels 555a-555N. The Baseband system 502 includes a single Baseband processor 601, which is operative to generate substantially simultaneously the K wireless channels 555a-555K and the corresponding N Baseband digital signals 55a1 & 55a2 and 55N1 & 55N2, according to the setting of K.

Figure 13:
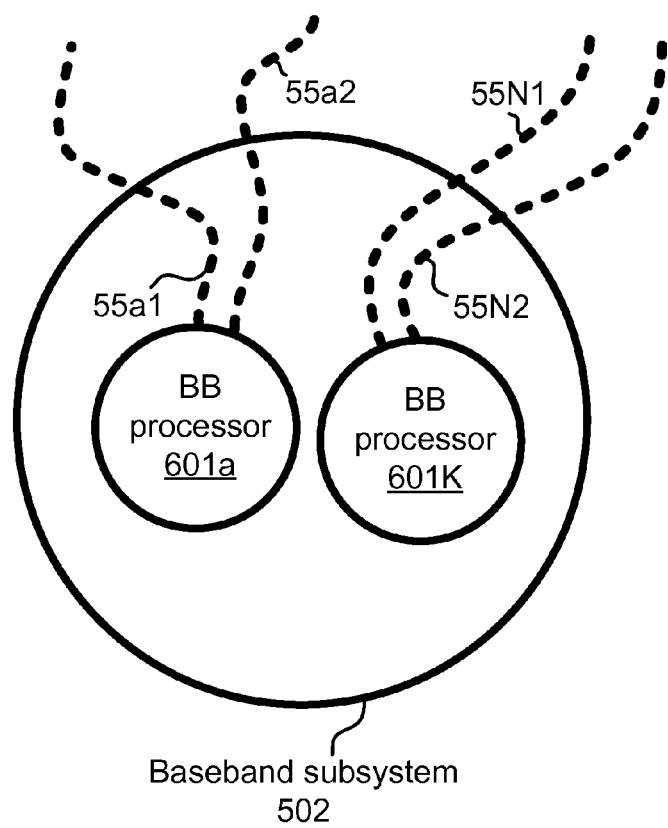
FIG. 13 illustrates one embodiment of a Baseband processor subsystem including at least two Baseband processors.

FIG. 13 illustrates one embodiment of a Baseband subsystem 502 in a wireless BS system 100b, operative to assign dynamically a plurality of radio transceiver chains 533a-533N among a varying number of wireless channels 555a-555N. The Baseband system comprises two or more Baseband processors 601a & 601K, which are operative to generate substantially simultaneously the K wireless channels 555a-555N and the corresponding N Baseband digital signals 55a1 & 55a2 and 55N1 & 55N2, according to the setting of K.

Figure 14:
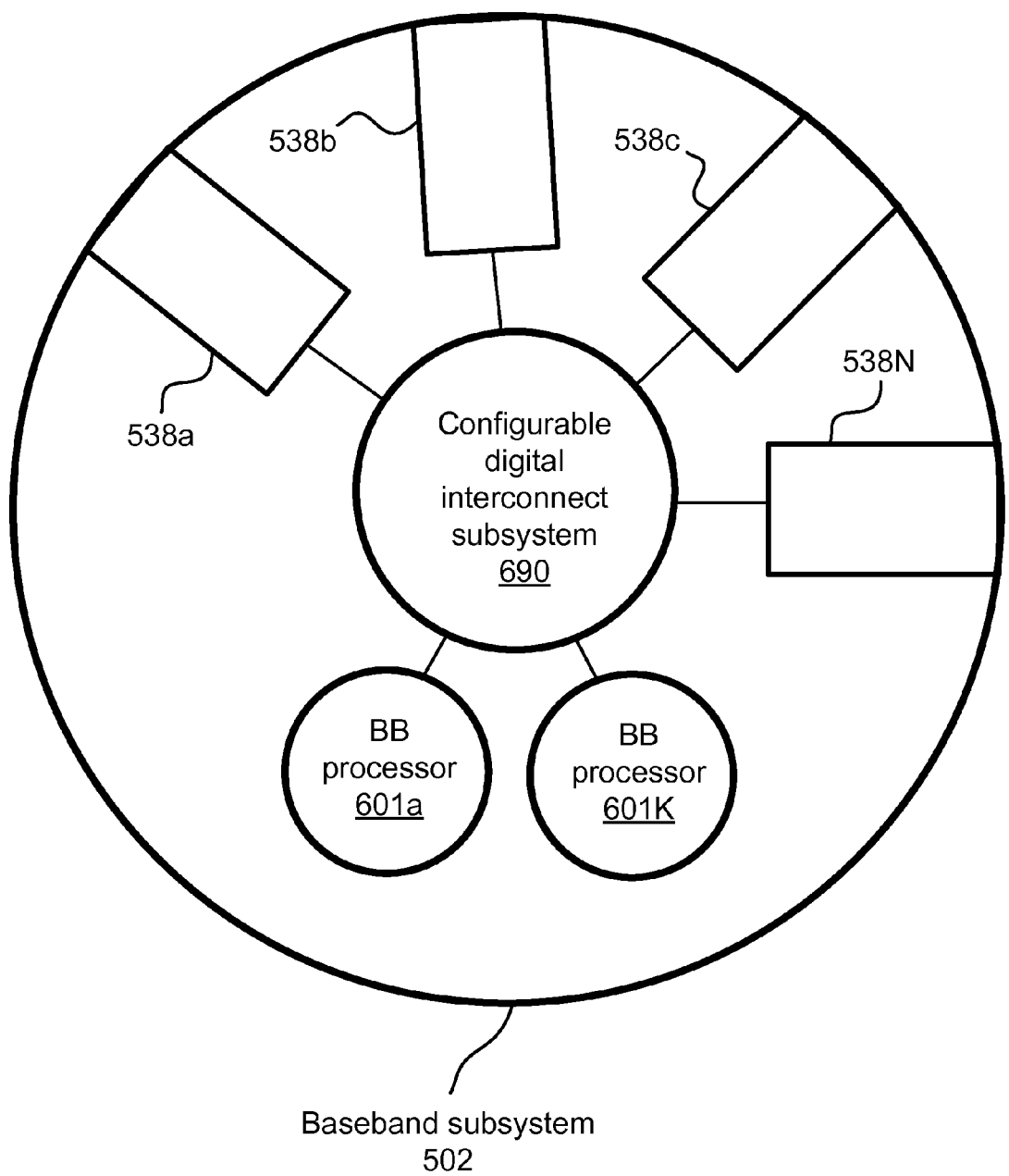
FIG. 14 illustrates one embodiment of a Baseband processor subsystem including at least two Baseband processors, in which a configurable digital interconnect subsystem connects with the Baseband processors.

FIG. 14 illustrates one embodiment of the subsystem described in FIG. 13. In FIG. 14, there is a Configurable digital interconnect subsystem 690, which interconnects each of the Baseband processors 601a-601K with at least some of the N digital ports 538a-538N, according to the setting of K and according to the assignment of the N radio transceiver chains 533a-533N among the K wireless channels 555a-555K.

In a second alternative embodiment of the Dynamic Assignment Embodiment, there is a wireless Base Station (BS) system 100b, operative to assign dynamically a plurality of radio transceiver chains 533a-533N among a varying number of wireless channels 555a-555N. This wireless BS system 100b may include a Baseband (BB) subsystem 502, which itself may include N digital ports 538a-538N, operative to synthesize 55a & 55N N digital Baseband (BB) signals 55a1 & 555a2 and 55n1 & 55n2 associated with K wireless channels 555a & 555K, wherein (1) N is equal to at least 2, (2) K is equal to at most N, and (3) K is equal to at least 1, wherein the wireless BS system 100b may be configured to set dynamically K according to the distance between a Subscriber Station and the wireless BS 100b, such that during the operation phase of the wireless BS 100b when the Subscriber Stations are relatively distant from the wireless BS 100b, K is set to 1, thereby creating a single wireless channel 556a transmitting via the N radio transceiver chains 533a-533N and increasing the range of the single wireless channel 556a to facilitate communication with the relatively distant Subscriber Station. This alternative embodiment will be called "embodiment where initial K=1", and several alternative embodiments to this embodiment will be described below.

In a first alternative embodiment of an embodiment in which initial K=1, N digital Baseband signals 56a-56N driving the N radio transceiver chains 533a-533N comprise N phased-array signals, thereby transmitting the single wireless channel 556a using a phased-array scheme comprising the N radio transceiver chains 533a-533N, wherein the Baseband subsystem 502 is reconfigured to generate the N phased-array signals accordingly.

In a second alternative embodiment of an embodiment in which initial K=1, during a later operation phase of the wireless BS 100b when the Subscriber Stations become closer to the wireless BS 100b, K is set to at least two, such that each of the wireless channels 555a & 555K is transmitting via less than the N radio transceiver chains 533a-533N, thereby decreasing the range of the wireless channels 555a & 555K, but increasing data throughput of the wireless BS 100b.

In such second alternative embodiment of an embodiment in which initial K=1, one alternative configuration occurs during or after a transition from a single wireless channel operation to at least two wireless channels operation. At or after this transition, the Baseband subsystem 502 is reconfigured to transition between a single wireless channel N-phased-array operation using wireless channel 556a to a multiple wireless channels MIMO operation using wireless channels 555a-555K.

In such second alternative embodiment of an embodiment in which initial K=1, one alternative configuration occurs during or after a transition from a single wireless channel operation to at least two wireless channels operation. At or after such transition, the Baseband subsystem 502 is reconfigured to transition between a transmission scheme including a single wireless channel N-level coherent phase transmission, to a transmission scheme comprising multiple wireless channels MIMO operation. In this alternative configuration, an additional possibility is that the Baseband subsystem 502 is reconfigured to transition between an N-level combining-algorithm reception mode to a multiple wireless channels MIMO reception mode, in which the N-level combining-algorithm reception mode may be any one of phased-array coherent reception, Maximal Ratio Combining (MRC), Minimum Mean Square Error (MMSE) and Maximum Likelihood (ML), or any combination of such alternative reception modes.

In such second alternative embodiment of an embodiment in which initial K=1, one alternative configuration occurs during or after a transition from a single wireless channel operation to at least two wireless channels operation. At or after such transition, the Baseband subsystem 502 is reconfigured to transition between a transmission scheme including Cyclic Delay Diversity (CDD), to a transmission scheme comprising multiple wireless channels MIMO operation. In this alternative configuration, an additional possibility is that the Baseband subsystem 502 is reconfigured to transition between an N-level combining-algorithm reception mode to a multiple wireless channels MIMO reception mode, in which the N-level combining-algorithm reception mode may be any one of Phased-array coherent reception, Maximal Ratio Combining (MRC), Minimum Mean Square Error (MMSE) and Maximum Likelihood (ML), or any combination of such alternative reception modes.

In such second alternative embodiment of an embodiment in which initial K=1, one alternative configuration occurs during the initial operation phrase of the wireless BS 100b, when all the aggregated transmission power of the N radio transceiver chains 533a-533N is used for the transmission of a single wireless channel 556a, thereby maximizing the range of the single wireless channel 556a. In this alternative configuration, a further configuration occurs in a later operation phase of the wireless BS 100b, when each of the wireless channels 555a-555K is transmitting with less than the N radio transceiver chains 533a-533N, and therefore with less power than the aggregated transmission power of the N radio transceiver chains 533a-533N, thereby decreasing the range of each of the wireless channels 555a-555N and decreasing inter-cell interferences with close-by wireless Base Stations.

In a third alternative embodiment of the Dynamic Assignment embodiment, there is a wireless Base Station (BS) system 100b, operative to assign dynamically a plurality of radio transceiver chains 533a-533N among a varying number of wireless channels 555a-555N. Such system includes a Baseband subsystem 502 comprising N digital ports 538a-538N, operative to synthesize 55a-55N N digital Baseband signals 55a1 & 55a2 and 55N1 & 55N2 associated with K wireless channels 555a-555K, wherein N is equal to at least 2, K is equal to at most N, and K is equal to at least 1. The Baseband processor 502 includes a single Baseband processor 601 operative to generate substantially simultaneously the K wireless channels 555a-555N and the corresponding N digital Baseband signals 55a1 & 55a2 and 55N1 & 55N2, according to the setting of K. In this embodiment, one configuration is where the Baseband processor 601 comprises an ASIC. In this embodiment, an alternative configuration is that the Baseband processor 601 comprises an FPGA. In this embodiment, an alternative configuration is that the Baseband processor 602 comprises a Digital Signal Processor (DSP). In the alternative configuration in which the Baseband processor 602 comprises a DSP, the simultaneous generation of K wireless channels 555a-555N and the corresponding N digital Baseband signals 55a1 & 55a2 and 55N1 & 55N2, is done at least in part in software running on the DSP.

In a fourth alternative embodiment of the Dynamic Assignment embodiment, there is a wireless Base Station (BS) system 100b, operative to assign dynamically a plurality of radio transceiver chains 533a-533N among a varying number of wireless channels 555a-555N. The system includes a Baseband subsystem 502, which comprises at least two Baseband processors 601a & 601K operative to generate substantially simultaneously K wireless channels 555a-555N and the corresponding N digital Baseband signals 55a1 & 55a2 and 55N1 & 55N2, according to the setting of K. In one configuration of this fourth alternative embodiment, each of the Baseband processors 601a & 601K is operative to generate one of the K wireless channels 555a-555N and the corresponding N digital Baseband signals 55a1 & 55a2 and 55N1 & 55N2.

In a fifth alternative embodiment of the Dynamic Assignment embodiment, there is a wireless Base Station (BS) system 100b, operative to assign dynamically a plurality of radio transceiver chains 533a-533N among a varying number of wireless channels 555a-555N. In this system, the second criterion is based on assigning more radio transceiver chains to wireless channels requiring longer range.

In one configuration of this fifth alternative embodiment, in order to achieve long range, radio transceiver chains 533a-533N convey N-level coherent phase transmissions, and receives combinable signals enabling utilization of reception algorithms such as (1) Phased-array coherent reception, (2) Maximal Ratio Combining (MRC), (3) Minimum Mean Square Error (MMSE) and (4) Maximum Likelihood (ML). In a further possible alternative embodiment of this configuration, the Baseband subsystem 502 is reconfigured to use the combinable signals as at least some of the N digital Baseband signals 55a1 & 55a2 and 55N1 & 55N2, upon exercising the assignment based on the second criterion.

In one configuration of this fifth alternative embodiment, in order to achieve long rang, radio transceiver chains 533a-533N convey Cyclic Delay Diversity (CDD) signals, and/or receive combinable signals enabling utilization of reception algorithms such as (1) Phased-array coherent reception, (2) Maximal Ratio Combining (MRC), (3) Minimum Mean Square Error (MMSE) and (4) Maximum Likelihood (ML). In a further possible alternative embodiment of this configuration, the Baseband subsystem 502 is reconfigured to use the combinable signals as at least some of the N digital Baseband signals 55a1 & 55a2 and 55N1 & 55N2, upon exercising the assignment based on the second criterion.

In a sixth alternative embodiment of the Dynamic Assignment embodiment, there is a wireless Base Station (BS) system 100b, operative to assign dynamically a plurality of radio transceiver chains 533a-533N among a varying number of wireless channels 555a-555N. In this system, the second criterion is based on assigning more radio transceiver chains 533a-533N to wireless channels requiring relatively high data throughput rates, and the radio transceiver chains 533a-533N convey MIMO signals the help obtain relatively high data throughput rates. In one configuration of this sixth alternative embodiment, the Baseband subsystem 502 is reconfigured to synthesize the MIMO signals as at least some of the N digital Baseband signals 55a1 & 55a2 and 55N1 & 55N2, upon exercising the assignment based on the second criterion.

In a seventh alternative embodiment of the Dynamic Assignment embodiment, there is a wireless Base Station (BS) system 100b, operative to assign dynamically a plurality of radio transceiver chains 533a-533N among a varying number of wireless channels 555a-555N. In this system, at least one of the antennas 577a-577N connected to the N radio transceiver chains 533a-533N is an omni-directional antenna, and any wireless channel 555a-555N propagated by an omni-directional channel can span substantially a 360 degree coverage area around the wireless BS, regardless of an assignment of radio transceiver chains 533a-533N among the wireless channels 555a-555N.

Figure 15A:
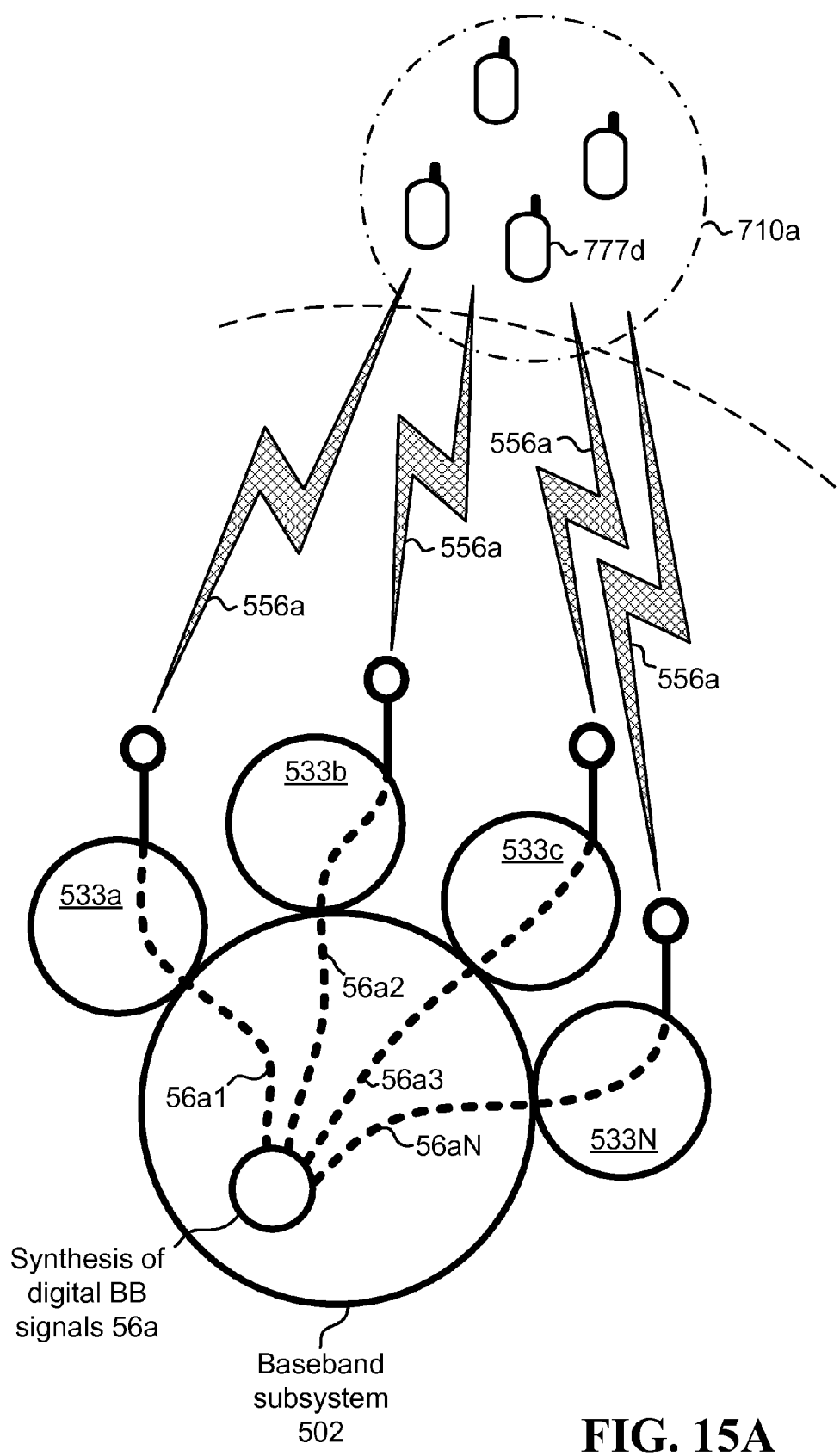
FIG. 15A illustrates one embodiment of components comprising a system for assigning dynamically a plurality of transceiver chains among a varying number of wireless channels, in which the system appears in a range-extension mode.

FIG. 15A illustrates one embodiment of a system state at a particular point of time. In FIG. 15A, there is a Baseband subsystem 502, which includes a Synthesis of Baseband signals 56a, which synthesizes N number of signals 56a1, 56a2, 56a3, through 56aN, sent to N number of radio transceiver chains 533a-533N. These signals are then conveyed by the radio transceiver chains over a single wireless channel 556a associated with a particular frequency range 710a. FIG. 15A shows an initial state, or in other words an initial phase, of an operation, during which there is communication with a group of wireless Subscriber Stations 777d located relatively distantly from the radio transceiver chains 533a-533N. The system state in FIG. 15A is a two-way system, as are all the system FIGS. 10A, 10C, and 11. The uplink path from 777d to 502 conveys signals in an order opposite from that of the downlink path. This initial state or initial phase of system operation is illustrated in FIG. 15A may be called a "range extension mode".

Figure 15B:
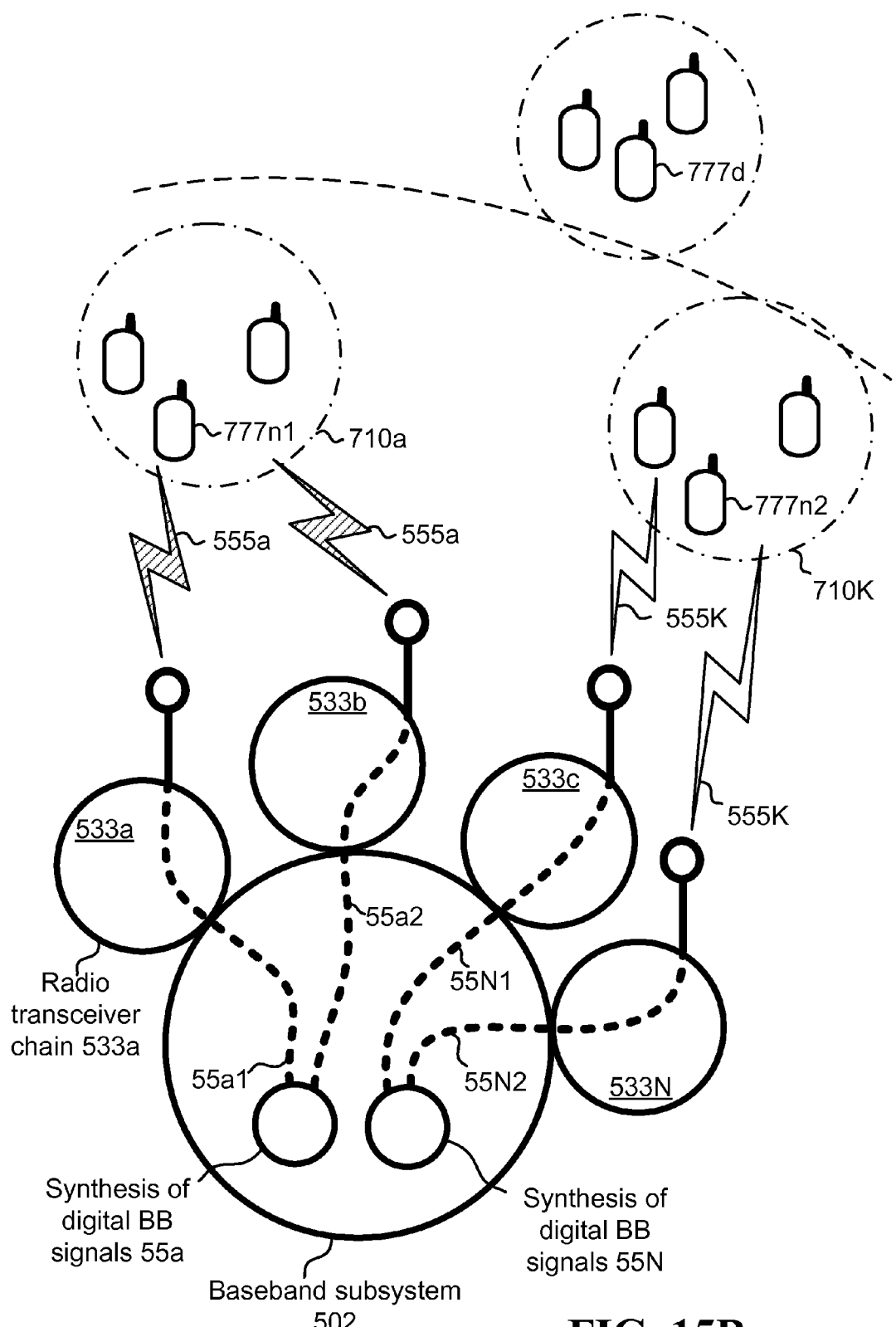
FIG. 15B illustrates one embodiment of components comprising a system for assigning dynamically a plurality of transceiver chains among a varying number of wireless channels, in which the system appears in an enhanced-capacity mode.

FIG. 15B illustrates one embodiment of a system state at a point of time that is different from the point of time illustrated in FIG. 15A. In 15B, there is a Baseband subsystem 502, which includes a Synthesis of digital Baseband signals 55a and 55N, which synthesizes N number of signals 55a1 & 55a2 associated with 55a and 55N1 & 55N2 associated with 55N, sent to N number of radio transceiver chains 533a-533N. These signals are then conveyed by the radio transceiver chains over K number of wireless channels 555a and 555K, associated with particular frequency ranges, 710a and 710K, respectively. FIG. 15B, shows a later state, or in other words a later phase, of an operation, during which there is communication with K groups of wireless Subscriber Stations, 777n1 using frequency range 710a, and 777n2 using frequency range 710K, respectively. These two groups are located relatively nearby to the radio transceiver chains 533a-533N. The system state in FIG. 15B is a two-way system, as are all the system FIGS. 10A, 10C, and 11. The uplink paths from 777n1 to 502 and from 777n2 to 502, convey signals in an order opposite from that of the downlink paths. The subsequent state or subsequent phase illustrated in FIG. 15B may be called an "enhanced capacity mode".

There is a transition in time from FIG. 15A to FIG. 15B. Initially, the system can achieve long-range communication for a relatively few number of Subscriber Stations. In the range extension mode, the system does not discriminate against nearby Subscriber Stations, so that there is communication with both relatively distant and relatively nearby Subscriber Stations, but one feature of the system is that it can communicate with relatively distant Subscriber Stations. In a subsequent stage called the enhanced capacity mode, system utilization has increased, the system communicates with more Subscriber Stations, but these Subscriber Stations are located relatively nearby to the radio transceiver chains. Greater capacity is achieved in the enhanced capacity mode by increasing the number of wireless channels, and hence decreasing the number of signals on each channel, all without increasing hardware or system resources. Greater capacity is achieved by eliminating or at least inhibiting communication between the radio transceiver chains and relatively distant Subscriber Stations. Switching between range extension mode and enhanced capacity mode is dynamic, and may change relatively rapidly in accordance with available system resources and relative Subscriber Station demand at any particular point in time.

Figure 16:
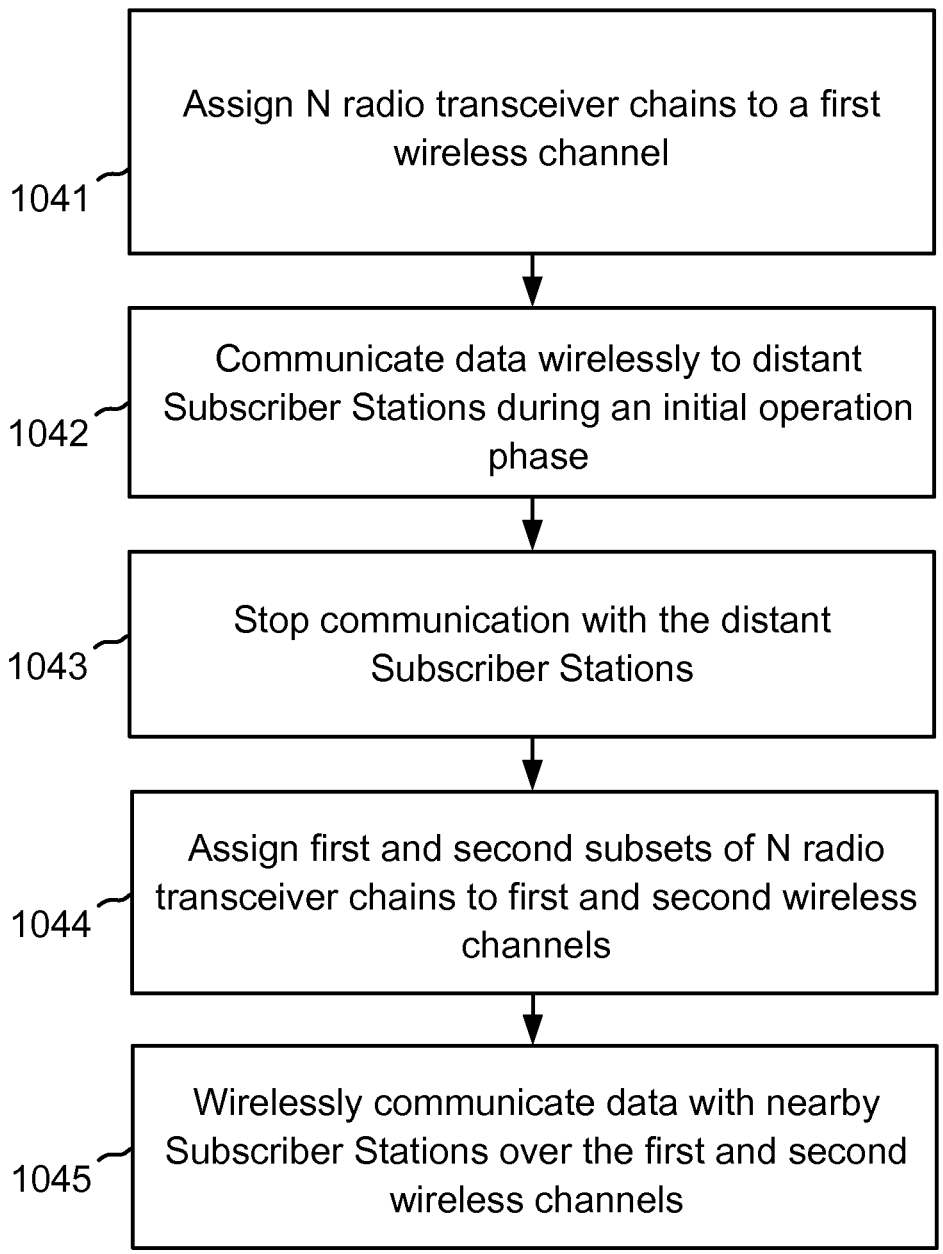
FIG. 16 illustrates one embodiment of elements of a method for transitioning from a range extension mode to an enhanced capacity mode in a wireless Base Station.

FIG. 16 illustrates a flow diagram describing one method for transitioning from a range extension mode to an enhanced capacity mode in a wireless Base Station 100b. In step 1041, a wireless Base Station 100b assigning N radio transceiver chains 533a-533N to a first wireless channel 556a associated with a first frequency range 710a. In step 1042, the wireless Base Station 100b communicating data wirelessly during an initial operation phase, with distant Subscribed Stations 777d, over the first wireless channel 556a, via the N radio transceiver chains 533a-533N, thereby utilizing the aggregated transmission power and the aggregated reception capability of the N radio transceiver chains 533a-533N to reach the distant Subscriber Stations 777d. In step 1043, the wireless Base Station 100b stopping communication with the distant Subscriber Stations 777d at the end of the initial operation phase. In step 1044, the wireless Base Station 100b assigning a first subset 533a & 533b of the N radio transceiver chains to a first wireless channel 555a associated with a the first frequency range 710a, and a second subset 533c & 533N of the N radio transceiver chains to a second wireless channel 555K associated with a second frequency range 710K. In step 1045, the wireless Base Station 100b wirelessly communicating data with nearby Subscriber Stations 777n1 & 777n2, over the first 555a and second 555K wireless channels, respectively, via the first subset 553a & 555b and second subset 555c & 555K of the N radio transceiver chains, respectively, thereby utilizing the aggregated spectrum of the first and second frequency ranges to enhance data capability of the wireless Base Station.

An alternative embodiment of the method immediately described further includes using an N-level coherent-phase transmission scheme over the N radio transceiver chains 533a-533N to communicate data wirelessly via the first wireless channel 555a during the initial operation phrase.

A particular configuration of the alternative embodiment of the method described above includes using an N-level combining-algorithm such as Phased-array coherent reception, MRC, MMSE and ML, in order to utilize the aggregated reception capability of the N radio transceiver chains 533a-533N during the initial operation phase.

In a further refinement of the particular configuration of the alternative embodiment of the method described above, further including, when the initial operation phase has ended, stopping use of the N-level coherent-phase transmission scheme and the N-level combining-algorithm, and starting use of MIMO transmission and reception schemes for at least one of the first 555a and second 555K wireless channels.

Figure 17:
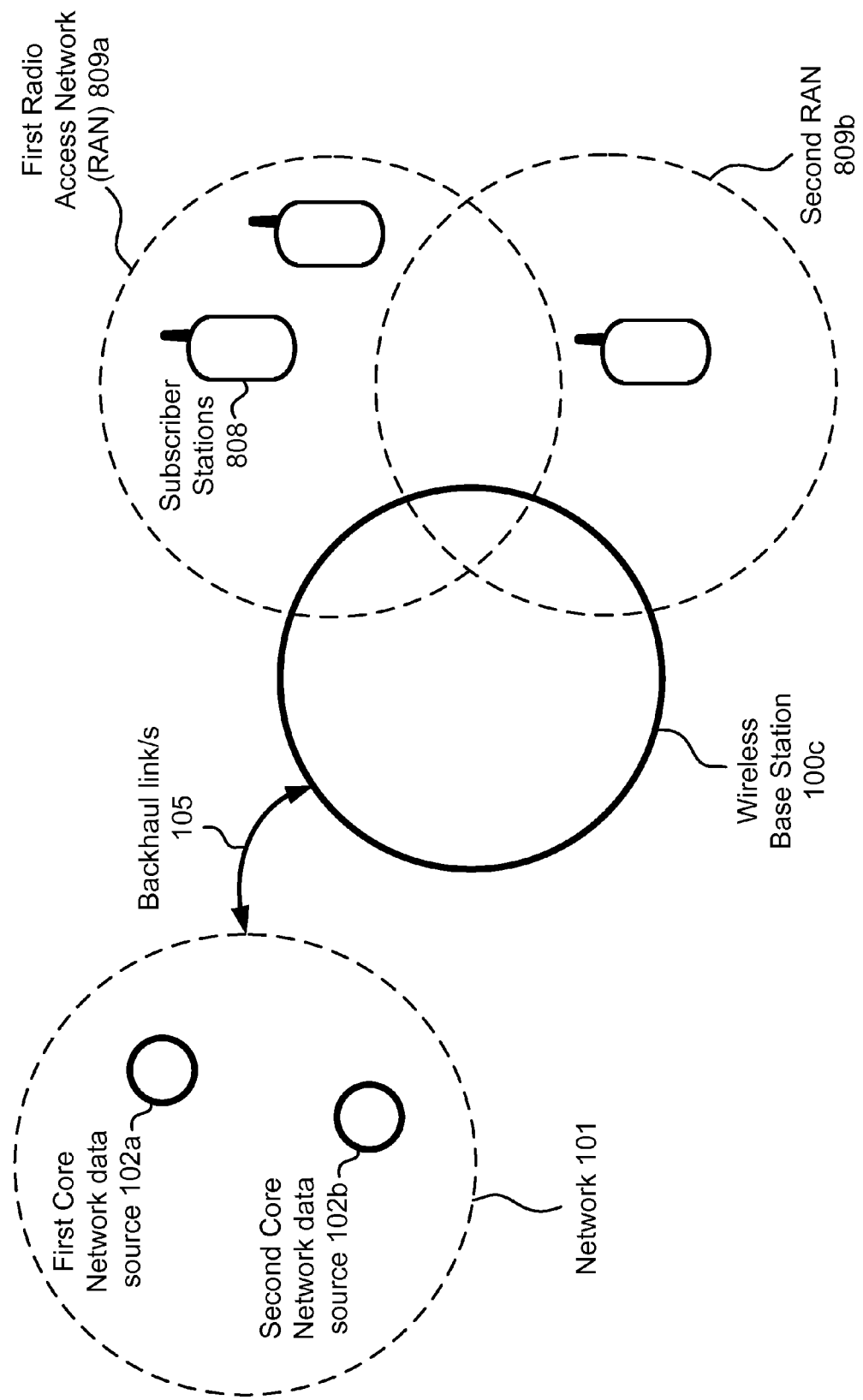
FIG. 17 illustrates one embodiment of components comprising a system for direct communication between multiple Core Networks and a wireless Base Station (BS), and between the wireless BS and multiple Radio Access Networks (RANs)

FIG. 17 illustrates one embodiment of components comprising a system for direct communication between multiple Core Networks and a wireless Base Station (BS), and between the wireless BS and multiple Radio Access Networks (RANs). Wireless Base Station (BS) 100c communicates over a backhaul link 105 and network 101 with a plurality of data sources, including at least a First Core Network data source 102a and a Second Core Network data source 102b. The wireless BS 100c also generates a First Radio Access Network 809a, which includes wireless Subscriber Stations 808, and a Second RAN 809b.

Figure 18A:
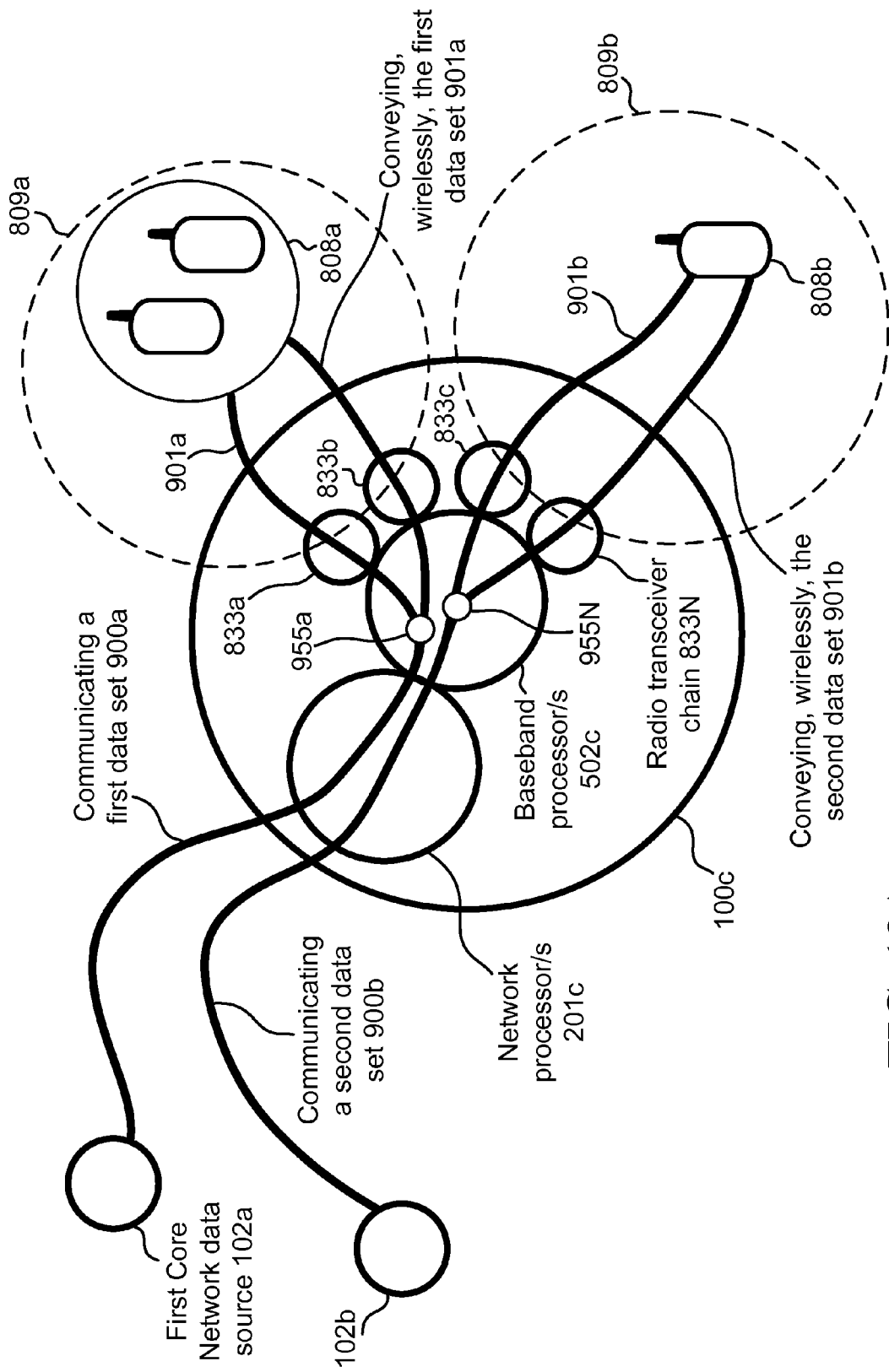
FIG. 18A illustrates one embodiment of components of a system with the potential to dynamically allocate a pool of at least three radio transceiver chains between first and second RANs.

FIG. 18A illustrates one embodiment of a point in time during which two radio transceiver chains have been allocated over one channel to a first RAN, and two other radio transceiver chains have been allocated over a second channel to a second RAN. Wireless Base Station 100c includes one or more network processors 201c, one or more Baseband Processors 502c, and three or more radio transceiver chains 833a, 833b, 833c, and 833N. A First Core Network data source 102a communicates a first data set 900a to the wireless Base Station 100c, which is then processed by the network processor 201c and the Baseband Processor 502c. A Second Core Network data source 102b communicates a second data set 900b to the wireless Base Station 100c, which is then processed by the network process 201c and the Baseband Processor 502c. The Baseband Processor 502c includes a plurality of syntheses of signals, here a first synthesis of signals 955a and a second synthesis of signals 955N. Each synthesis of signals will generate one or multiple signals to be conveyed over one or more radio transceiver networks to a RAN. At the point of time illustrated in FIG. 18A, synthesis 955a creates two signals which wirelessly convey the first data set 901a using each of two radio transceiver chains 833a and 833b, over a first RAN 809a, to a group of Subscriber Stations 808a. Substantially simultaneously, 955N creates two signals that wirelessly convey the second data set 901b using each of two radio transceiver chains 833c and 833N, over a second RAN 809b, to a group of Subscriber Stations 808b.

Figure 18B:
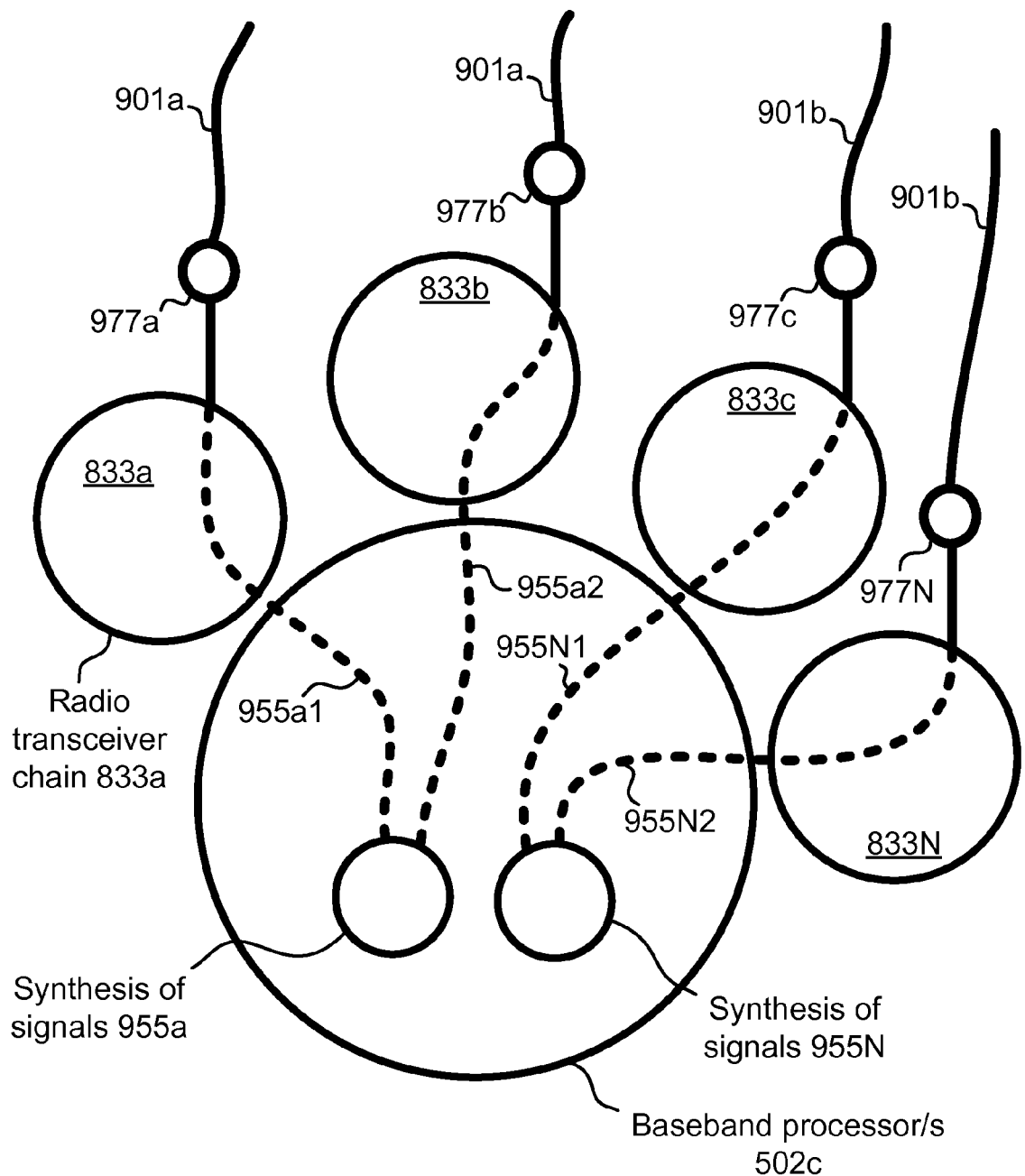
FIG. 18B illustrates one embodiment of a Baseband Processor which has allocated two signals to one wireless channel and two other signals to a second wireless channel.

FIG. 18B presents one embodiment of a Baseband Processor 502c and the associated radio transceiver chains. In FIG. 18B, synthesis of signals 955a creates two signals. One signal, signal 955a1, is conveyed to a radio transceiver chain 833a, then to an antenna 977a, then wirelessly conveying a first data set 901a to a first RAN. A second signal created by 955a is signal 955a2, which is conveyed to a radio transceiver chain 833b, then to an antenna 977b, then wirelessly conveying the first data set 901a to a first RAN. Substantially simultaneously, synthesis of signals 955N creates two signals. One signal, signal 955N1, is conveyed to a radio transceiver chain 833c, then to an antenna 977c, then wirelessly conveying a second data set 901b to a second RAN. A second signal created by 955N is signal 955N2, which is conveyed to a radio transceiver chain 833N, then to an antenna 977N, then wirelessly conveying the second data set 901b to a second RAN.

For FIGS. 18A and 18B, it may be appreciated that there must be at least a plurality of RANs, but there may be two RANs or any other number higher than two. FIGS. 18A and 18B illustrate an embodiment in which there are four radio transceiver chains, but there may be three such chains, four chains, or any number higher than four, provided that each of a plurality of RANs has at least one radio transceiver chain, and at least one of said plurality of RANs has two or more radio transceiver chains at a particular moment in time.

Figure 19A:
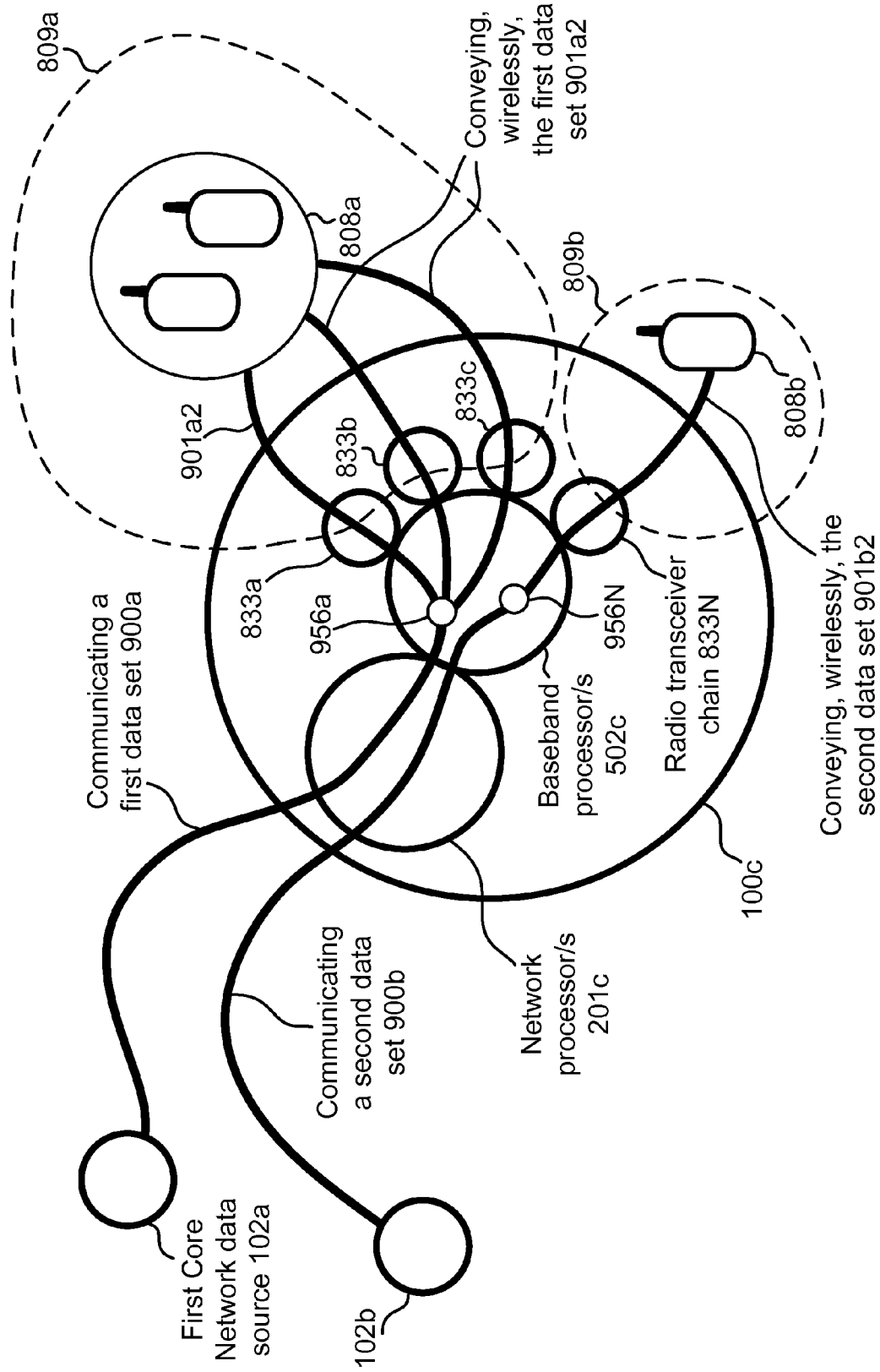
FIG. 19A illustrates one embodiment of components of a system in which a pool of at least three radio transceiver chains has been dynamically reallocated between first and second RANs.

FIG. 19A illustrates one embodiment of a point in time during which three radio transceiver chains have been allocated over one channel to a first RAN, and one other radio transceiver chain has been allocated over a second channel to a second RAN. Wireless Base Station 100c includes one or more network processors 201c, one or more Baseband Processors 502c, and three or more radio transceiver chains 833a, 833b, 833c, and 833N. A First Core Network data source 102a communicates a first data set 900a to the wireless Base Station 100c. A Second Core Network data source 102b communicates a second data set 900b to the wireless Base Station 100c. The Baseband Processor 502c includes a plurality of syntheses of signals, here a first synthesis of signals 956a and a second synthesis of signals 956N. Each synthesis of signals will generate one or multiple signals to be conveyed over one more radio transceiver networks to a RAN. At the point of time illustrated in FIG. 19A, synthesis 956a creates three signals which wirelessly convey the first data set 901a2 using each of three radio transceiver chains 833a, 833b, and 833c, over a first RAN 809a, to a group of Subscriber Stations 808a. Substantially simultaneously, 956N creates one signal that wirelessly conveys the second data set 901b2 using one radio transceiver chain 833N, over a second RAN 809b, to a group of Subscriber Stations 808b.

Figure 19B:
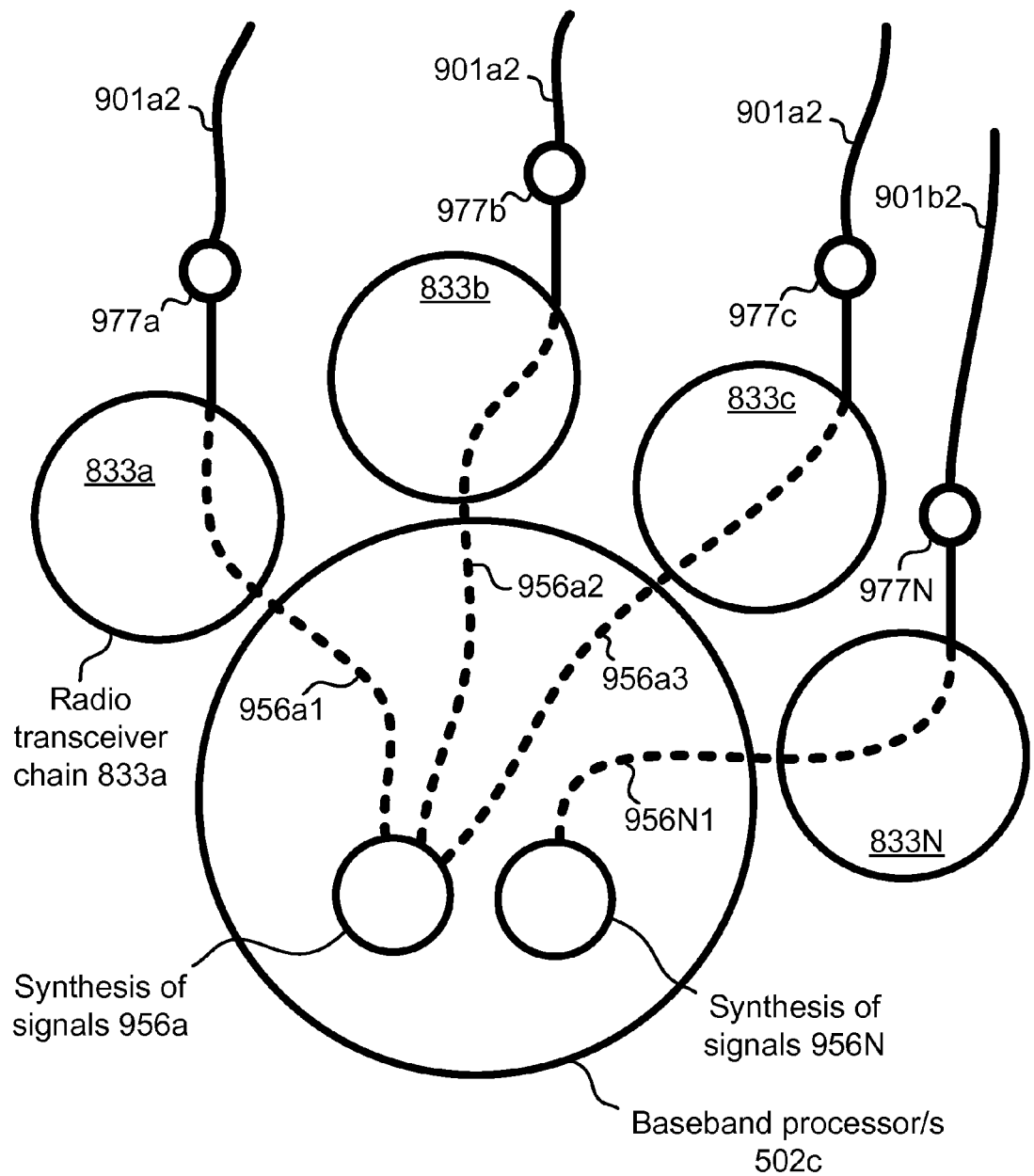
FIG. 19B illustrates one embodiment of a Baseband processor which has allocated three signals to one wireless channel and one other signals to a second wireless channel.

FIG. 19B presents one embodiment of a Baseband Processor 502c and the associated radio transceiver chains. In FIG. 19B, synthesis of signals 956a creates three signals. One signal, signal 956a1, is conveyed to a radio transceiver chain 833a, then to an antenna 977a, then wirelessly conveying a first data set 901a2 over a first RAN. A second signal created by 956a is signal 956a2, which is conveyed to a radio transceiver chain 833b, then to an antenna 977b, then wirelessly conveying the first data set 901a2 over the first RAN. A third signal created by 956a is signal 956a3, which is conveyed to a radio transceiver chain 833c, then to an antenna 977c, then wirelessly conveying the first data set 9901a2 over the first RAN. Substantially simultaneously, synthesis of signals 956N creates one signal, signal 956N1, which is conveyed to a radio transceiver chain 833N, then to an antenna 977N, then wirelessly conveying a second data set 901b2 over a second RAN.

For FIGS. 19A and 19B, it may be appreciated that there must be at least a plurality of RANs, but there may be two RANs or any other number higher than two. FIGS. 19A and 19B illustrate an embodiment in which there are four radio transceiver chains, but there may be three such chains, four chains, or any number higher than four, provided that each of a plurality of RANs has at least one radio transceiver chain, and at least one of said plurality of RANs has two or more radio transceiver chains at a particular moment in time.

FIGS. 18A and 18B illustrate one embodiment of a system at a particular point in time. FIGS. 19A and 19B illustrate one embodiment of the same system at a different point of time. In the first point in time, four radio transceiver chains have been allocated, two chains to each of two RANs. In the second point of time, four radio transceiver chains have been allocated, three chains to a first RAN and one chain to a second RAN.

It may be appreciated that there must be at least three radio transceiver chains in all embodiments. The reason is that all embodiments include (1) at least two operating RANs, and all embodiments include (2) an ability to re-allocate at least one RAN from one Operator to another Operator. As to (1), A radio transceiver chain is part of the infrastructure that creates the RAN, so that a RAN can exist only if at least one radio transceiver chain is allocated to it. Since all embodiments include at least two RANs, and each RAN must have at least one radio transceiver chain, hence every embodiment will include at least two radio transceiver chains to create the at least two RANs. As to (2), all embodiments have the potential to switch at least one radio transceiver chain from one Operator to another Operator, hence every embodiment will include at least three radio transceiver chains. Indeed, FIGS. 18A and 18B show a configuration at one point in time, while FIGS. 19A and 19B show the same system at a different point of time in which one of the radio transceiver chains, 833c, has been re-allocated from the second RAN to the first RAN.

In one embodiment, a wireless Base Station (BS) 100c system is operative to communicate directly with multiple Core Network data sources 102a & 102b on one side and directly provided multiple corresponding Radio Access Networks (RANs) 809*a* and 809*b* on the other side. Such a system may include a network processor 201*c* operative to communicate with a first and a second Core Network data sources 102*a* and 102*b*, at least one Baseband Processor 502*c* operative to create first and second RANs 809*a* & 809*b* substantially simultaneously, and a pool of at least three radio transceiver chains 833*a*, 833*b*, 833*c*, and 833N operative to accommodate the at least one Baseband Processor 502*c* in creating the first and second RANs 809*a* and 809*b* substantially simultaneously. Such a system may allocate dynamically the pool of the at least three radio transceiver chains 833*a*, 833*b*, 833*c*, and 833N, between the first and second RANs 809*a* and 809*b* according to a criterion, reconfigure the at least one Baseband Processor 502*c* to maintain the first and second RANs 809*a* and 809*b* according to the recent allocation, and operate the first and second RANs 809*a* and 809*b* using data communicated with the first and second Core Network data sources 102*a* and 102*b*, respectively.

In one alternative embodiment of such a system, the criterion may be based on dynamic data rate requirements of at least one of the Core Network data sources 102*a* and 102*b*, such that when the dynamic data rate requirements of the first Core Network data source 102*a* exceed the dynamic data rate requirements of the second Core Network data source 102*b*, more radio transceiver chains of those available in the system 833*a*, 833*b*, 833*c*, and 833N, are allocated to the first RAN 809*a* as compared to the second RAN 809*b*. In one configuration of this alternative embodiment, at least one of the radio transceiver chains 833*a*, 833*b*, 833*c*, and 833N that have been allocated to at least one of the RANs 809*a* and 809*b* convey Multiple Input Multiple Output (MIMO) signals 955*a*1 and 955*a*2.

In a second alternative embodiment of the wireless Base Station (BS) 100*c* system operative to directly communicate with multiple Core Network data sources 102*a* & 102*b* on one side and directly provided multiple corresponding Radio Access Networks (RANs) 809*a* and 809*b* on the other side, the criterion is based on measuring data rates over at least one of the RANs 809*a* and 809*b*, such that more of the radio transceiver chains 833*a*, 833*b*, 833*c*, and 833N, are allocated to the first RAN 809*a* as compared to the second RAN 809*b*, as a result of measuring higher data rates over the first RAN 809*a* as compared to the second RAN 809*b*. In one configuration of this alternative embodiment, at least one of the radio transceiver chains 833*a*, 833*b*, 833*c*, and 833N, allocated to at least one of the RANs 809*a* and 809*b* convey Multiple Input Multiple Output (MIMO) signals.

In a third alternative embodiment of the wireless Base Station (BS) 100*c* system operative to directly communicate with multiple Core Network data sources 102*a* & 102*b* on one side and directly provided multiple corresponding Radio Access Networks (RANs) 809*a* and 809*b* on the other side, the criterion is based on system gain requirements of the RANs 809*a* and 809*b*, such that when the first RAN 809*a* requires a higher system gain than the system gain required by the second RAN 809*b*, more radio transceiver chains are allocated to the first RAN 809*a* than to the second RAN 109*b*.

In one configuration of this alternative embodiment, the radio transceiver chains allocated to at least one of the RANs convey signals belonging to a wireless communication scheme selected from a group consisting of Phased-array coherent communication, Maximal Ratio Combining (MRC), Minimum Mean Square Error (MMSE) and Maximum Likelihood (ML).

In a fourth alternative embodiment of the wireless Base Station (BS) 100*c* system operative to directly communicate with multiple Core Network data sources 102*a* & 102*b* on one side and directly provided multiple corresponding Radio Access Networks (RANs) 809*a* and 809*b* on the other side, reconfiguring the at least one Baseband Processor to maintain the first and second RANs 809*a* and 809*b* according to the recent allocation, further includes performing first and a second signal syntheses 955*a* and 955N, or 956*a* and 956N, by the at least one Baseband Processor, in which the first synthesis is associated with the first RAN 809*a* and the second synthesis is associated with the second RAN 809*b*, and in which each sign synthesis creates at least one baseband signal, one of 955*a*1, 955*a*2, 955N1, or 955N2 in FIG. 18B, or one of 956*a*1, 956*a*2, 956*a*3, or 956*a*N in FIG. 19B, according to the allocation of radio transceiver chains among the RANs 809*a* and 809*b*.

There are at least two alternative configurations to the fourth alternative embodiment just described. In one alternative configuration, the first signal synthesis 955*a* or 956*a* synthesizes at least two baseband signals, and the at least two baseband signals belong to a wireless communication scheme selected from a group consisting of Phased-array coherent communication, Maximal Ratio Combining (MRC), Minimum Mean Square Error (MMSE) and Maximum Likelihood (ML).

In a second alternative configuration to the fourth alternative embodiment just described, at least the first signal synthesis 955*a* or 956*a* synthesizes at least two baseband signals, and these at least two baseband signals are Multiple Input Multiple Output (MIMO) signals.

Figure 20:
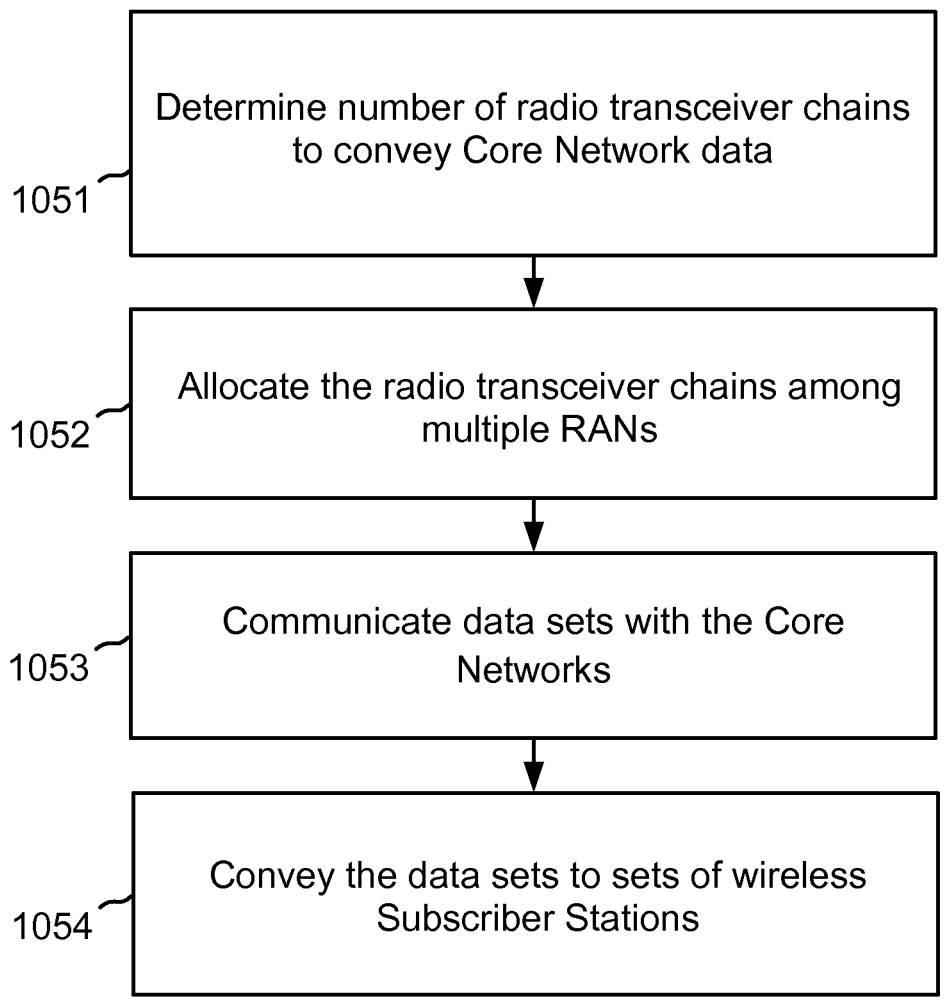
FIG. 20 illustrates one embodiment of the elements of a method for dynamically generating a plurality of Radio Access Networks (RANs) by a single wireless Base Station (BS)

FIG. 20 is a flow diagram illustrating one method for dynamically generating a plurality of Radio Access Networks (RANs) 809*a* & 809*b* by a single wireless Base Station (BS) 100*c*. In step 1051, determining dynamically a first number of radio transceiver chains and a second number of radio transceiver chains needed by a wireless BS 100*c* to convey wirelessly data communicated with a first corresponding Core Network data source 102*a* and a second corresponding Core Network data source 102*b*. In step 1052, allocating the first and the second numbers of radio transceiver chains, out of a pool of radio transceiver chains 833*a*-833N belonging to the wireless BS 100*c*, to a first RAN 809*a* and a second RAN 809*b* of the wireless BS 100*c*, respectively. In step 1053, communicating, by the wireless BS 100*c*, a first and a second data sets with the first Core Network 102*a* and the second Core Network 102*b* data sources respectively. In step 1054, conveying wirelessly, by the wireless BS 100*c*, to a first set 808*a* and a second set 808*b* of wireless Subscriber Stations (SS), the first and the second data sets, over the first and the second RANs respectively.

An alternative embodiment of the method just described, further comprising determining from time to time the first and second numbers of radio transceiver chains needed by the wireless BS 100*c* to convey wirelessly the first and second data sets, and allocating from time to time the first and second numbers of radio transceiver chains.

One possible configuration of the alternative embodiment just described is such alternative embodiment, further comprising determining the first and the second number of radio transceiver chains according to first and second data rate associated with communicating the first and second data sets, respectively. One possible permutation of this configuration further comprises measuring the first and second data rates. A second possible permutation of this configuration further comprises querying the first 102*a* and second 102*b* Core Network data sources for the first and second data rates, respectively.

A second possible configuration of the alternative embodiment just described is said alternative embodiment, wherein at some point in time most of the pool of radio transceiver chains is allocated to the first RAN. One possible permutation of this configuration is the configuration wherein in at some point in time most of the pool of radio transceiver chains is allocated to the second RAN.

A third possible configuration of the alternative embodiment just described is such alternative embodiment, further comprising determining the first and second numbers of radio transceiver chains according to a first distance of Subscriber Stations (SS) from the wireless BS 100c, and a second distance of Subscriber Stations from the wireless BS, respectively.

A second alternative embodiment to the method described is said method, further comprising communicating the first and second data sets with the first 102a and second 102b Core Network data sources using at least one Backhaul link 105.

One possible configuration of this second alternative embodiment is said second alternative embodiment, wherein the at least one Backhaul link 105 comprises a first network Tunnel connecting the first Core Network data source 102a with the wireless BS 100c, and a second network Tunnel connecting the second Core Network data source 102b with the wireless BS 100c. One possible permutation of this configuration of the second alternative embodiment is said second alternative embodiment, in which the wireless BS 100c is an integrated Pico-BS, having the network Tunnels directly connected to the first 102a and second 102b Core Network data sources, and the Pico-BS substantially does not require a dedicated infrastructure to facilitate connectivity with the Core Networks data sources 102a & 102b other than the at least one Backhaul link 105 and an network 101 comprising the Core Network data sources 102a & 102b.

A second possible configuration of the second alternative embodiment is the second alternative embodiment, in which the first data set is communicated over the first Backhaul link and the second data set is communicated over a second Backhaul link.

A third alternative embodiment to the method described is said method, in which the first Core Network data source 102a belongs to a first Operator, the second Core Network data source 102b belongs a second Operator, the first RAN 809a is associated with an identity of the first Operator, and the second RAN 809b is associated with the identity of the second Operator.

Figure 21:
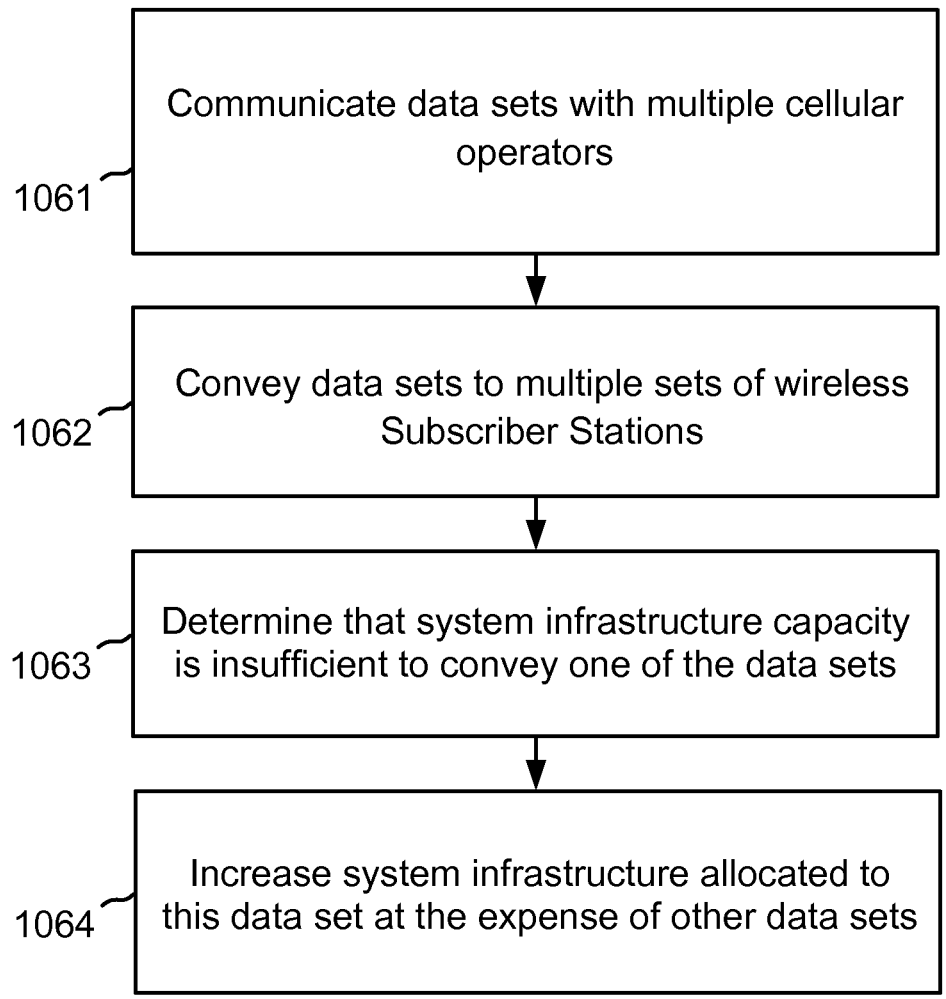
FIG. 21 illustrates one embodiment of the elements of a method for servicing multiple Operators via a single wireless Base Station (BS) utilizing dynamic allocation of radio transceiver chains.

FIG. 21 is a flow diagram illustrating one method for servicing multiple Operators via a single wireless Base Station (BS) 100c, utilizing dynamic allocation of radio transceiver chains. In step 1061, a wireless BS 100c communicating first and second data sets 900a & 900b with a first Core Network data source 102a belonging to a first Operator and with a second Core Network data source 102b belonging to a second Operator, respectively. In step 1062, the wireless BS 100c conveying wirelessly, to a first set and a second set of wireless Subscriber Stations (SS) 808a & 808b, the first and the second data sets, respectively, over a first and a second RAN, respectively 809a & 809b, utilizing a first set 833a & 833b and a second set 833c & 833N of radio transceiver chains, respectively. In Step 1063, determining that the first set of radio transceiver chains is not sufficient to convey the first data set. In Step 1064, increasing the number of radio transceiver chains in the first set, at the expense of the second set, thereby making the first set better suited to convey the first data set.

One alternative embodiment to the method just described is the method, in which increasing the number of radio transceiver chains in the first set further comprises determining the number of radio transceiver chains that can be reduced from the second set of radio transceiver chains without substantially impairing the ability of the second set of radio transceiver chains to convey the second data set, reducing the number of radio transceiver chains from the second set of radio transceiver chains and adding the number of radio transceiver chains to the first set of radio transceiver chains.

A second alternative embodiment to the method for servicing multiple Operators via a single wireless Base Station utilizing dynamic allocation of radio transceiver chains, is such method in which the number of radio transceiver chain in the first set further comprises determining a number of radio transceiver chains to be reduced from the second set of radio transceiver chains and to be added to the first set of radio transceiver chains such that the number of radio transceiver chains is operative to substantially equate the ability of the first set of radio transceiver chains to convey the first data set with the ability of the second set of radio transceiver chains to convey the second data set, reducing the number of radio transceiver chains from the second set of radio transceiver chains, and adding the number of radio transceiver chains to the first set of radio transceiver chains.

Figure 22A:
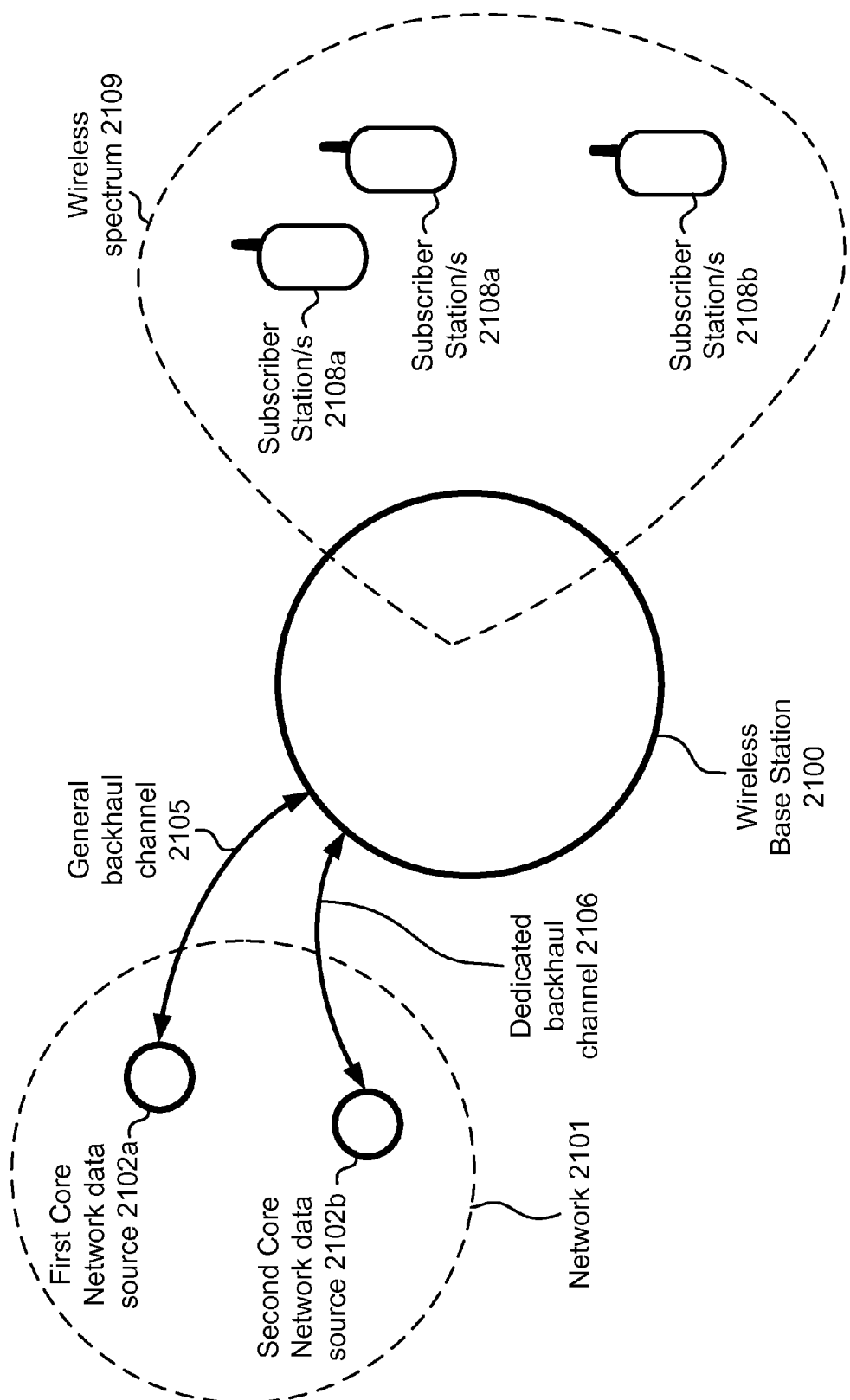
FIG. 22A illustrates one embodiment of components comprising a system to allow wireless Subscriber Stations to roam on the wireless Base Station of a host Operator.

FIG. 22A presents one embodiment of components comprising a system to allow wireless Subscriber Stations to roam on the wireless Base Station of a host Operator. On the one side, there is a First Core Network data source 2102a belonging to a host Operator, and a Second Core Network data source 2102b belonging to a different Operator, in which these data sources are accessed via a Network 2101, which may be the Internet or another network. Element 2102a is connected by general backhaul channel 2105 of the host Operator to a wireless Base Station (BS) 2100 of the host Operator, and element 2102b is connected by a dedicated backhaul channel 2106 of the other Operator to the wireless BS 2100. Subscriber Stations 2018a of the host Operator, and Subscriber Stations of the other Operator 2108b, use wireless spectrum 2109 of the host Operator to communicate with the wireless BS 2100.

Figure 22B:
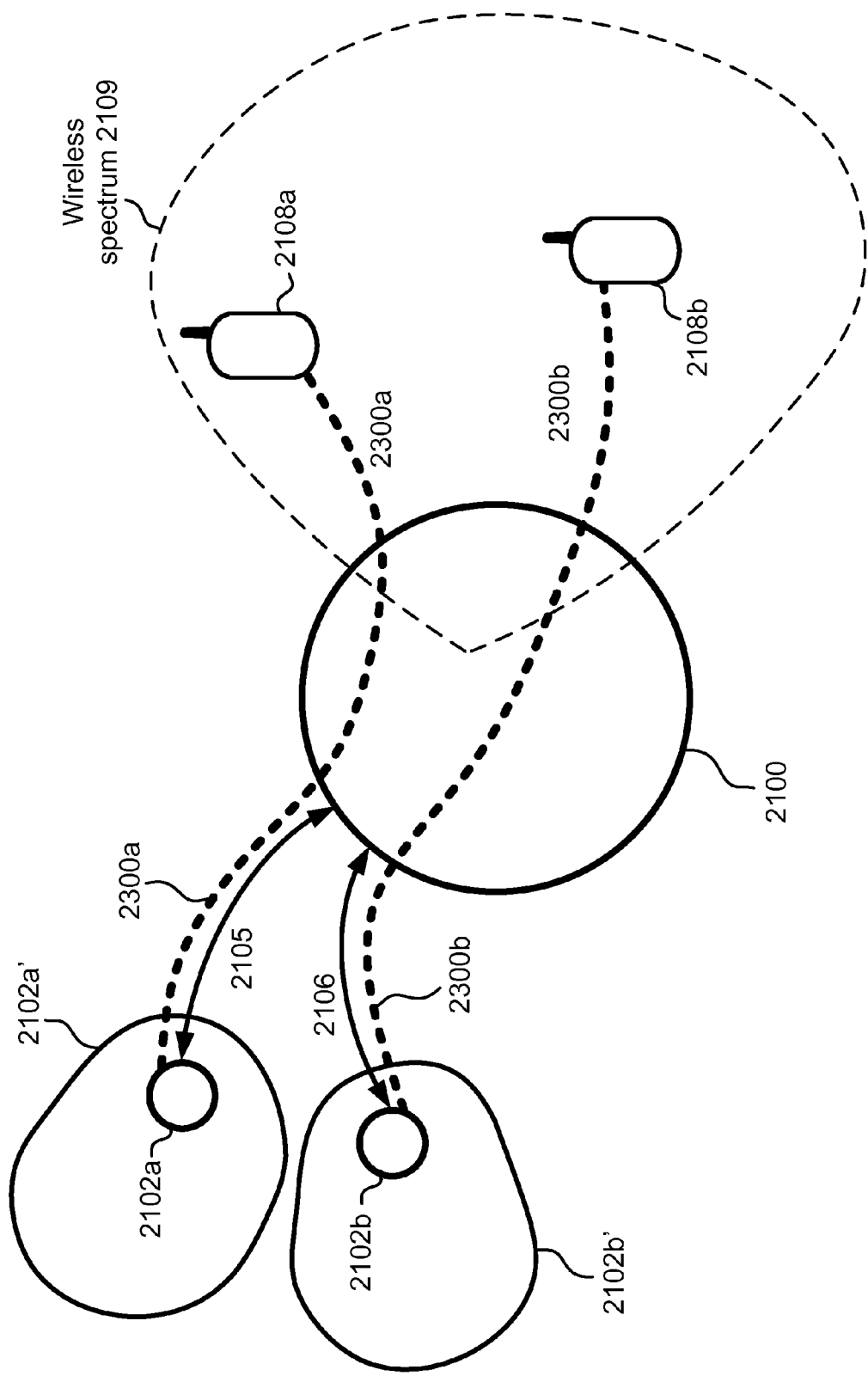
FIG. 22B illustrates an alternative one embodiment of components comprising a system to allow wireless Subscriber Stations to roam on the wireless Base Station of a host Operator.

FIG. 22B presents one embodiment of components comprising a system to allow wireless Subscriber Stations to roam on the wireless Base Station of a host Operator. FIG. 22B presents one embodiment of possible data flow between Subscriber Stations and Core Network data sources. There is one data flow 2300a between a First Core Network data source 2102a belonging to a first (host) Operator 2102a', and a Subscriber Station 2108a associated with the host Operator. Data flows 2300a to and from the data source 2102a over the general backhaul channel 2105, to and from the wireless BS 2100, then over the wireless spectrum 2109 to and from the Subscriber Station of the host Operator 2108a. There is a second data flow 2300b between a Second Core Network data source 2102b belonging to a second Operator 2102b' (the "own Operator" of Subscriber Station 2108b), and a Subscriber Station 2108b associated with the second Operator. Data flows 2300b to and from the data source 2102b over the dedicated backhaul channel 2106, to and from the wireless BS 2100, then over the wireless spectrum 2109 to and from the Subscriber Station of the second Operator 2108b.

Figure 23:
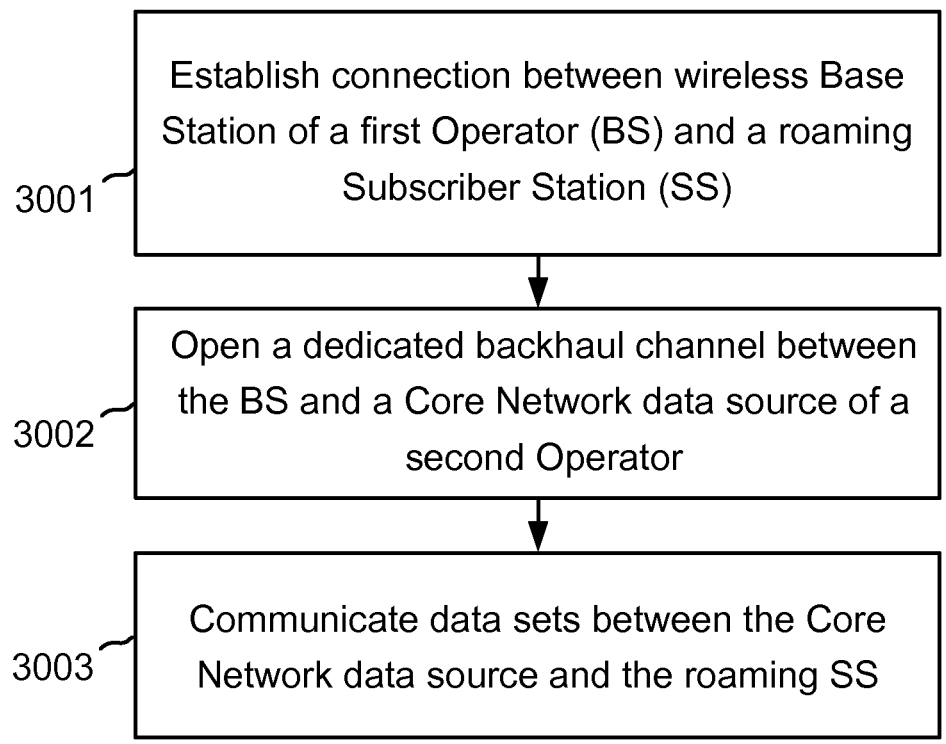
FIG. 23 illustrates one embodiment of the elements of a method for connecting a Subscriber Station (SS) with its own Operator, using a wireless Base Station (BS) belonging to a different Operator (the "host Operator")

FIG. 23 is a flow diagram illustrating one embodiment of the elements of a method for connecting a Subscriber Station (SS) 2108b with its own Operator 2102b', using a wireless Base Station (BS) 2100 belonging to a different Operator (the "host Operator") 2102a'. In step 3001, establishing a wireless connection between (i) a wireless Base Station (BS) 2100 belonging to a first Operator 2102a' (which is the host Operator) and (ii) at least one SS 2108b associated with a second Operator 2102b' (which is not the host Operator), using wireless spectrum 2109 belonging to the first Operator 2102a'. In step 3002, opening a dedicated Backhaul channel 2106 between the wireless BS 2100 of the host Operator 2102a' and a Core Network data source 2102b belonging to the second Operator 2102b', wherein said dedicated Backhaul channel 2106 is used substantially solely for communicating data sets between the second Operator 2012b' and the at least one SS 2108b. In step 3003, communicating data sets between the Core Network data source 2012b of the second Operator 2102b' and the at least one SS 2108b, via (i) the dedicated Backhaul channel 2106 and (ii) the wireless BS 2100 using the wireless spectrum 2109.

In a first possible implementation of the method just described, the opening of the Backhaul channel 2106 is done only after establishing the wireless connection. Among other possible advantages, this eliminates the need to maintain the dedicated Backhaul channel 2106 in a case in which the at least one SS is not connected wirelessly to the wireless BS 2100.

In a second possible implementation of the method just described, opening of the dedicated Backhaul channel 2106 is done prior to establishing the wireless connection. In this way, latency associated with opening the dedicated Backhaul channel as a response to establishing the wireless connection, will be reduced.

In a third possible implementation of the method just described, the dedicated Backhaul channel 2106 is a network Tunnel directly connecting the Second Core Network data source 2102b with the wireless Base Station 2100.

In this third possible implementation of the method just described, one further possible implementation is that the network Tunnel is an Internet Protocol (IP) Tunnel or a Generic Routing Encapsulation (GRE) Tunnel.

In a fourth possible implementation of the method just described, a further step is opening a general Backhaul channel 2105, belonging to the first Operator 2102a' (the host Operator), between the wireless BS 2100 and a Core Network data source 2102a belonging to the first Operator 2102a', prior to opening the general Backhaul channel 2105, wherein said general Backhaul channel 2105 is used substantially solely for communicating data sets between the first Operator 2102a' and Subscriber Stations 2180a associated with the first Operator 2102a'. Also, communicating data sets between the Core Network data source 2102a belonging to the first Operator 2102a' and the Subscriber Stations 2108a associated with the first Operator 2102a', via (i) the general Backhaul channel 2105 and (ii) the wireless BS 2100 using the wireless spectrum 2109, substantially concurrently with communicating data sets between the Core Network data source 2102b belonging to the second Operator 2102b' and the at least one SS 2108b associated with the second Operator 2102b'. In this fourth implementation of the method just described, traffic is separated at the Backhaul level between (i) data sets communicated between the first Operator's Core Network data source 2102a and the first Operator's Subscriber Stations 2108a, and (ii) data sets communicated between the second Operator's Core Network data source 2102b and the second Operator's Subscriber Stations 2108b.

In this fourth possible implementation of the method just described, one further possible implementation is that both Subscriber Stations 2108a associated with the first Operator 2102a', and Subscriber Stations 2108b associated with the second Operator 2102b', are wirelessly connected to the wireless BS 2100, via a single Radio Access Network (RAN) 2209 created by the wireless BS 2100 using the wireless spectrum 2109, thereby creating a traffic union at the RAN level between (i) data sets communicated between the first Operator's Core Network data source 2102a and the first Operator's Subscriber Stations 2108a, and (ii) data sets communicated between the second Operator's Core Network data source 2102b and the second Operator's Subscriber Stations 2108b.

In this fourth possible implementation of the method just described, a second further possible implementation is opening and using the dedicated Backhaul channel 2106 between the Core Network data source of the second Operator 2102b and the wireless BS 2100 of the first Operator 2102a', thereby facilitating partial roaming. In this second further possible implementation of the fourth possible implementation of the method just described, it is possible to eliminate a need of the Subscriber Stations 2108b associated with the second Operator 2102b' to use the Core Network data source 2102a belonging to the first Operator 2102a' or the Core network data sources 2102a belonging to the first Operator 210a'.

In this fourth possible implementation of the method just described, a third further possible implementation is tracking, by the wireless BS 2100, the amount of spectrum resources associated with the wireless spectrum 2109, that are used by the at least one SS 2108b associated with the second Operator 2102b'. Also, sending data gathered during tracking to the second Operator 2102b'. Such data may be used by the first Operator 2102a' to bill the second Operator 2102b' for the partial roaming services provided by the first Operator 2102a'.

In a fifth possible implementation of the method just described, a further step is determining the identity of the second Operator 2102b' prior to establishing the wireless connection. Also, establishing the wireless connection only if the identity of the second Operator 2102b' matches a list of approved Operators. In a sixth possible implementation of the method just described, a further step is determining the identity of the second Operator 2102b' during or after the course of establishing the wireless connection. Also, terminating the wireless connection if the identity of the second Operator 2102b' does not match a list of approved Operators.

Figure 24:
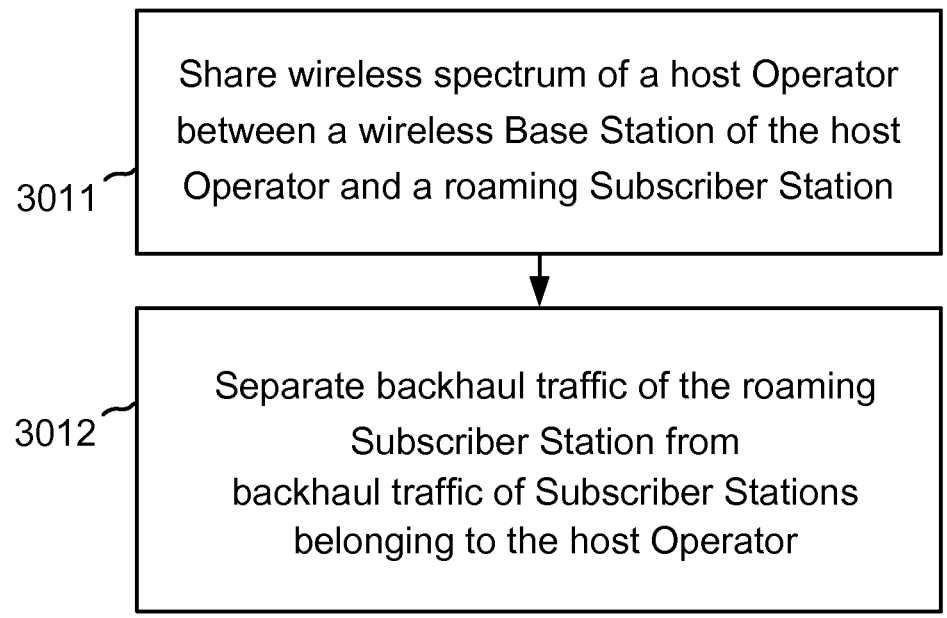
FIG. 24 illustrates one embodiment of the elements of a method for partial roaming of a Subscriber Station on the infrastructure of a host Operator and the infrastructure of its own Operator.

FIG. 24 is a flow diagram illustrating one embodiment of the elements of a method for partial roaming. In step 3011, sharing, by a wireless BS 2100 belonging to a first Operator 2102a', a wireless spectrum 2109 belonging to the first Operator 2102a', with Subscriber Stations 2108a not associated with the first Operator 2102a'. In step 3012, separating, by the wireless BS 2100, at a Backhaul level, traffic of the Subscriber Stations 2108b not associated with the first Operator 2102a' from traffic of Subscriber Stations 2108a associated with the first Operator 2102a', by maintaining at least two separate Backhaul channels, such that a first Backhaul channel 2105 connects the wireless BS 2100 with a Core Network data source 2102a belonging to the first Operator 2102a', and each of the remaining Backhaul channels belonging to another Operator connects the wireless BS 2100 with a Core Network data source belonging to that other Operator, respectively. FIGS. 22A, 22B, and 25C, show exactly two Operators, including a first Operator 2102a' and a second Operator 2102b', but this is illustrative only. In all cases, there will be at least a first Operator 2012a' and at least one other Operator, but there may be two, three, any other number, of other Operators.

In a first possible implementation of the method just described, a further step wherein each Backhaul channel is a network Tunnel, and each network Tunnel directly connects the wireless BS 2100 with the Core Network data source to which the network Tunnel is connected.

In this first possible implementation of the method just described, one further possible implementation is that the network Tunnel is an Internet Protocol (IP) Tunnel or a Generic Routing Encapsulation (GRE) Tunnel.

In a second possible implementation of the method just described, tracking, by the wireless BS 2100, the amount of spectrum resources associated with the wireless spectrum 2109, which are used by Subscriber Stations 2180b not associated with the first Operator 2102a'. Also, sending data gathered during tracking to Operators associated with Subscriber Stations 2108b not associated with the first Operator 2102a', wherein said gathered data may be used by the first Operator 2102a' to bill the Operators associated with Subscriber Stations 2108b not associated with the first Operator 2102a'.

In a third possible implementation of the method just described, a further step is determining the identity of Operators associated with the Subscriber Stations 2108b not associated with the first Operator 2102a prior to establishing a wireless connection between the wireless BS 2100 and the Subscriber Stations 2108b not associated with the first Operator 2102a'. Also, establishing a wireless connection for Subscriber Stations associated with a particular Operator only if the identity of that particular Operator matches a list of approved Operators.

In a fourth possible implementation of the method just described, a further step is determining the identity of Operators associated with the Subscriber Stations 2108b not associated with the first Operator 2102a' after establishing a wireless connection between the wireless BS 2100 and the Subscriber Stations 2108b not associated with the first Operator 2102a'. Also, terminating the wireless connection for Subscriber Stations associated with a particular Operator if the identity of that particular Operator does not match a list of approved Operators.

In one embodiment, there is a system that allows partial roaming. The system includes a First Core Network data source 2102a belonging to a first Operator 2102a', and a Second Core Network data source 2102b belonging to a second Operator 2102b'. The system also includes a wireless BS 2100 belonging to the first Operator 2102a', operative to communicate with a first set of Subscriber Stations 2108b associated with a second Operator 2102b', over a wireless spectrum 2109 belonging to the first Operator 2102a'. In one embodiment, the system transports traffic over a general Backhaul channel 2105 connecting the wireless BS 2100 to the First Core Network data source 2102a, between the first set of Subscriber Stations 2108a and the First Core Network data source 2102a. The system also transports traffic over a dedicated Backhaul channel 2106 connecting the wireless BS 2100 to the Second Core Network data source 2102b, between the second set of Subscriber Stations 2108b and the Second Core Network data source 2102b.

In one alternative embodiment of the system allowing partial roaming, just described, each Backhaul channel is a network Tunnel directly connecting the respective Core Network data source with the wireless BS 2100 of the first Operator 2102a'. If there are Subscriber Stations associated with two Operators, for example, then the general Backhaul channel 2105 connecting the First Core Network data source 2102a to the first set of Subscriber Stations 2108b is one network Tunnel, and the dedicated Backhaul channel 2106 connecting the Second Core Network data source 2102b to the second set of Subscriber Stations 2108b is a second network Tunnel.

In a first alternative embodiment to the embodiment in which the Backhaul channels are network Tunnels, each network Tunnel is an Internet Protocol (IP) Tunnel or a Generic Routing Encapsulation (GRE) Tunnel.

In a first alternative embodiment to the embodiment in which the Backhaul channels are network Tunnels, at least two of the network Tunnels are transported over a single physical Backhaul link.

In a second alternative embodiment of the system allowing partial roaming, described above, each Backhaul channel is a separate physical Backhaul link.

In a third alternative embodiment of the system allowing partial roaming, described above, the system tracks the wireless spectrum resources used by the set of Subscriber Stations 2108b associated with the second Operator 2102b'. Also, data collected during the tracking process is sent to the second Operator 2102b', and such data may be used by the first Operator 2102a' to bill the second Operator 2102b' for the partial roaming services provided by the first Operator 2102a' to Subscriber Stations 2108b associated with the second Operator 2102b'.

In a fourth alternative embodiment of the system allowing partial roaming, described above, the system determines the identity of the second Operator 2102b' prior to establishing a wireless connection between the wireless BS 2100 and at least one of the second set of Subscriber Stations 2108b. Also, the system allows communication with such Subscriber Station 2108b, only if the Operator 2102b' with whom the Subscriber Station 2108b is associated, appears on a list of Operators approved to receive roaming services from the first Operator 2102a'.

In a fifth alternative embodiment of the system allowing partial roaming, described above, the system determines the identity of the second Operator 2102b' after establishing a wireless connection between the wireless BS 2100 of the first Operator 2102a' and at least one of the second set of Subscriber Stations 2108b. Also, the system stops communication with such Subscriber Station 2108b, if the Subscriber Station 2108b is associated with an Operator 2102b' who does not appear on a list of Operators approved to receive roaming services from the first Operator 2102a'.

Figure 25A:
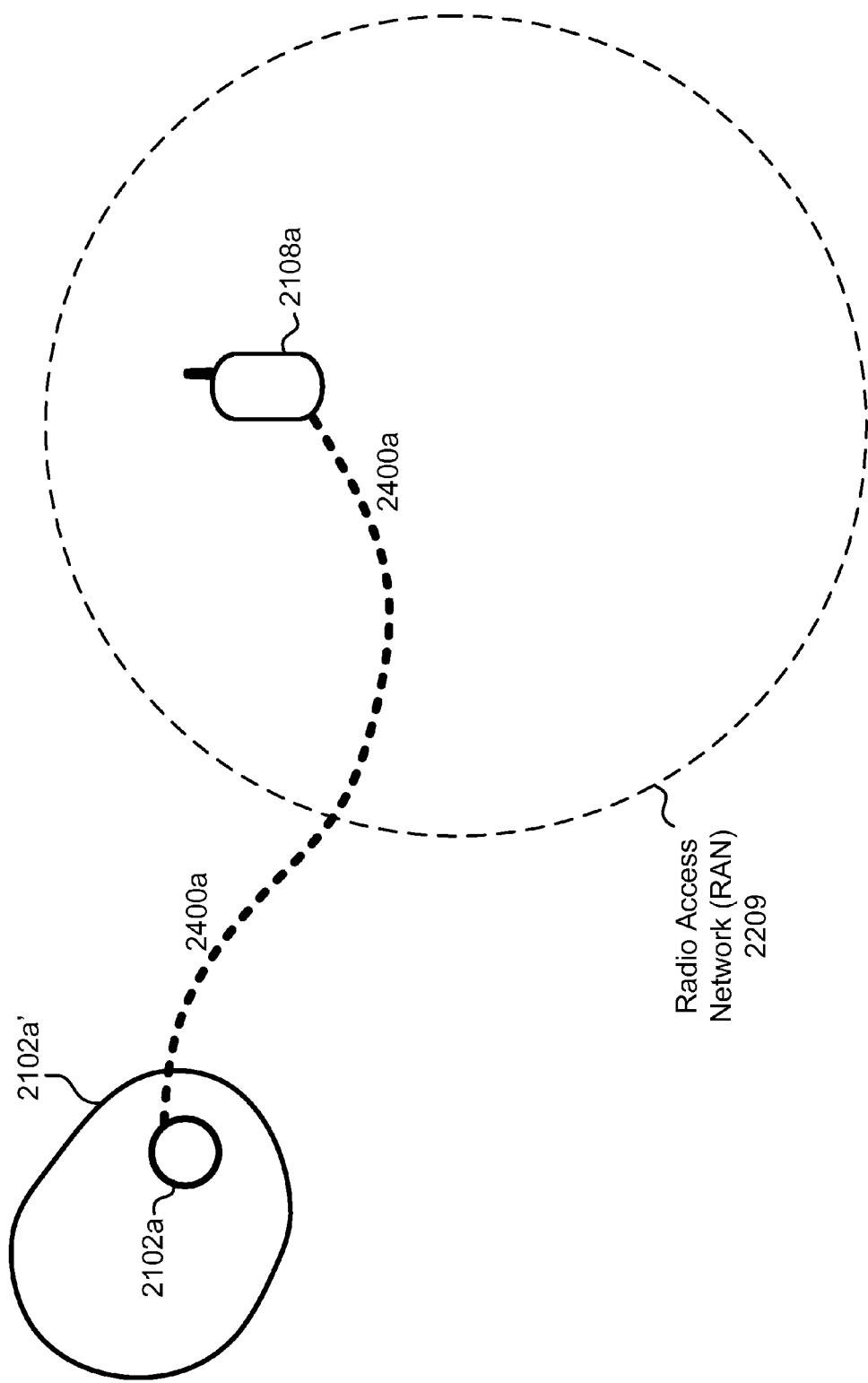
FIG. 25A illustrates one embodiment of components comprising a system by which Subscriber Stations associated with an Operator communicate with a Core Network data source of that Operator.

FIG. 25A presents one embodiment of components of the state of a communication that allows partial roaming. There is a First Core Network data source 2102a which is part of the system of a first Operator 2102a'. Sets of data are transmitted 2400a between the First Core Network data source 2102a, via a Radio Access Network (RAN) 2209 of the First Operator 2102a', to one or more Subscriber Stations 2108a associated with the First Operator 2102a'. Although the system presented in FIG. 25A allows partial roaming, there is no roaming in the state shown in FIG. 25A.

Figure 25B:
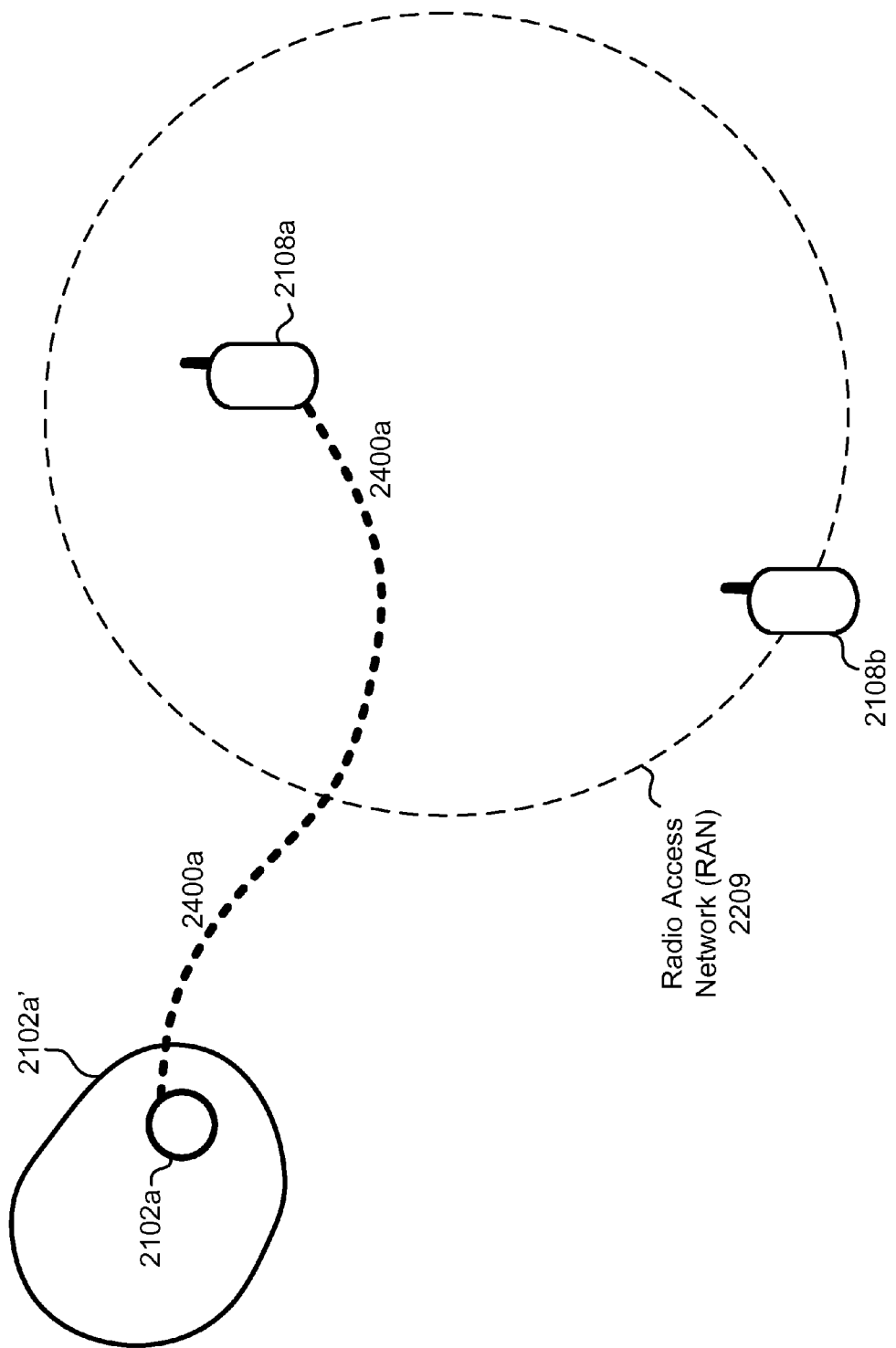
FIG. 25B illustrates one embodiment of components comprising a system in which a Subscriber Station associated with a different Operator requests access to the Radio Access Network (RAN) of a host Operator.
Figure 25C:
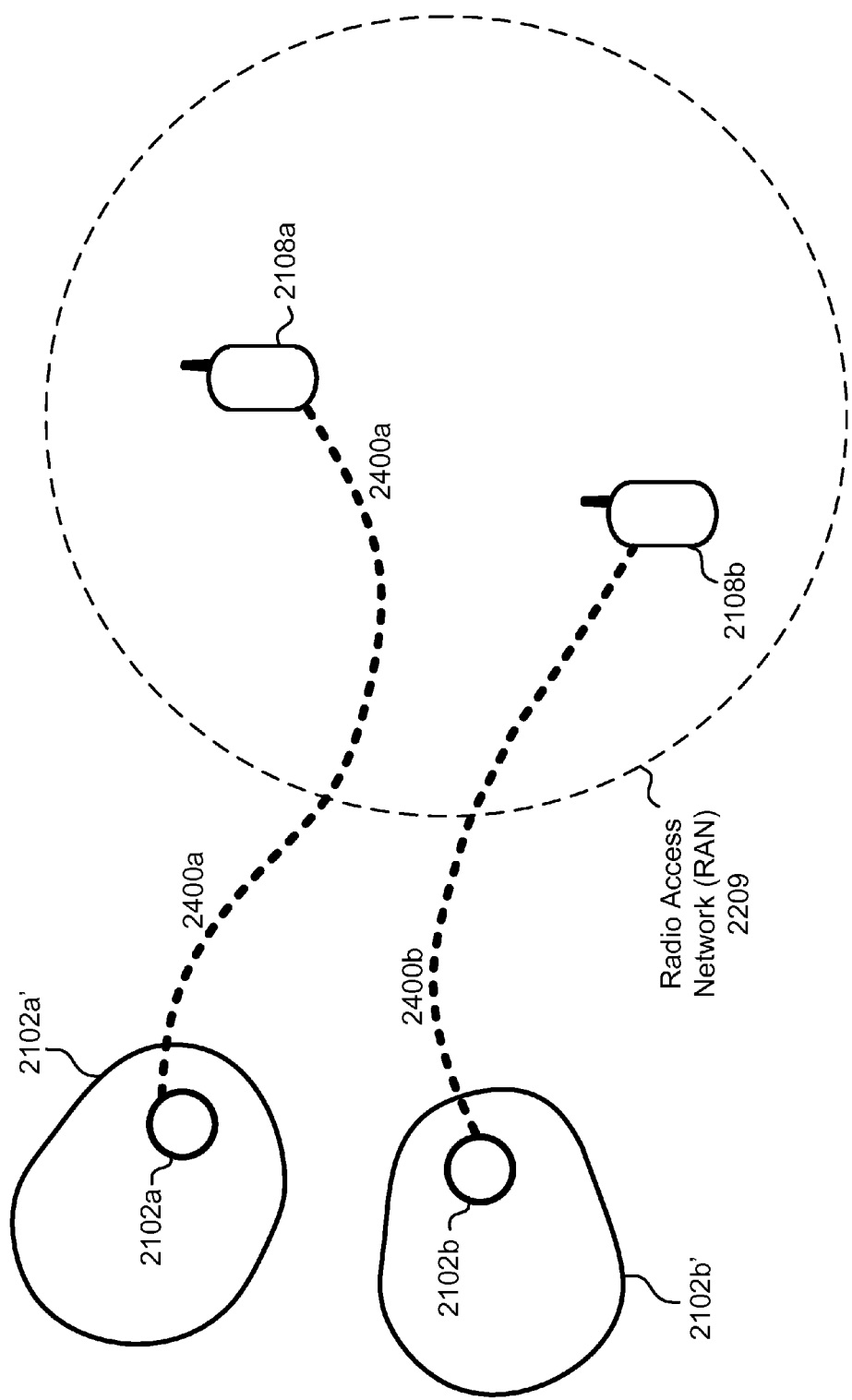
FIG. 25C illustrates one embodiment of components comprising a system in which the Subscriber Access that requested access to the RAN of a host Operator has been admitted to the RAN of the host Operator.

FIG. 25B presents one embodiment of components of the same system as presented in FIG. 25A, except that the state of the system is different. In FIG. 25B, one or more Subscriber Stations 2108b not associated with the First Operator 2102a' request access to the First Operator's RAN 2209.

FIG. 25C presents one embodiment of components of the same system as presented in FIGS. 25A and 25B, except that the state of the system is different. In FIG. 25C, one or more Subscriber Stations 2108b not associated with the First Operator 2102a' have been allowed access to the RAN 2209 of the First Operator 2102a'. In this state of the system, there is a Second Core Network data source 2102b, which belongs to a second Operator 2102b'. The Subscriber Station 2108b that is not associated with the First Operator 2012a', is associated with the Second Operator 2102b'. Sets of data are transmitted 2400b between the Second Core Network data source 2102b, via the RAN 2209 belonging to the First Operator 2102a', and the Subscriber Station 2108b associated with the Second Operator 2102b'.

Figure 26:
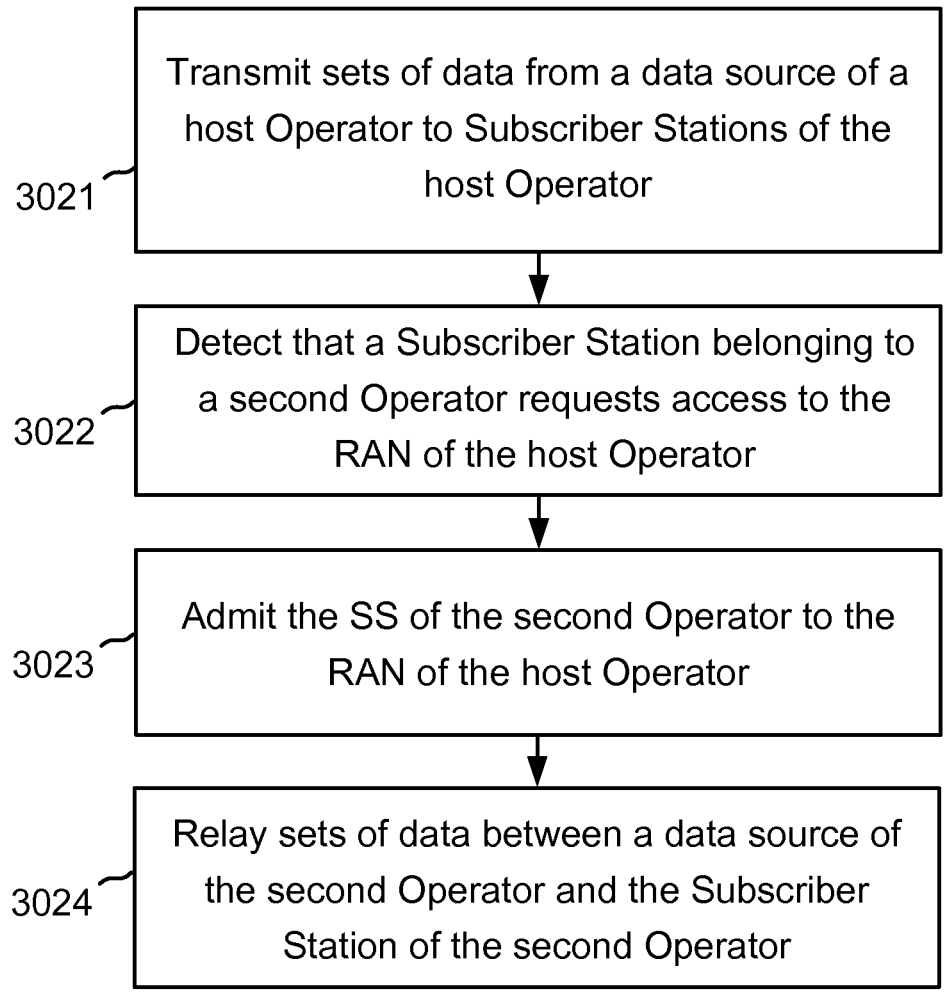
FIG. 26 illustrates one embodiment of the elements of a method for partial roaming of a Subscriber Station on the infrastructure of a host Operator and on the infrastructure of an Operator with whom the Subscriber Station is associated.

FIG. 26 is a flow diagram illustrating one embodiment of the elements of a method for partial roaming. In step 3021, transmitting 2400a sets of data from a data source 2102a of the host Operator 2102a' to Subscriber Stations 2108a of the host Operator 2102a'. In particular, transmitting 2400a sets of data by a first Operator 2102a' (also known as the host Operator), from a Core Network data source 2102a belonging to the first Operator 2102a', to a first set of Subscriber Stations 2108a associated with the first Operator 2102a', over a Radio Access Network (RAN) 2209 belonging to the first Operator 2102a'. In step 3022, detecting that a Subscriber Station 2108b associated with a second Operator 2102b' is requesting access to the RAN 2209 of the host Operator 2102a'. In step 3023, admitting the Subscriber Station 2108b associated with the second Operator 2108b', to the RAN 2209 of the host Operator 2102a'. In 3024, relaying by the RAN 2209 of the first Operator 2102a', sets of data transmitted 2400b by a Core Network data source 2102b belonging to the second Operator 2102b', to one or more Subscriber Stations 2108b associated with the second Operator 2102b'.

Figure 27A:
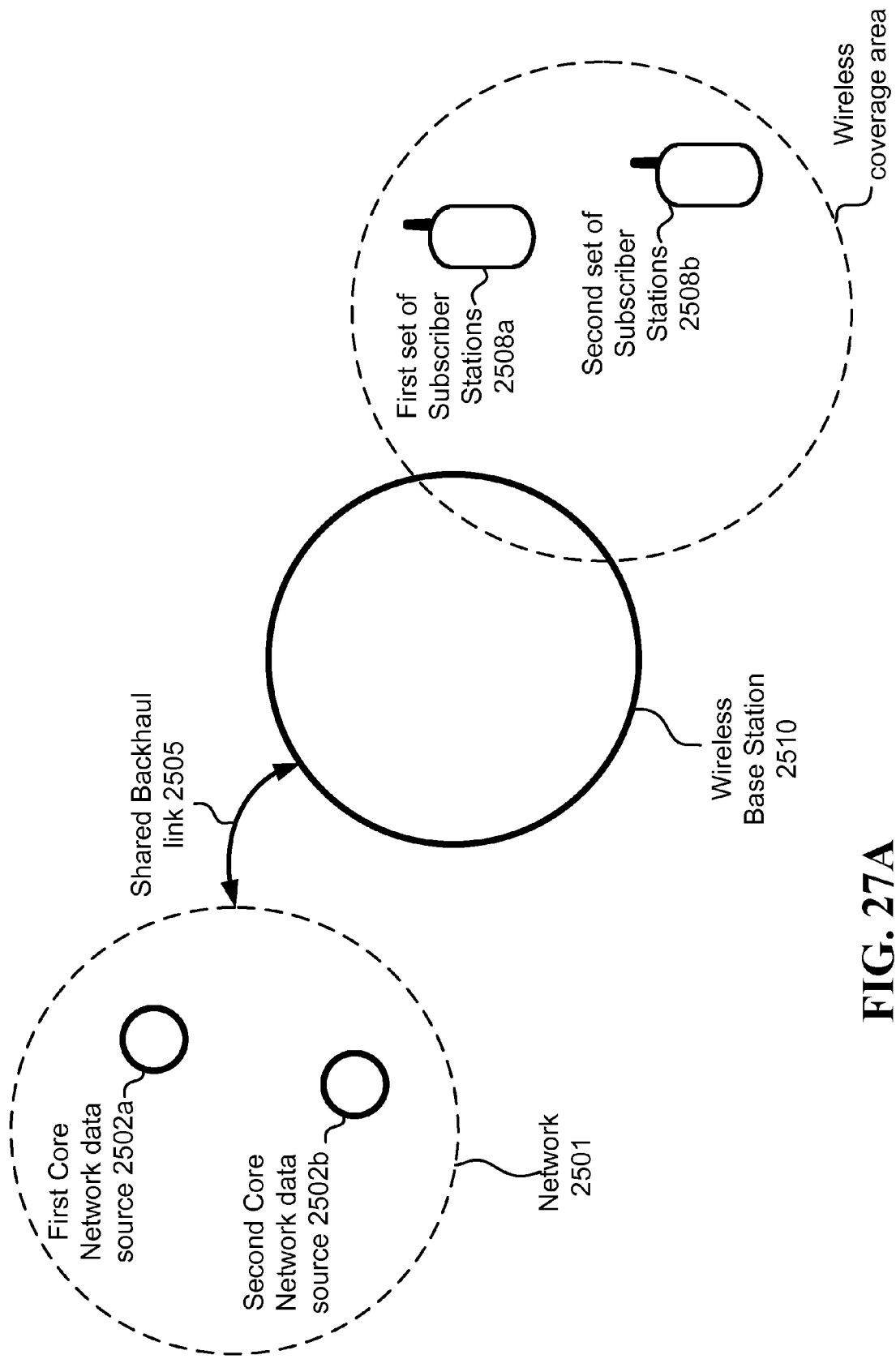
FIG. 27A illustrates one embodiment of components comprising a system in which multiple Operators use a shared Backhaul link.

FIG. 27A presents one embodiment of components of a system in which Subscriber Stations (SS) 2508a and 2508b operating in one wireless coverage area associated with different Operators share one wireless Base Station (BS) 2510, and one shared Backhaul link 2505. In this way, the first set of Subscriber Stations 2508a communicates with the First Core Network data source 2502a of a first Operator, and the second set of Subscriber Stations 2508b communicates with the Second Core Network data source 2502b of a second Operator, all over the same shared Backhaul link 2505 and wireless BS 2510 infrastructure. The wireless BS 2510 may belong to the first Operator, or to the second Operator, or to another Operator not communicating on the system, or to a non-Operator entity. Similarly, the shared Backhaul link 2505, which is shared by both Core Network data sources 2502a and 2502b, as well as by the multiple sets of Subscriber Stations 2508a and 2508b, may belong to the first Operator, or to the second Operator, or to another Operator not communicating on the system, or to a non-Operator entity. FIG. 27a presents two Core Network data sources and two sets of Subscriber Stations, but it will be appreciated that there may be any number of data sources and any number of sets of Subscriber Stations. By way of example, but not by way of limitation, the shared Backhaul link 2505 may be a fiberoptic channel, or a cable, or microwave link, or a satellite data-link, or another wireless link.

Figure 27B:
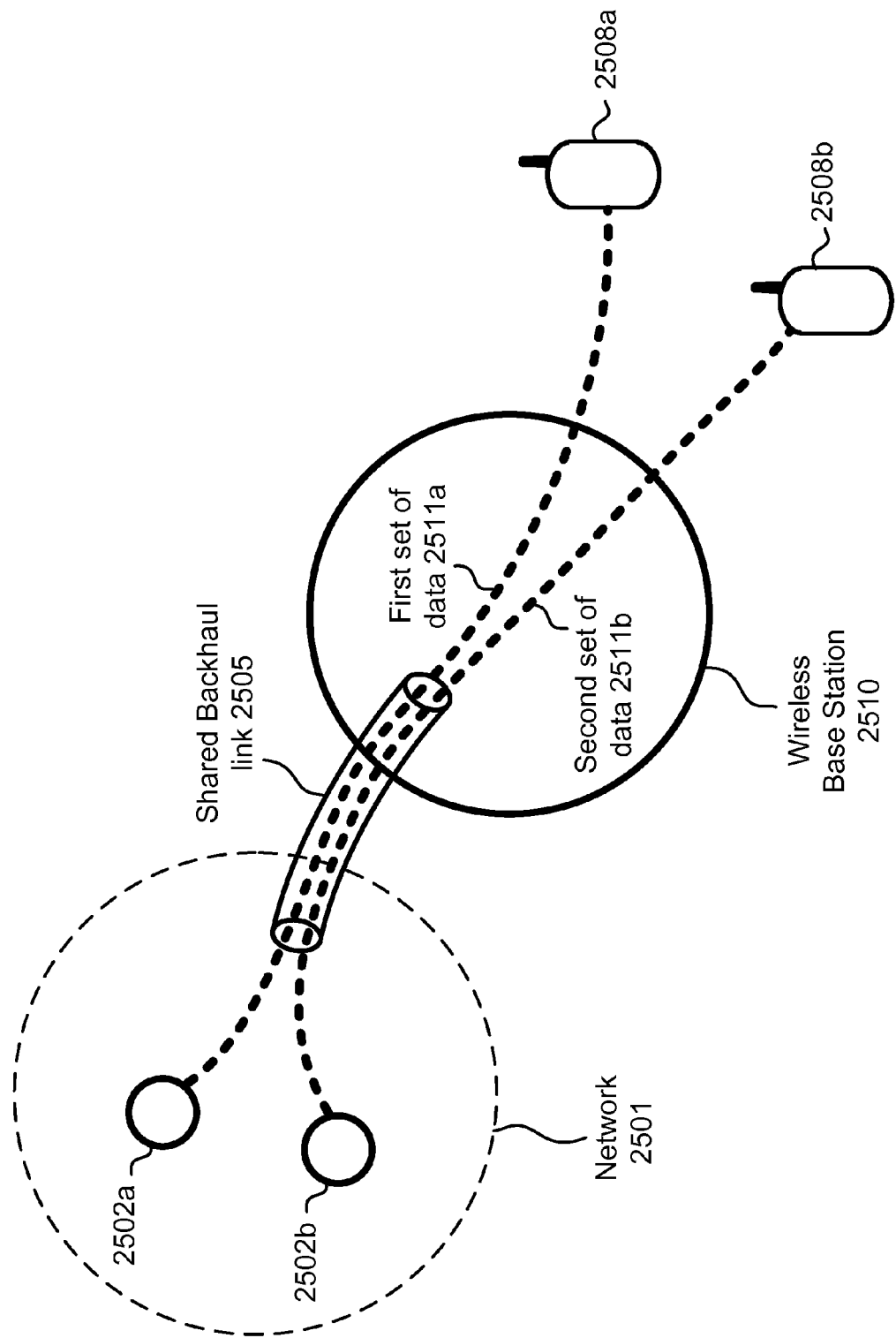
FIG. 27B illustrates one embodiment of components comprising a system in which multiple Operators use a shared Backhaul link, showing the communication paths of multiple sets of data.

FIG. 27B also presents one embodiment of components of a system in which Subscriber Stations (SS) 2508a and 2508b operating in one wireless coverage area associated with different Operators share one wireless Base Station (BS) 2510, one shared Backhaul link 2505, and one network 2501. In FIG. 27B, however, there are clearly two separate data paths, indicated by the dotted lines 2511a and 2511b, where first set of data 2511a depicts communication between 2502a and 2508a, whereas second set of data 2511b depicts communication between 2502b and 2508b, wherein both data sets of data communicate over 2505 and 2510.

In one embodiment, there is a system for effectively sharing resources of a shared Backhaul link 2505. The system may include a shared Backhaul link 2505. The system may include a wireless Base Station (BS) 2510 operative to receive from a first Core Network data source 2502a and a second Core Network data source 2502b, belonging to first and second Operators, respectively, first and second sets of data, respectively, via the shared Backhaul link 2505 connected to the wireless BS 2510. The wireless BS is also operative to convey wirelessly the first and second sets of data, to a first set of Subscriber Stations 2508a and a second set of Subscriber Stations 2508b, said sets of Subscriber Stations associated with the first and second Operators, respectively. The system may be configured to control the rates at which the first and second sets of data are received by the wireless BS 2510, such that overloading of the shared Backhaul link 2505 is prevented.

In one alternative embodiment of the system embodiment just described, control of the rates is done by the wireless BS 2510, and the wireless BS 2510 effects such control by using packet shaping techniques applied at the wireless level.

In a second alternative embodiment to the system embodiment just described, control of the rates is done by the wireless BS 2510, and the wireless BS 2510 effects such control by using packet shaping techniques applied at the shared Backhaul link 2505 level.

Figure 28:
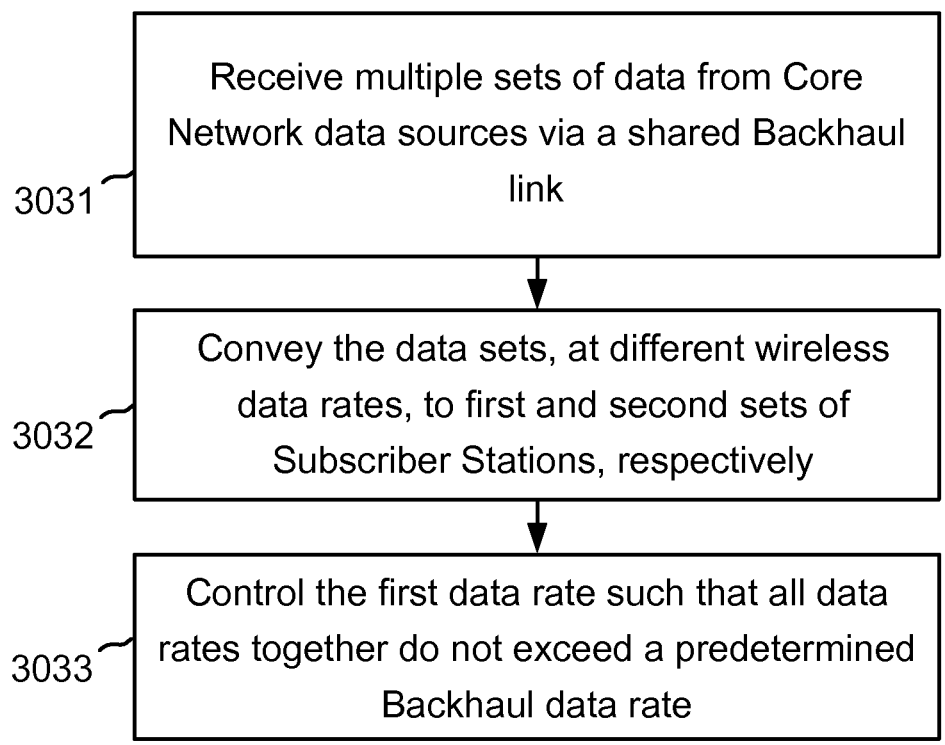
FIG. 28 illustrates one embodiment of the elements of a method for a plurality of Operators sharing a Backhaul link, in which data rates between Core Network data sources and sets of Subscriber Stations are controlled such that the shared Backhaul link is not overloaded.

FIG. 28 is a flow diagram illustrating one embodiment of the elements of a method for effectively utilizing a shared Backhaul link 2505 of a wireless Base Station (BS) 2510 servicing a plurality of Operators. In step 3031, receiving, by a wireless BS 2505, from first and second Core Network data sources 2502a & 2502b, belonging to first and second Operators, respectively, first and second sets of data 2511a & 2511b, respectively, via a shared Backhaul link 2505, and connected to the wireless BS 2510. In step 3032, conveying wirelessly, by the wireless BS 2510, the first and second sets of data 2511a & 2511b, to first and second sets of Subscriber Stations 2508a & 2508b, associated with the first and second Operators, respectively, at first and second wireless data rates, respectively. The first and second rates may be the same or different, and either or both of the rates may change over time.

In a first possible implementation of the method just described, the sets of data 2511a & 2511b are packetized, and controlling the first wireless data rate is done by the wireless BS 2510 using packet shaping techniques.

In a second possible implementation of the method just described, controlling the first wireless data rate is done by limiting the number of Subscriber Stations in the first set of Subscriber Stations 2508a.

In a third possible implementation of the method just described, controlling the first wireless data rate is done by limiting the rate at which at least one of the Subscriber Stations in the first set of Subscriber Stations 2508a communicates data with the wireless BS 2510.

In a fourth possible implementation of the method just described, the first wireless data rate is limited to a predetermined level that is lower than the predetermined Backhaul data rate, and the predetermined level of the first wireless data rate is increased if such predetermined level and the second wireless data rate together do not exceed the predetermined Backhaul data rate.

In a fifth possible implementation of the method just described, the predetermined Backhaul data rate is a maximum rate at which the shared Backhaul link 2505 is operative to transport data.

In a sixth possible implementation of the method just described, the predetermined Backhaul data rate is between 60 percent and 90 percent of a maximum rate at which the shared Backhaul link 2505 is operative to transport data.

In a seventh possible implementation of the method just described, the first set of data 2511a is transported from the first Core Network data source 2502a to the wireless BS 2510 via a first network Tunnel extending from the first Core Network data source 2502a to the wireless BS 2510, and the second set of data 2511b is transported from the second Core Network data source 2502b to the wireless BS 2510 via a second network Tunnel extending from the second Core Network data source 2502b to the wireless BS 2510, wherein both the first and the second network Tunnels are transported, at least in part, over the shared Backhaul link 2505.

In this seventh possible implementation of the method described above for effectively utilizing a shared Backhaul link 2505 of a wireless BS 2510 servicing a plurality of Operators, a further possible implementation is that at least one of the network Tunnels is of a type selected from a group consisting of an Internet Protocol (IP) Tunnel and a Generic Routing Encapsulation (GRE) Tunnel In an eighth possible implementation of the method just described, the system tracks a first rate at which the first set of data 2511a is received by the wireless BS 2510, and the first Operator is billed according to the results of the tracking.

In this eighth possible implementation of the method described above for effectively utilizing a shared Backhaul link 2505 of a wireless BS 2510 servicing a plurality of Operators, a further possible implementation includes tracking a rate at which the second set of data 2511a is received by the wireless BS 2510, and billing the second Operator according to the results of the tracking.

In a ninth possible implementation of the method just described, the second wireless data rate is controlled such that the first set of data 2511a and the second set of data 2511b received via the shared Backhaul link 2505 together substantially do not exceed a predetermined Backhaul data rate. In this ninth possible implementation of the method described above for effectively utilizing a shared Backhaul link 2505 of a wireless BS 2510 servicing a plurality of Operators, a further possible implementation includes increasing the first data rate 2511a at the expense of the second wireless data rate 2511b, such that the first and second sets of data 2511a & 2511b received via the wireless Backhaul link 2505 together still substantially do not exceed the predetermined Backhaul data rate.

Figure 29:
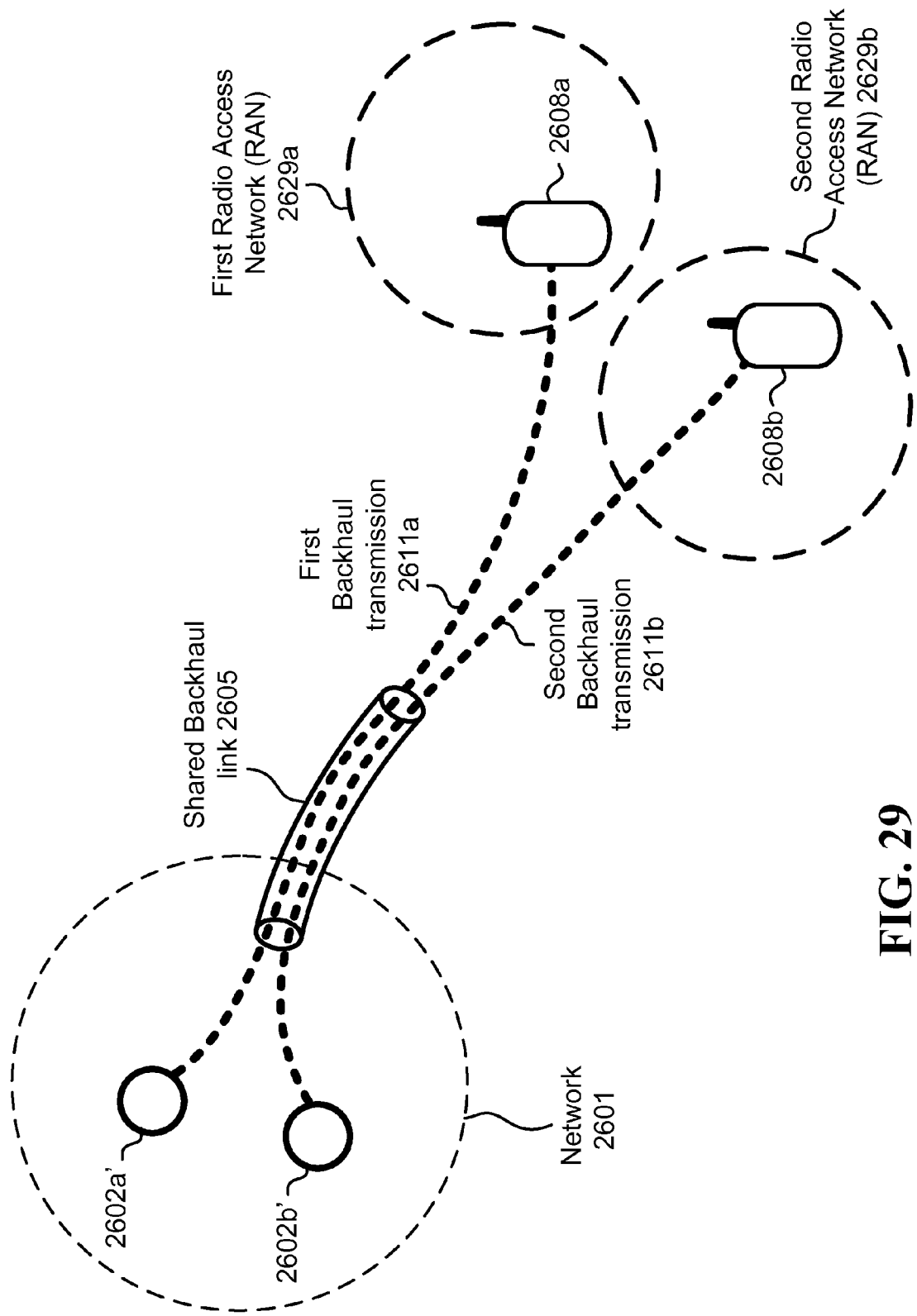
FIG. 29 illustrates one embodiment of components comprising a system in which multiple Operators use a shared Backhaul link, and in which each of multiple Random Access Networks services a set of Subscriber Stations associated with a particular Operator.

FIG. 29 is an alternative embodiment of FIG. 27A, similar to FIG. 27A except that in FIG. 29, there are multiple Radio Access Networks (RANs), servicing multiple sets of Subscriber Stations. The system endpoints in FIG. 29 are network 2601, and the RANs including first RAN 2629a and second RAN 2629b. Within network 2601, there is a first Core Network data source 2602a' and a second Core Network data source 2602b'. Within the first RAN 2629a is a first set of Subscriber Stations 2608a, while in the second RAN 2629b is a second set of Subscriber Stations 2608b. Communication between the Core Network data sources and the RANs, occurs over a shared Backhaul link 2605, in which communication between the first Core Network data source 2602a' and the first RAN 2629a occurs via a first Backhaul transmission 2611a, whereas the communication between the second Core Network data source 2602b' and the second RAN 2629b occurs via a second Backhaul transmission 2611b.

Figure 30:
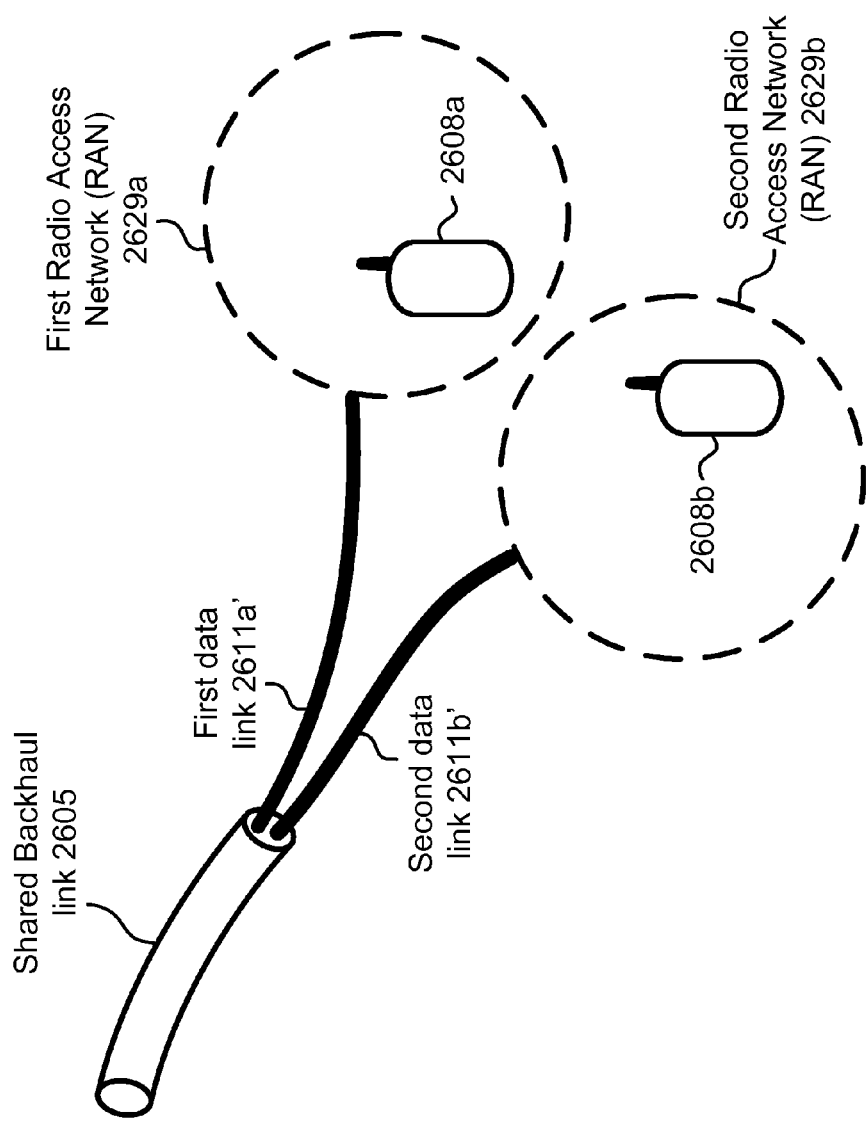
FIG. 30 illustrates one embodiment of components comprising a system in which multiple Operators use a shared Backhaul link, in which each of multiple Random Access Networks services a set of Subscriber Stations associated with a particular Operator, and in which each set of Subscriber Stations is communicatively connected the shared Backhaul link via a dedicated data link.

FIG. 30 illustrates one possible configuration of the system depicted in FIG. 29. In FIG. 30, the first RAN 2629a is connected to the shared Backhaul link 2605 by a first data link 2611a', whereas the second RAN 2629b is connected to the shared Backhaul link 2605 by a second data link 2611b'. The data links 2611a' and 2611b' are both physical links, but they may be the same kind of physical link, or different physical links. By way of example, but not by way of limitation, both links may be fiberoptic channels, or both may be cables, or both may be microwave, or both may be satellite, or both may be any other physical layer connection between the RANS and the shared Backhaul link 2605. Similarly by way of example but not by way of limitation, the data links may be different, where the first data link may be fiberoptic and the second data link may be cable, or the first data link may be microwave and the second data link may be satellite, or any other combination of physical links is possible.

Figure 31:
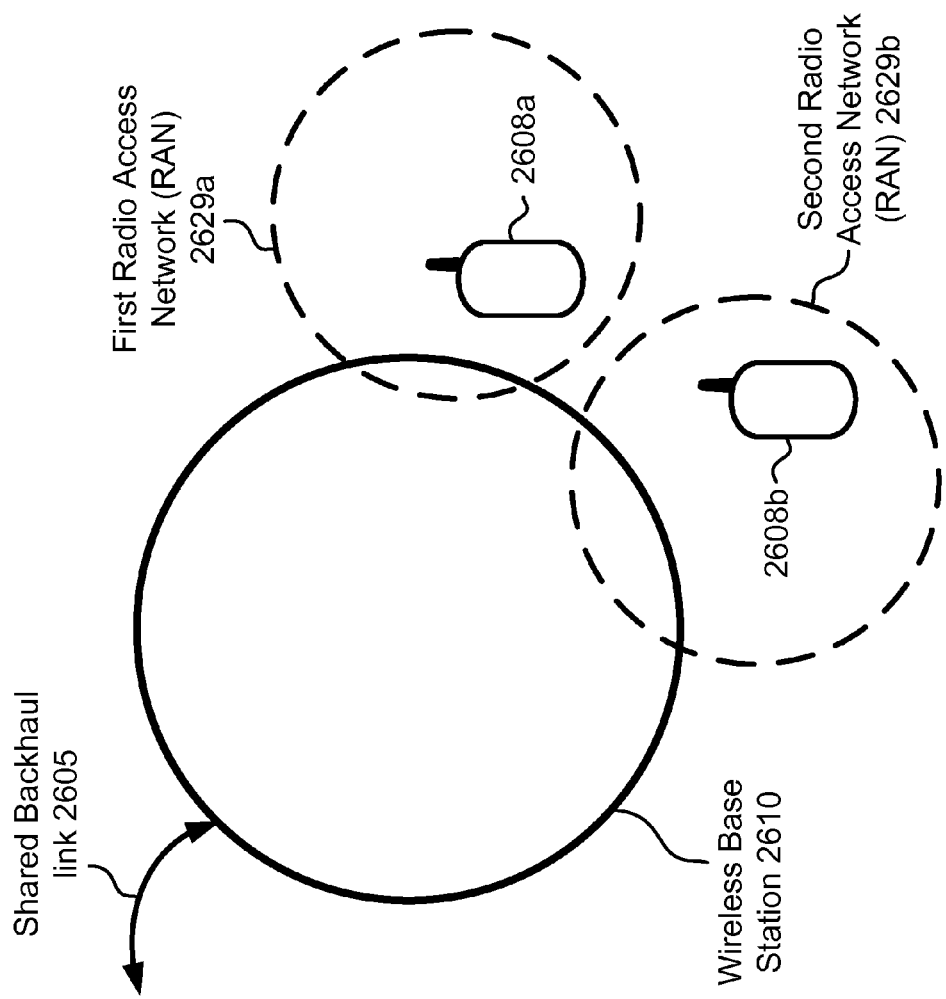
FIG. 31 illustrates one embodiment of components comprising a system in which multiple Operators use a shared Backhaul link, in which each of multiple Random Access Networks services a set of Subscriber Stations associated with a particular Operator, and in which a single wireless Base Station generates two or more of the Random Access Networks.

FIG. 31 illustrates one possible embodiment of a system, in which a single wireless BS 2610 generates two RANs, including a first RAN 2629a with a first set of Subscriber Stations 2608a, and a second RAN 2629b with a second set of Subscriber Stations 2608b. The single wireless BS 2610 is connected via a shared Backhaul link 2605 to a network not shown in FIG. 31. FIG. 31 is one possible configuration of such a communication system, in which there is a single wireless BS and multiple RANs. Other possible combinations would feature multiple wireless Base Stations, in which each wireless BS would generate one or more RANs, but in all cases each RAN is generated by at most one wireless BS at any particular time.

Figure 32:
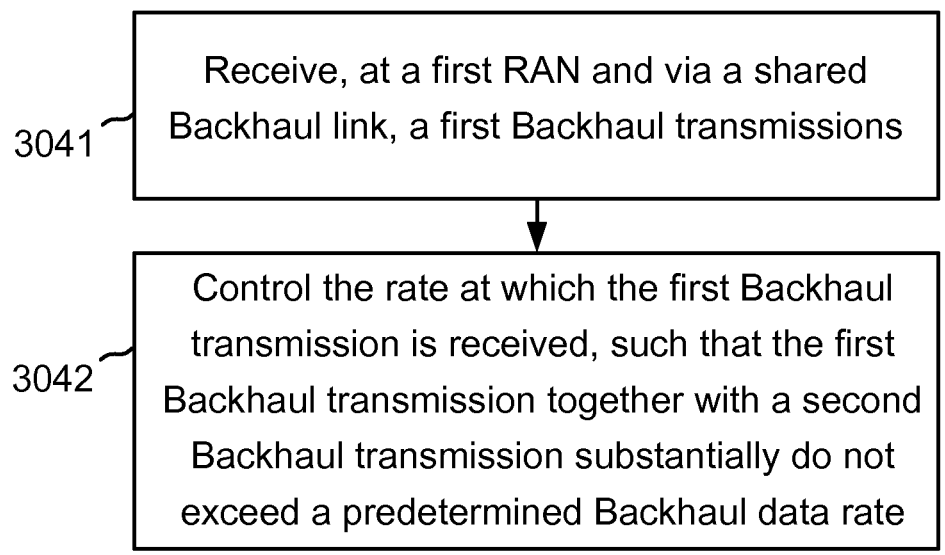
FIG. 32 illustrates one embodiment of the elements of a method for sharing a Backhaul link among a plurality of Random Access Networks, in which data rates between Core Network data sources and sets of Subscriber Stations are controlled such that the shared Backhaul link is not overloaded.

FIG. 32 is a flow diagram illustrating one method for effectively sharing a Backhaul link between at least two Radio Access Networks (RANs) belonging to different operators. In step 3041, the first RAN 2629a, belonging to a first Operator receives a first Backhaul transmission 2611a intended for a first set of Subscriber Stations 2608a serviced by the first RAN 2629a, via a shared Backhaul link 2605, wherein the shared Backhaul link 2605 transports the first Backhaul transmission 2611a together with at least a second Backhaul transmission 2611b intended for a second set of Subscriber Stations 2608b serviced by a second RAN 2629b. In step 3042, the system controls the rate at which the first Backhaul transmission 2611a is received by the first RAN 2629a, such that the first and second Backhaul transmissions 2611a & 2611b together substantially do not exceed a predetermined Backhaul data rate.

In a first possible implementation of the method just described, the controlling of the rate at which the first Backhaul transmission 2611a is received is done by the first RAN 2629a.

In a second possible implementation of the method just described, the first RAN 2629a is connected to the shared Backhaul link 2605 via a first data link 2611a', and the second RAN 2629b is connected to the shared Backhaul link 2605 via a second data link 2611b'.

In a third possible implementation of the method just described, the first Backhaul transmission 2611a is transported from a first Core Network data source 2602a' belonging to the first Operator to the first RAN 2629a using a first network Tunnel passing through the shared Backhaul link 2605.

In a fourth possible implementation of the method just described, the first RAN 2629a and the second RAN 2629b are generated by a single wireless Base Station (BS) 2610.

In this fourth possible implementation of the method described above for effectively sharing a Backhaul link between at least two Radio Access Networks (RANs) belonging to different Operators where at least two RANs are generated by a single wireless Base Station, a further possible implementation is that the shared Backhaul link 2605 is directly connected to the wireless BS 2610.

In a fifth possible implementation of the method just described, the rate at which the first Backhaul transmission 2611a is received via the shared Backhaul link 2605 is increased at the expense of the rate at which the second Backhaul transmission 2611b is received via the shared Backhaul link, such that the first and second Backhaul transmissions 2611a & 2611b via the shared Backhaul link 2605 together still substantially do not exceed the predetermined Backhaul data rate.

In a sixth possible implementation of the method just described, the controlling of the rate at which the first Backhaul transmission 2611a is received is done by the first RAN 2629a, using packet shaping techniques applied at the RAN level.

In a seventh possible implementation of the method just described, the controlling of the rate at which the first Backhaul transmission 2611a is received is done by the first RAN 2629a, using packet shaping techniques applied at the shared Backhaul link 2605 level.

In an eighth possible implementation of the method just described, the system indicates to the first RAN 2629a utilization levels of the shared Backhaul link 2605, and the rate at which the first Backhaul transmission 2611a is received is controlled according to such indication.

Figure 33:
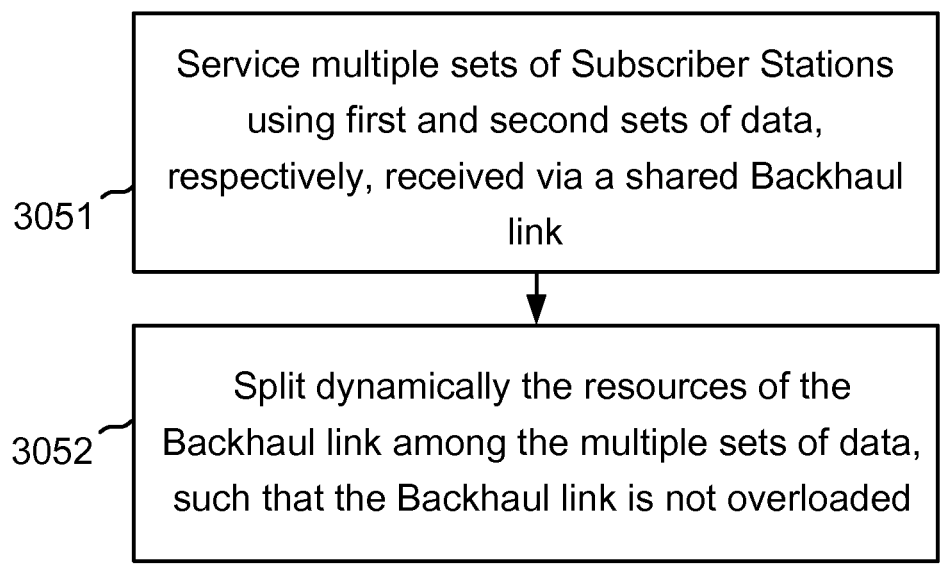
FIG. 33 illustrates one embodiment of the elements of a method for splitting dynamically resources of a Backhaul link shared by a plurality of Operators, such that the combined data rate of multiple downlink paths do not overload the shared Backhaul link, and/or such that the combined data rate of multiple uplink paths do not overload the shared Backhaul link.

FIG. 33 is a flow diagram illustrating one method for splitting dynamically resources of a shared Backhaul link 2605 between different Operators. In step 3051, a wireless Base Station (BS) 2610 services first and second sets of Subscriber Stations 2608a & 2608b associated with first and second Operators, respectively, using first and second sets of data, respectively, 2511a & 2511b received via a shared Backhaul link 2605 from the first and second Operators, respectively. In step 3502, the system dynamically splits the resources of the shared Backhaul link 2605 by controlling dynamically the rates at which the first and second sets of data 2511a & 2511b are received, such that overloading of the shared Backhaul link 2605 is prevented.

In one possible implementation of the method just described, the system dynamically increases the rate at which the first set of data 2511a is received at the expense of the rate at which the second set of data 2511b is received, such that overloading of the shared Backhaul link 2605 is prevented.

Figure 34A:
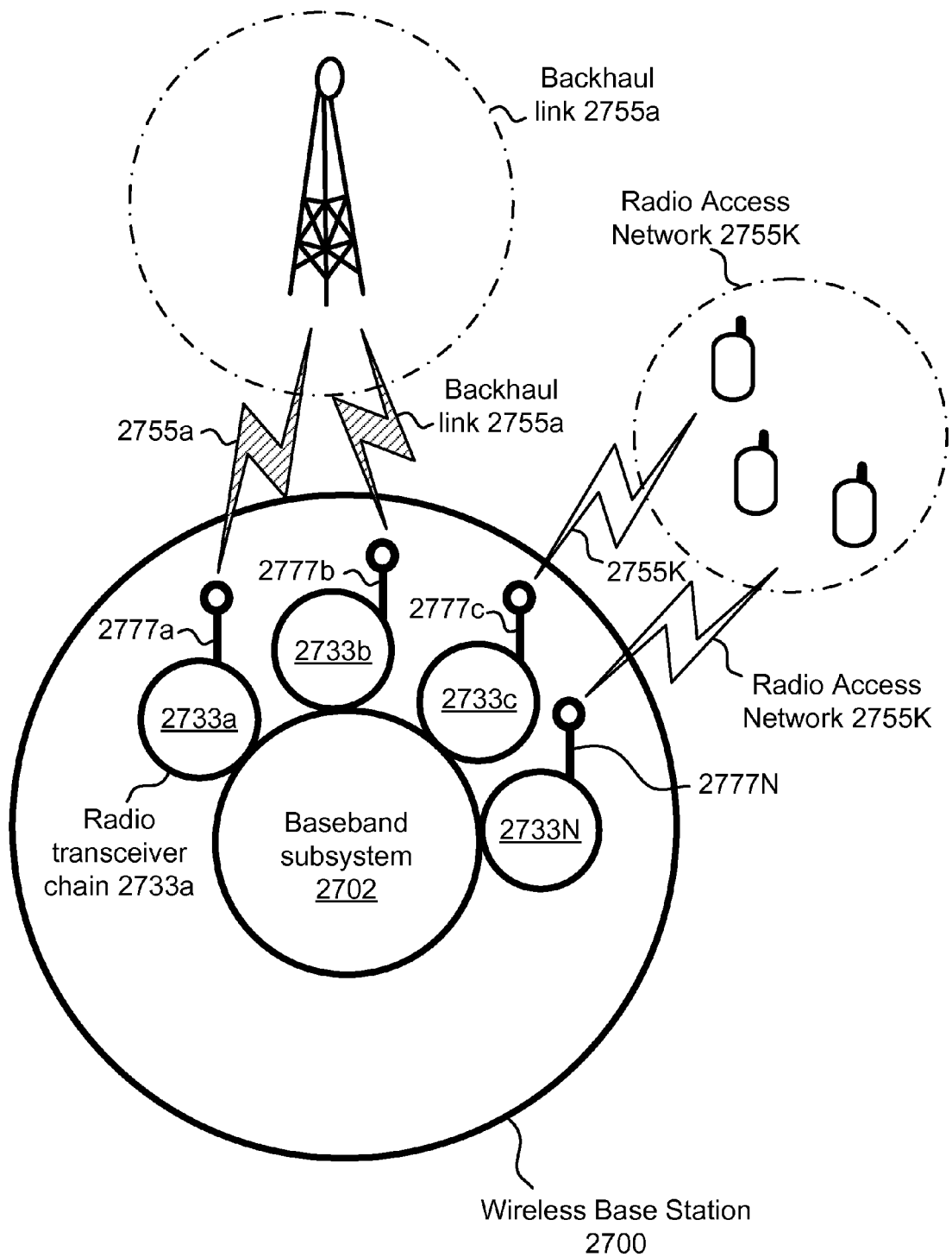
FIG. 34A illustrates one embodiment of components comprising a system in which a wireless Base Station is linked to both a Backhaul link and a Radio Access Network.

FIG. 34A illustrates one embodiment of components in a system. In FIG. 34A, there is a wireless Base Station (BS) 2700, which includes at least a Baseband subsystem 2702, multiple radio transceiver chains 2733a, 2733b, 2733c, and 2733N, and multiple antenna 2777a, 2777b, 2777c, and 2777N, in which each radio transceiver chain is connected to one antenna, and also each antenna is connected to one radio transceiver chain. In the particular embodiment illustrated in FIG. 34A, two of the radio transceiver chain-antenna combinations, here 2733a with 2777a and 2733b with 2777b, establish a wireless connection with a Backhaul link 2755a. Also in the embodiment illustrated in FIG. 34A, two of the radio transceiver chain-antenna combinations, here 2733c with 2777c and 2733N with 2777N, establish a wireless connection with a Radio Access Network (RAN) 2755K.

Figure 34B:
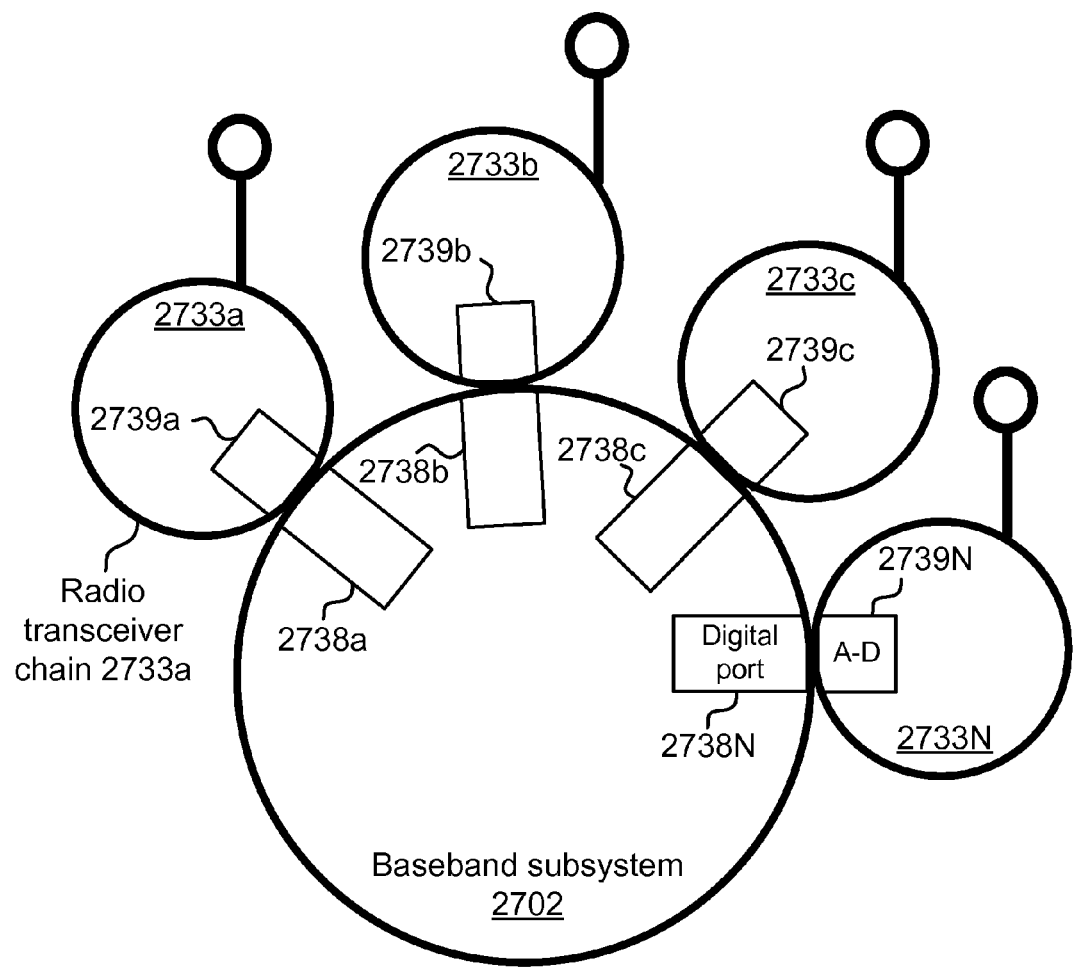
FIG. 34B illustrates one embodiment of some of the components in FIG. 34A, including details associated with Digital ports.

FIG. 34B is a blowup of some of the components shown in FIG. 34A, including the Baseband subsystem 2702, and the four radio transceiver chains 2733a, 2733b, 2733c, and 2733N. FIG. 34B also shows the point of connection between the Baseband subsystem 2702 and each radio transceiver chain, which includes a Digital port in the Baseband system 2702, and an A-D converter in the radio transceiver chain. Thus, Digital port 2738a and A-D converter 2739a form the connection between 2702 and 2733a. Similarly, 2738b and 2739b form the connection between 2702 and 2733b, 2738c and 2739c form the connection between 2702 and 2733c, and 2738N and 2793N form the connection between 2702 and 2739N. It will be understood that communication occurs in both direction, from the Baseband subsystem 2702 to each radio transceiver chain, and from each radio transceiver chain to the Baseband subsystem 2702. Hence, the A-D converter is meant to signify a device that performs both analog to digital conversion, and digital to analog conversion. The communication from the Baseband system 2702 to a radio transceiver chain will require that the digital baseband signal be converted to an analog signal, and communication from a radio transceiver chain to the Baseband subsystem 2702 will required that that analog radio signal be converted to a digital signal.

Figure 34C:
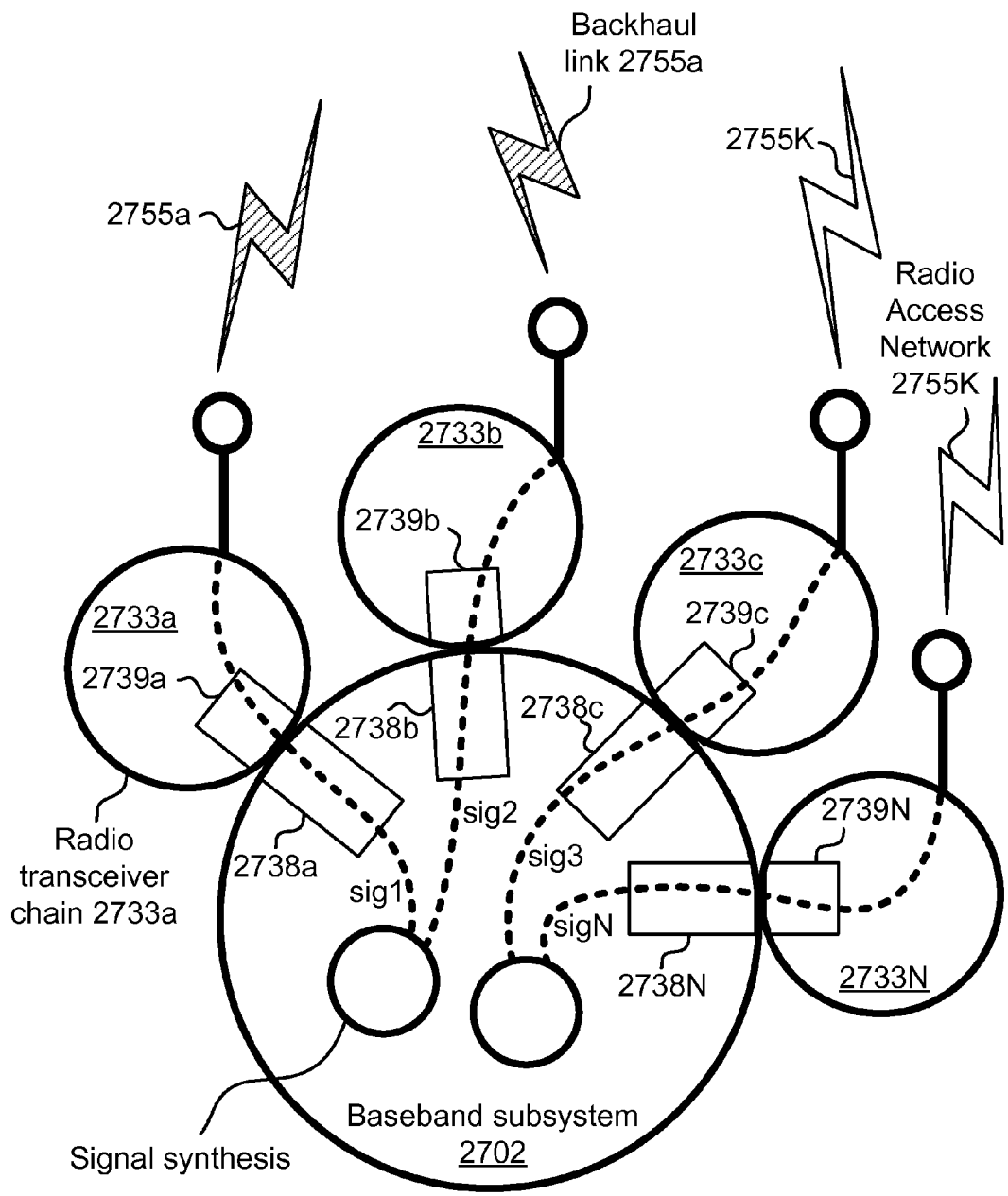
FIG. 34C illustrates one embodiment of components comprising a system in which a wireless Base Station is linked to both a Backhaul link and a Radio Access Network, including details of various signals.

FIG. 34C illustrates one embodiment of components of a system. Although only some of the elements of FIG. 34A and FIG. 34B appear in FIG. 34C, any deletion is merely for graphic purposes, to make FIG. 34C easier to view, but in reality all of the elements of FIG. 34A and FIG. 34B are part of the system illustrated in FIG. 34C. In addition, there are two sets of elements in FIG. 34C which do not appear in FIG. 34A or FIG. 34B. One set of such elements includes the signals, here four signals, to and from the Baseband Subsystem 2702 to either the Backhaul link 2755a or the RAN 2755K. Shown are sig1 and sig2, which are communication signals to and from the Baseband subsystem 2702 and the Backhaul link 2755a. Also shown are sig3 and sig4, which are communication signals to and from the Baseband subsystem 2702 and the RAN 2755K. In FIG. 34C, there are two Signal syntheses, one Signal synthesis creating sig1 and sig2, the other Signal synthesis creating sig3 and sigN. It will be understood that there are at least three signals, but there may be four as shown, or more than four. It will be understood that each of the Backhaul link 2755a and the RAN 2755K will have at least one signal, but one of the Backhaul link 2755a and the RAN 2755K will have at least two signals, they may each have two signals as actually portrayed in FIG. 34C, but either one of them may also have more than two signals. Each signal is associated with exactly one radio transceiver chain and one antenna, and at any particular point in time each signal will form a communication path with either the Backhaul link 2755a or the RAN 2755K.

Figure 35A:
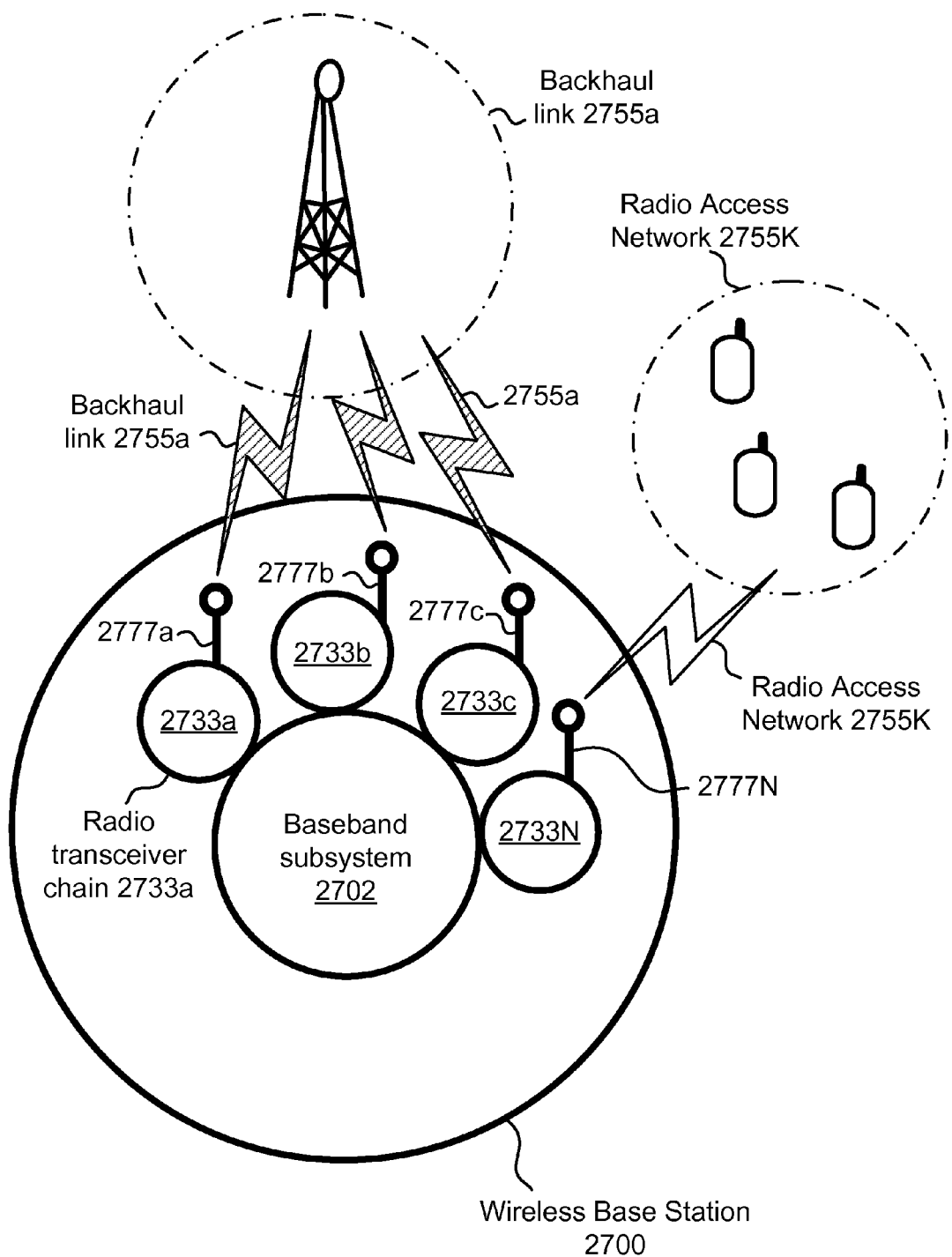
FIG. 35A illustrates one embodiment of components comprising a system in which a wireless Base Station is linked to both a Backhaul link and a Radio Access Network, but in a different state than the system illustrated in FIG. 34A.

FIG. 35A illustrates one embodiment of the same components illustrated in FIG. 34A. There is one important difference, however. FIG. 35A illustrates a system at a point of time during which there are three communication paths between the Baseband subsystem 2702A and the Backhaul link 2755a, and only one communication path between the Baseband subsystem 2702 and the RAN 2755K. In other words, at the point in time shown in FIG. 35A, the system has reallocated one of the communication paths from the RAN 2755K to the Backhaul link 2755a. In the particular embodiment shown in FIG. 35A, the communication path reallocated is the signal form the Baseband subsystem 2702, to the radio transceiver chain 2733c, to the antenna 277c, and then to the Backhaul link 2755a rather than to the RAN 2755K.

Figure 35B:
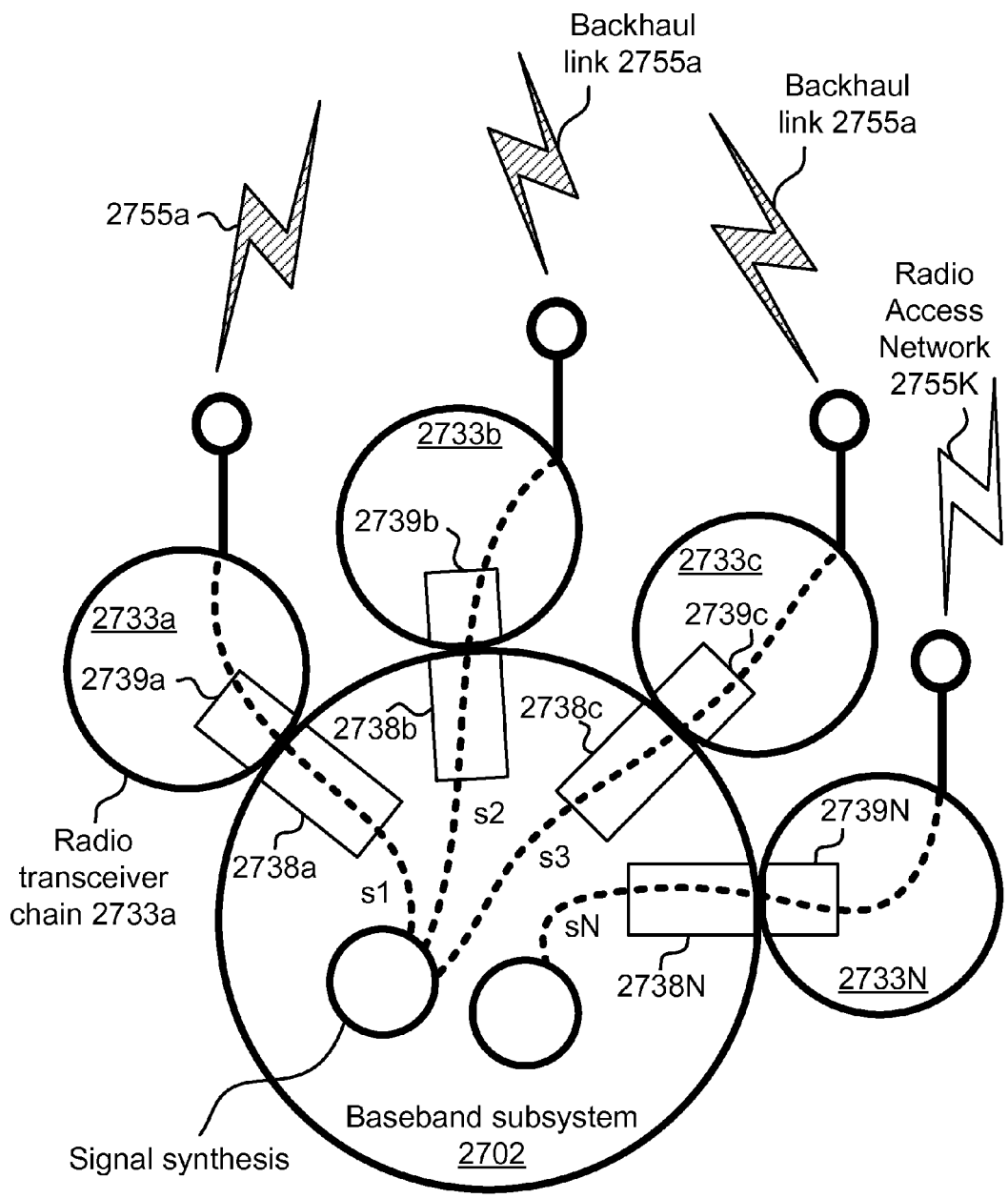
FIG. 35B illustrates one embodiment of some of the components in FIG. 35A, including details of various Digital ports and of various signals.

FIG. 35B is a blowup of some of the elements of FIG. 35A, and FIG. 35B shows the specific signals which create the communication paths illustrated in FIG. 35A. In FIG. 35B, one signal synthesis creates all the signals, s1, s2, and s3, which form communication paths between the Baseband subsystem 2702 and the Backhaul link 2755a. Correspondingly, a second signal synthesis creates all the signals, here only sN, which from communication paths, here only one communication path, between Baseband subsystem 2702 and the RAN 2755K. At the point of time illustrated in both FIG. 35A and FIG. 35B, there are three communication paths to and from the Backhaul link 2755a, and only one communication path to and from the RAN 2755K.

Figure 36:
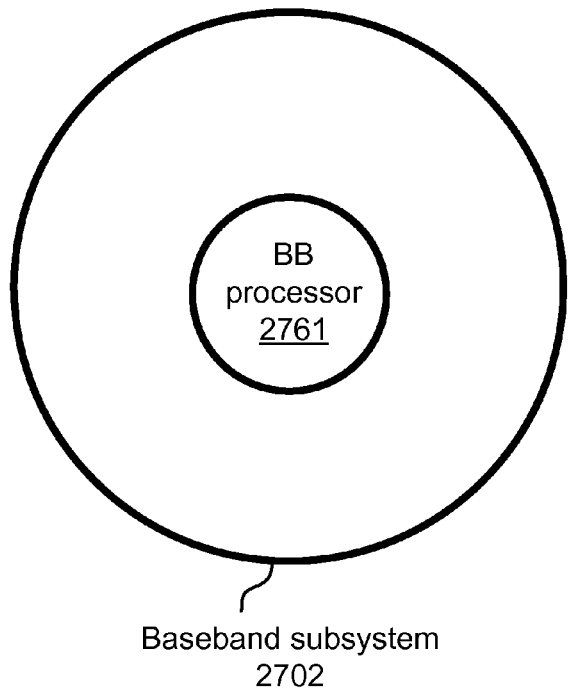
FIG. 36 illustrates one embodiment of a Baseband subsystem.

FIG. 36 illustrates one embodiment of the Baseband subsystem 2702. In FIG. 36, the Baseband subsystem 2702 includes a Baseband processor 2761, which, as shown in FIG. 36, is a kind of hardware. The hardware 2761 will have circuits, and these circuits may include any or all of an Application Specific Integrated Circuit (ASIC), a Field Programmable Gate Array (FPGA), and a Digital Signal Processor (DSP).

Figure 37:
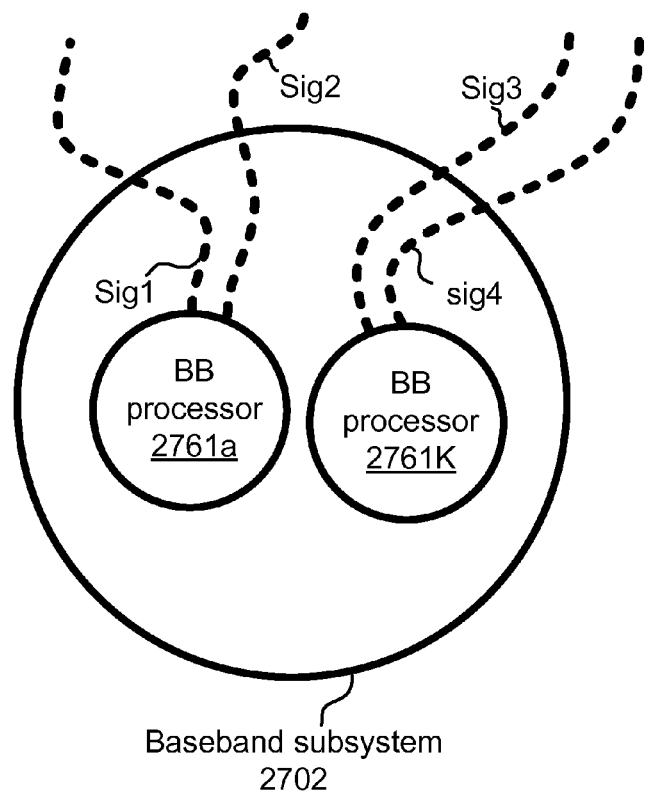
FIG. 37 illustrates one embodiment of a Baseband subsystem, including multiple Baseband processors and various signals.

FIG. 37 illustrates one embodiment of the Baseband subsystem 2702. The embodiment in FIG. 37 is not the same as the embodiment in FIG. 36. In FIG. 37, the Baseband subsystem 2702 includes two Baseband processors, here 2761a and 2761K. Each Baseband processor will create all the communication paths between either the wireless BS 2700 and either the Backhaul link 2755a or the RAN 2755K. In the particular embodiment illustrated in FIG. 37, 2761a creates Sig1 and Sig2, which are the communication paths to and from the Backhaul link 2755a, whereas 2761K creates Sig3 and Sig4 which are the communication paths to and from the RAN 2755K. As suggested for 2761 in FIG. 36, each of 2761a and 2761K is a piece of a hardware that will have circuits, which may include any or all of an ASIC, an FPGA, and a DSP.

Figure 38:
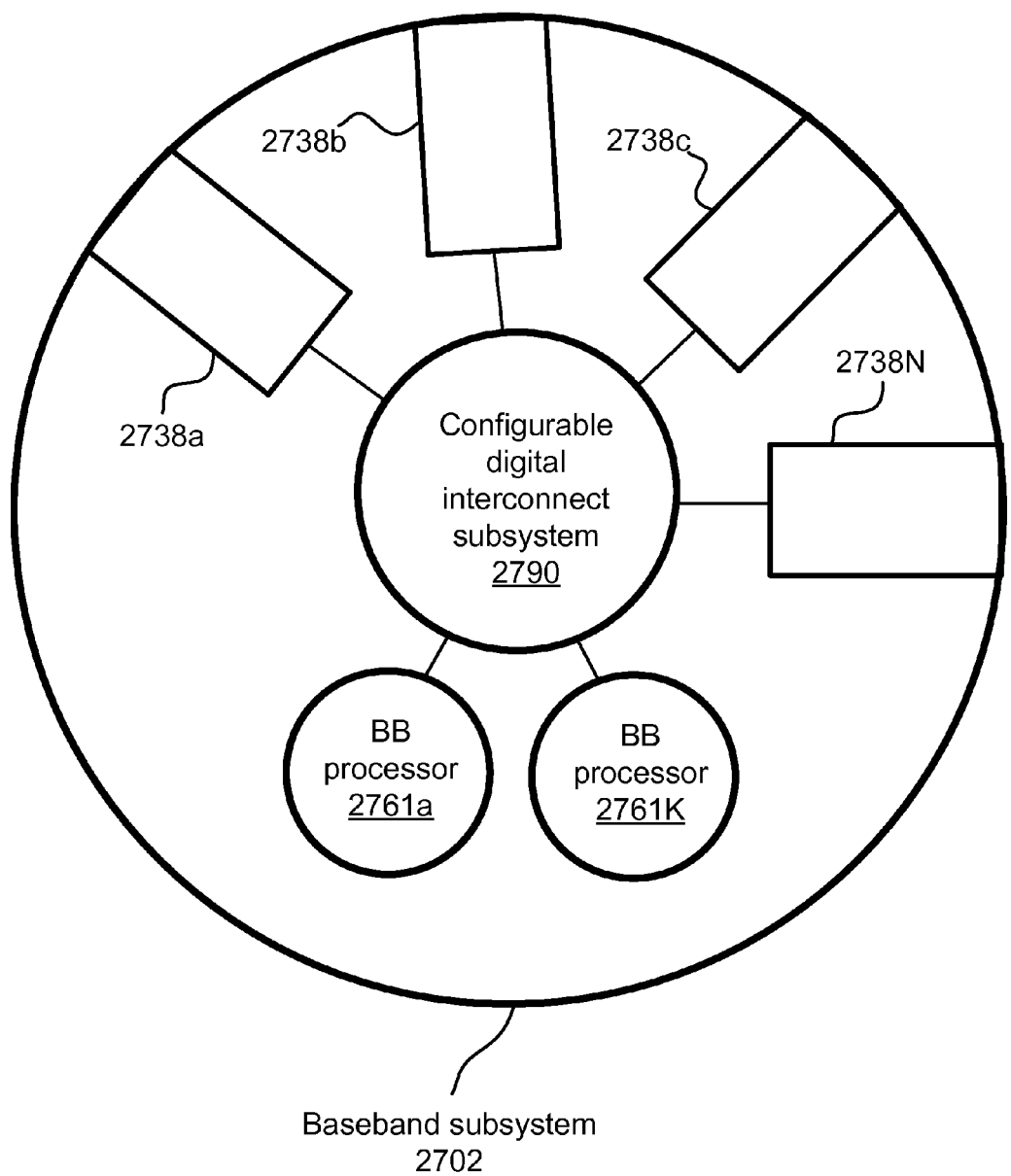
FIG. 38 illustrates one embodiment of a Baseband subsystem, including a Configurable digital interconnect subsystem.

FIG. 38 illustrates one embodiment of the Baseband system 2702. FIG. 38 shows the Baseband processors 2761a and 2761K, as well as Digital ports 2738a, 2738b, 2738c, and 2738N. However, in prior embodiments already described, there were direct connections between the Baseband processors and the Digital ports. Conversely, in FIG. 38, communication is established between the Baseband processors and the Digital ports via a Configurable digital interconnect subsystem 2790. Element 2790 acts as a kind of router, routing each digital signal from a Baseband processor to the intended Digital port, or from a Digital port to the intended Baseband processor. Element 2790 may also act as a multiplexor, in which various signals from the Baseband processors are multiplexed into one or more data streams, the streams are then delivered as signals to the intended Digital ports. Further, element 2790 may also act as a de-multiplexor in which various signals from the Digital ports are de-multiplexed into one or more data streams, the streams are then delivered as signals to the Baseband processors. In the particular embodiment illustrated in FIG. 38, there are two Baseband processors, and one of the Baseband processors may be dedicated to communication with the Backhaul link 2755a, while the other Baseband processor may be dedicated to communication with the RAN 2755K. If a particular embodiment includes more than one Baseband processor, then two or more Baseband processors may be dedicated to either the Backhaul link 2755a or the RAN 2755K, or one more Baseband processors may not be dedicated but rather may be allocated according to the need, at a particular point in time, to either the Backhaul link 2755a or the RAN 2755K. In any embodiment that has at least two Baseband processors, there may be, at all times, at least one Baseband processor dedicated to the Backhaul link 2755a, and at least one Baseband processor dedicated to the RAN 2755K.

In one embodiment, there is a system with a wireless Base Station (BS) 2700, in which the system is operative to split a plurality of radio transceiver chains 2733a, 2733b, 2733c, and 2733N between a Backhaul link 2755a and a Radio Access Network (RAN) 2755K. The system includes a wireless BS 2700, which may include a Baseband (BB) subsystem 2702, said subsystem including N digital ports 2738a, 2738b, 2738c, and 2738N, and subsystem operative to synthesize N digital Baseband (BB) signals sig1, sig2, sig3, and sigN. The wireless BS 2700 may also include N radio transceiver chains 2733a, 2733b, 2733c, and 2733N, each chain connected to one of the N digital ports of the BB subsystem via an Analog-Digital interface 2739a, 2739b, 2739c, and 2739N. In one configuration of this embodiment, the system is configured to split the N radio transceiver chains into a first set of K radio transceiver chains 2733a & 2733b, and a second set of N minus K radio transceiver chains 2733c & 2733N. In this configuration of the embodiment, the system also synthesizes, by the BB subsystem 2702, the N digital BB signals according to the split determined by N and K, such that K digital BB signals sig1 and sign 2 are operative to support a Backhaul link 2755a, and N minus K digital BB signals sig3 and sigN are operative to support a RAN 2755K. In this configuration of the embodiment, the system also inputs the N digital BB signals to the N radio transceiver chains via the corresponding N digital ports and the corresponding Analog-Digital interfaces, thereby communicating with both the Backhaul link 2755a and the RAN 2755K. The system may change the value of K, either according to some schedule or according to some other criterion, in other to maximize communication with both the Backhaul link 2755a and the RAN 2755K. The value of K may be changed dynamically, as the communication needs of the system change.

In one alternative embodiment of the embodiment just described for a system operative to split a plurality of radio transceiver chains between a Backhaul link and a RAN, N is equal to at least 3, and therefore at least two radio transceiver chains are dedicated to communication with either the Backhaul link 2755a or the RAN 2755K. If N is equal to 4 or more, then two or more radio transceiver chains may be dedicated to communication with each of the Backhaul link 2755a and the RAN 2755K. At all times, at least one radio transceiver chain is dedicated to communication with the Backhaul link 2755a, and at least one radio transceiver chain is dedicated to communication with the RAN 2755K.

In a second alternative embodiment to the embodiment of a system operative to split a plurality of radio transceiver chains between a Backhaul link and a RAN, N is equal to at least 3, there are N digital BB signals, each of which drives one radio transceiver chain, and each of at least two of the N digital BB signals is a Multiple Input Multiple Output (MIMO) signal. The result is that at least one of either the Backhaul link 2755a or the RAN 2755K communicates using a MIMO scheme. The MIMO scheme may be used for only the Backhaul link 2755a, or for only the RAN 2755K, or for both the Backhaul link 2755a and the RAN 2755K.

In a third alternative embodiment to the embodiment of a system operative to split a plurality of radio transceiver chains between a Backhaul link and a RAN, N is equal to at least 3, there are N digital BB signals, each of which drives one radio transceiver chain, and each of at least two of the N digital BB signals is a Phased-Array signal. The result is that at least one of either the Backhaul link 2755a or the RAN 2755K communicates using a Phased-Array scheme. The Phased-Array scheme may be used for only the Backhaul link 2755a, or for only the RAN 2755K, or for both the Backhaul link and the RAN.

In a fourth alternative embodiment to the embodiment of a system operative to split a plurality of radio transceiver chains between a Backhaul link and a RAN, each of at least two of the N digital BB signals is received from a radio transceiver chain, and is a signal type of (i) Maximal Ratio Combining (MRC), (ii) Minimum Mean Square Error (MMSE) or (iii) Maximum Likelihood (ML).

In a fifth alternative embodiment to the embodiment of a system operative to split a plurality of radio transceiver chains between a Backhaul link and a RAN, the BB subsystem comprises a BB processor 2761, and the BB processor 2761 is operative to simultaneously generate both the Backhaul link 2755a and the RAN 2755K, according to the setting of K at a particular point in time.

In a possible configuration of this fifth alternative embodiment of a system operative to split a plurality of radio transceiver chains between a Backhaul link and a RAN, the BB processor 2761 includes at least one device of type (i) Application Specific Integrated Circuit (ASIC), (ii) Field Programmable gate array (FPGA), or (iii) Digital Signal Processor (DSP). In this possible configuration, simultaneous generation of the Backhaul link 2755a and the RAN 2755K is performed, at least in part, by the at least one device according to the setting of K at a particular point in time.

In an alternative to this possible configuration of this fifth alternative embodiment of a system operative to split a plurality of radio transceiver chains between a Backhaul link and a RAN, the at least one device is a Digital Signal Processor (DSP), and simultaneous generation of the Backhaul link 2755a and the RAN 2755K is done, at least in part, in software running on the DSP, according to the setting of K at a particular point of time.

In a sixth alternative embodiment to the embodiment of a system operative to split a plurality of radio transceiver chains between a Backhaul link and a RAN, the BB subsystem comprises at least two BB processors 2761a and 2761K, and the at least two BB processors 2761a and 2761K are operative to substantially simultaneously generate the Backhaul link 2755a and the RAN 2755K, via the corresponding K BB signals and N minus K BB signals, according to the setting of K at a particular point in time.

In one possible configuration of this sixth alternative embodiment of a system operative to split a plurality of radio transceiver chains between a Backhaul link and a RAN, one of the at least two BB processors 2761a and 2761K is operative to generate the Backhaul link 2755a, and another one of the at least two BB processors 2671a and 2761K is operative to generate the RAN 2755K.

In a second possible configuration of this sixth alternative embodiment of a system operative to split a plurality of radio transceiver chains between a Backhaul link and a RAN, the system also includes a Configurable digital interconnect subsystem 2790, which is used to interconnect each of the at least two BB processors 2761a and 2761K with at least some of the N digital ports, according to the setting of K at a particular point in time, and according to the allocation of the N radio transceiver chains between the Backhaul link 2755a and the RAN 2755K, such that the K radio transceiver chains are connected to one of the BB processors 2761a and 2761K, and the N minus K radio transceiver chains are connected to another of the BB processors 2761a and 2761K.

In a seventh alternative embodiment to the embodiment of a system operative to split a plurality of radio transceiver chains between a Backhaul link and a RAN, the N radio transceiver chains are connected to N antennas 2777a, 2777b, 2777c, and 2777N, respectively, and said antennas are omni-directional antennas. The omni-directionality of the antennas allows both the Backhaul link 2755a and the RAN 2755K to span substantially a 360 degrees coverage area around the wireless BS, regardless of allocation of the radio transceiver chains between the Backhaul link 2755a and the RAN 2755K.

Figure 39:
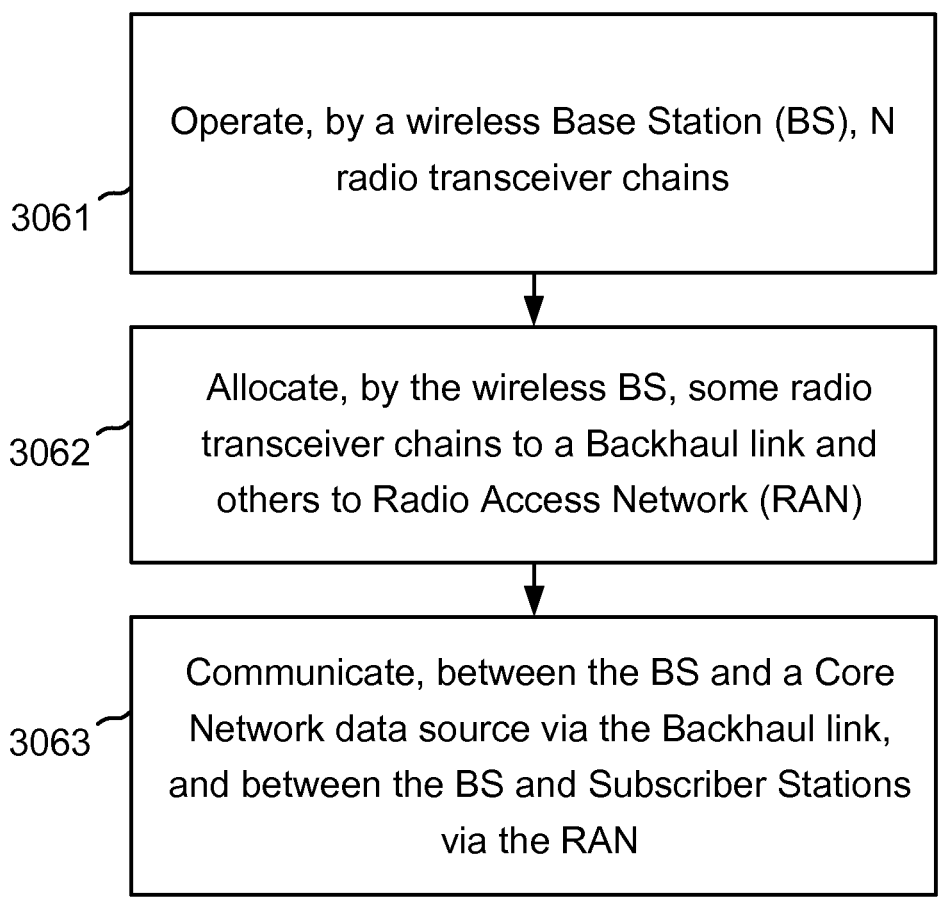
FIG. 39 illustrates one embodiment of the elements of a method for sharing a plurality of radio transceiver chains between a Backhaul link and a Radio Access Network.

FIG. 39 is a flow diagram illustrating one method for sharing a plurality of radio transceiver chains between a Backhaul link 2755a and a Radio Access Network (RAN) 2755K. In step 3061, a wireless Base Station (BS) 2700 operating N radio transceiver chains 2733a, 2733b, 2733b, and 2733N. In step 3062, a wireless BS 2700 splitting, according to a first criterion, the N radio transceiver chains into two sets of radio transceiver chains, wherein the first set of radio transceiver chains is allocated to a Backhaul link 2755a and the second set of radio transceiver chains is allocated to a RAN 2755K. In step 3063, the system communicating a first set of data between the wireless BS 2700 and a Core Network data source via the Backhaul link 2755a employing the first set of radio transceiver chains, and the system communicating a second set of data between the wireless BS 2700 and at least one Subscriber Station via the RAN 2755K employing the second set of radio transceiver chains.

In a first possible implementation of the method just described for sharing a plurality of radio transceiver chains between a Backhaul link 2755a and a RAN 2755K, further determining a minimum number of radio transceiver chains required by the wireless BS 2700 to communicate the first set of data, wherein the minimum number of radio transceiver chains is equal to at least one, and the minimum number of radio transceiver chains is equal to at most N minus one. Also, setting the number of radio transceiver chains in the first set of radio transceiver chains to the minimum number determined.

In a second possible implementation of the method described for sharing a plurality of radio transceiver chains between a Backhaul link 2755a and a RAN 2755K, further determining a minimum number of radio transceiver chains required by the wireless BS to 2700 communicate the second set of data, wherein the minimum number of radio transceiver chains is equal to at least one, and the minimum number of radio transceiver chains is equal to at most N minus one. Also, setting the number of radio transceiver chains in the second set of radio transceiver chains to the minimum number determined.

In a third possible implementation of the method described for sharing a plurality of radio transceiver chains between a Backhaul link 2755a and a RAN 2755K, further N exceeds two, and at least most of the N radio transceiver chains using substantially omni-directional antennas, such that (i) the first set of radio transceiver chains supports the Backhaul link 2755a in substantially any direction, (ii) the second set of radio transceiver chains supports the RAN 2755K in substantially any direction, and (iii) substantially any split of the N radio transceiver chains between Backhaul link 2755a and RAN 2755K is supported, regardless of the directions of the Backhaul link 2755a and RAN 2755K.

In a fourth possible implementation of the method described for sharing a plurality of radio transceiver chains between a Backhaul link 2755a and a RAN 2755K, further determining that the number of radio transceiver chains in the first set is not sufficient to maintain the Backhaul link 2755a, and increasing the number of radio transceiver chains in the first set at the expense of the number of radio transceiver chains in the second set, in order to improve the Backhaul link 2755a.

In a fifth possible implementation of the method described for sharing a plurality of radio transceiver chains between a Backhaul link 2755a and a RAN 2755K, further determining that the number of radio transceiver chains in the second set is not sufficient to maintain the RAN 2755K, and increasing the number of radio transceiver chains in the second set at the expense of the number of radio transceiver chains in the first set, in order to improve the RAN 2755K.

In a sixth possible implementation of the method described for sharing a plurality of radio transceiver chains between a Backhaul link 2755a and a RAN 2755K, further having a capability in the N radio transceiver chains, to operate in at least two frequency bands, setting the radio transceiver chains in the first set to operate in a first frequency band operative to support the Backhaul link 2755a, and setting the radio transceiver chains in the second set to operate in a second frequency band operative to support the RAN 2755K.

Figure 40:
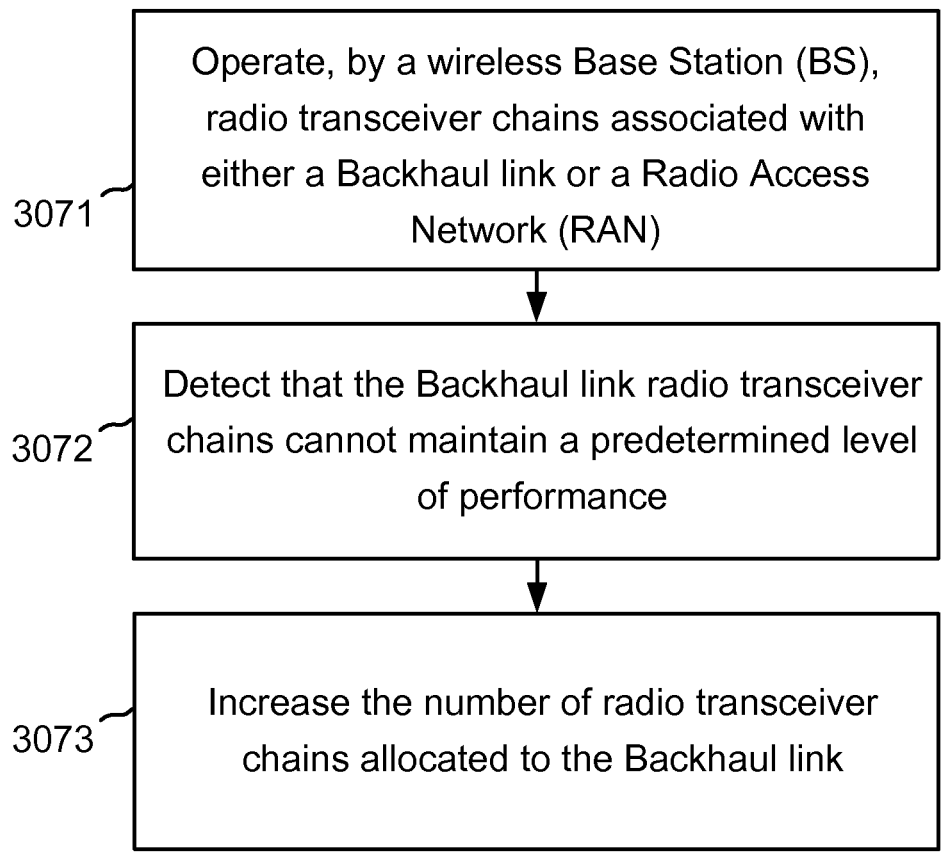
FIG. 40 illustrates one embodiment of the elements of a method for boosting performance of a Backhaul link associated with a wireless Base Station.

FIG. 40 is a flow diagram illustrating one method for boosting performance of a Backhaul link 2755a associated with a wireless Base Station (BS) 2700. In step 3071, a wireless BS 2700 operating K radio transceiver chains associated with a Backhaul link 2755a, and M radio transceiver chains associated with a Radio Access Network (RAN) 2755K. In step 3072, detecting that the K radio transceiver chains are not sufficient to maintain a predetermined level of performance associated with the Backhaul link 2755a. In step 3073, increasing the number of radio transceiver chains associated with the Backhaul link 2755a from K to at least K plus one, at the expense of the M radio transceiver chains.

In a first possible implementation of the method just described for boosting performance of a Backhaul link 2755a associated with a wireless BS 2700, further using the K radio transceiver chains in a Multiple-Input-Multiple-Output (MIMO) configuration, detecting that the K radio transceiver chains are not sufficient to maintain a predetermined wireless data capacity associated with the Backhaul link 2755a, and using the at least K plus one radio transceiver chains to increase the level of the MIMO configuration, thereby boosting the wireless data capacity associated with the Backhaul link 2755a.

In a second possible implementation of the method described for boosting performance of a Backhaul link 2755a associated with a wireless BS 2700, further using the K radio transceiver chains to realize a wireless reception scheme of type (i) Phase-Array reception, (ii) Maximal Ratio Combining (MRC) reception, (iii) Minimum Mean Square Error (MMSE) reception, or (iv) Maximum Likelihood (ML) reception. Also, detecting that the K radio transceiver chains are not sufficient to maintain a predetermined wireless sensitivity associated with the Backhaul link 2755a, and using the at least K plus one radio transceiver chains to increase the level of the wireless reception scheme, thereby boosting the wireless sensitivity associated with the Backhaul link 2755a.

In a third possible implementation of the method described for boosting performance of a Backhaul link 2755a associated with a wireless BS 2700, wherein the K and M radio transceiver chains operate in a first frequency band, thereby implementing in-band-Backhaul communication scheme.

In a fourth possible implementation of the method described for boosting performance of a Backhaul link 2755a associated with a wireless BS 2700, wherein the K and M radio transceiver chains operate in two separate bands respectively, thereby operating the Backhaul link 2755a in a different frequency band than the RAN 2755K. Also, at least one of the M radio transceiver chains is capable of operating at both the first and the second frequency bands; and said at least one of the M radio transceiver chains is reset from the first band to the second band before being assigned to the Backhaul link 2755a, thereby increasing the number of radio transceiver chains associated with the Backhaul link 2755a from K to the at least K plus one.

Figure 41A:
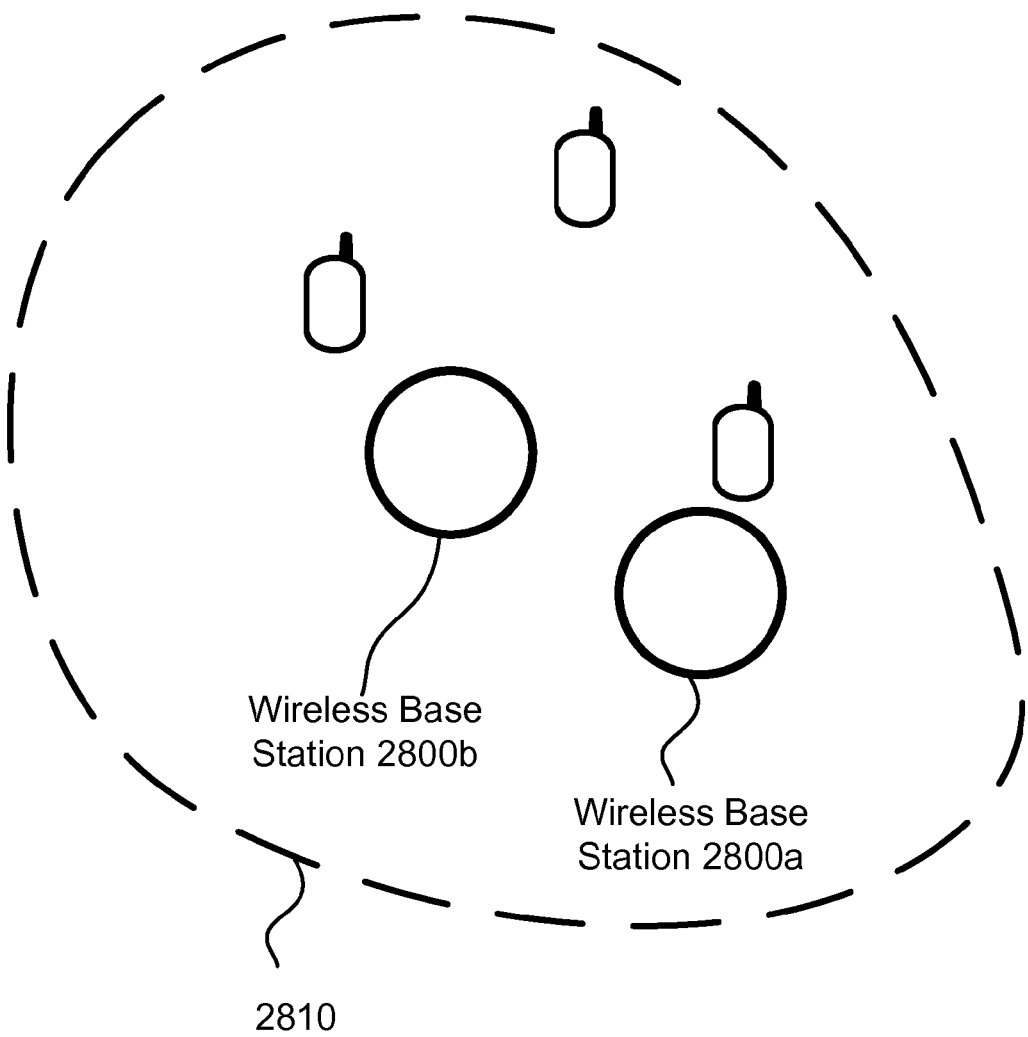
FIG. 41A illustrates one embodiment of a wireless cellular system with multiple Base Stations and a certain geographic area of radio coverage.

FIG. 41A illustrates one embodiment of components in a system. In FIG. 41A, there are two wireless Base Stations, 2800a and 2800b, which together provide a certain coverage area 2810 to a number of Subscriber Stations. FIG. 41A shows two wireless Base Stations, but it will be understood that there may be, in alternative embodiments, one wireless Base Station, or more than two wireless Base Stations.

Figure 41B:
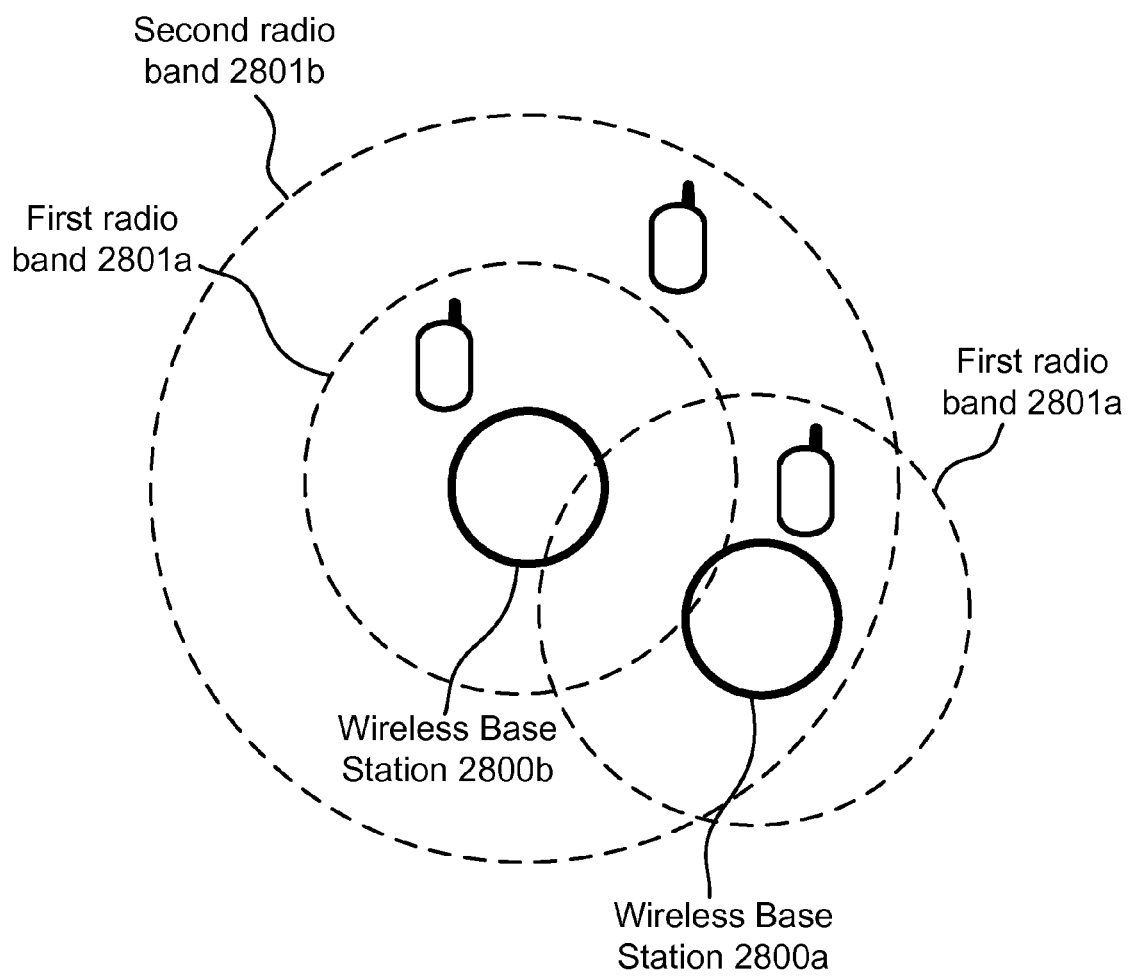
FIG. 41B illustrates one embodiment of a wireless cellular system with multiple Base Stations and a certain geographic area of radio coverage, in which at least one Subscriber Station is within the coverage area of a lower frequency band but outside the coverage area of a higher frequency band.

FIG. 41B illustrates one embodiment of components in a system. In FIG. 41B, there are two wireless Base Stations, 2800a and 2800b. Wireless Base Station 2800a operates at a first radio band 2801a, which provides a certain coverage area about the Base Station 2800a. In the particular embodiment illustrated in FIG. 41B, wireless Base Station 2800a is providing coverage to a single Subscriber Station within the Base Station's coverage area. Wireless Base Station 2800b is operating in two different radio bands, including the first radio band 2801a, and a second radio band 2801b. In FIG. 41B, the first radio band 2801a includes higher frequencies than the frequencies in the second radio band 2801b, and for this reason, the coverage area of the second radio band 2801b is greater than the coverage area of the first radio band 2801a. In the particular embodiment illustrated in FIG. 41B, the first radio band 2801a of wireless Base Station 2800b, is providing coverage to a single Subscriber Station. Also, the second radio band 2801b, is providing coverage to all three Subscriber Stations illustrated, including the Subscriber Station covered by wireless Base Station 2800a, the Subscriber Station that is covered by the first radio band 2801a provided by wireless Base Station 2800b, and a Subscriber Station that is covered only by the second radio band 2801b provided by 2800b but not covered by the first radio band 2801a from either wireless Base Station. Although FIG. 41B illustrates in particular three Subscriber Stations, it will be understood that the same coverage could be provided for a Subscriber Station that is initially within the coverage area of the first radio band 2801a, but that subsequently moves out of the coverage area of the first radio band 2801a while still within the coverage area of the second radio band 2801b. Any frequency bands could be employed, provided that the first frequency band 2801a is higher than the second frequency band 2801b. For example, first frequency band 2801a may be within the 2.4 GHz band, whereas the second frequency band 2801b may be within the 800 MHz band, the 900 MHz band, or the 1.9 GHz band, or any other band lower than 2.4 GHz. Similarly, the first radio band 2801a may be any band higher than 800 MHz, such as 900 MHz, 1.9 GHz, 2.4 GHz, or another, as long as the second radio band 2801b is at a lower band. In fact, it is not essential that 2801a and 2801b be in different frequency bands, because they may in fact be within the same general band, in a case where the actual frequencies of 2801b are lower than the actual frequencies of 2801a. For example, one of the frequencies of the first radio band 2801a may be centered at 848.2 MHz, whereas one of the frequencies of the second radio band 2801b may be lower, as say, for example, centered at 824.2 MHz. There are many possible combinations, as long as the actual frequencies in the second radio band 2801b are at a lower frequency than the actual frequencies in the first radio band 2801a.

Different system Operators may be represented by the wireless Base Stations and radio bands. For example, the first radio band 2801a, for both wireless Base Stations 2800a and 2800b, may be operated by one Operator, whereas a second Operator may operate the second radio band 2801b. Or as another example, one Operator may operated wireless Base Station 2800a, and a second Operator may operate wireless Base Station 2800b, in which case only the second Operator operates the second radio band 2801b, and both Operators operate the first radio band 2801a but at different frequencies within the first radio band 2801a. Other combinations are also possible.

In order to maximize utilization of the resources of the Operators, in some embodiments the entire system presented in FIG. 41B may use partial roaming, as that term is defined herein, to provide coverage to a Subscriber Station that is within the coverage area of the second radio band 2801b, but not of the first radio band 2801a. It will be understood that such a Subscriber Station may have migrated from the coverage area of wireless Base Station 2800a, or from the coverage area of the first radio band 2801a of wireless Base Station 2800b. Conversely, the Subscriber Station may have migrated from outside the coverage area of wireless Base Stations 2800a and 2800b, in which case the Subscriber Station may be associated with the first Operator, or with the second Operator, or within an entirely different Operator that does not operate either of the wireless Base Stations shown in FIG. 41B.

In one embodiment, there is a system operative to optimize usage of wireless Base Stations servicing at least two Operators. The system includes some number N of wireless Base Stations 2800a and 2800b, deployed across a predetermined geographic area 2810, the wireless Base Stations operative to provide at least partial wireless cellular coverage in the predetermined geographic area using a first radio band 2801a belonging to a first Operator, wherein at least K wireless Base Stations 2800b of the N wireless Base Stations, are also operative to provide wireless cellular coverage using a second radio band 2801b belonging to a second Operator, K is less than N, and the first radio band 2801a is located higher in frequency than the second radio band 2801b. Further, the system is configured to enhance a level of wireless cellular service provided by the first Operator, by causing Subscriber Stations associated with the first Operator to roam into the second radio band 2801b when out of range of the first radio band 2801a.

In one alternative embodiment of the embodiment just described for a system operative to optimize usage of wireless Base Stations servicing at least two Operators, the system is further configured to enhance a level of wireless cellular service provided by the second Operator, by causing Subscriber Stations associated with the second Operator and which require a wireless bandwidth not available via the second radio band 2801b, to roam into the first radio band 2801a.

In a possible configuration of this alternative embodiment of a system operative to optimize usage of wireless Base Stations servicing at least two Operators, the roaming into the first radio band 2801a is done using partial roaming techniques.

In a second alternative embodiment of the system operative to optimize usage of wireless Base Stations servicing at least two Operators, the roaming into the second radio band 2801b is done using partial roaming techniques.

Figure 42:
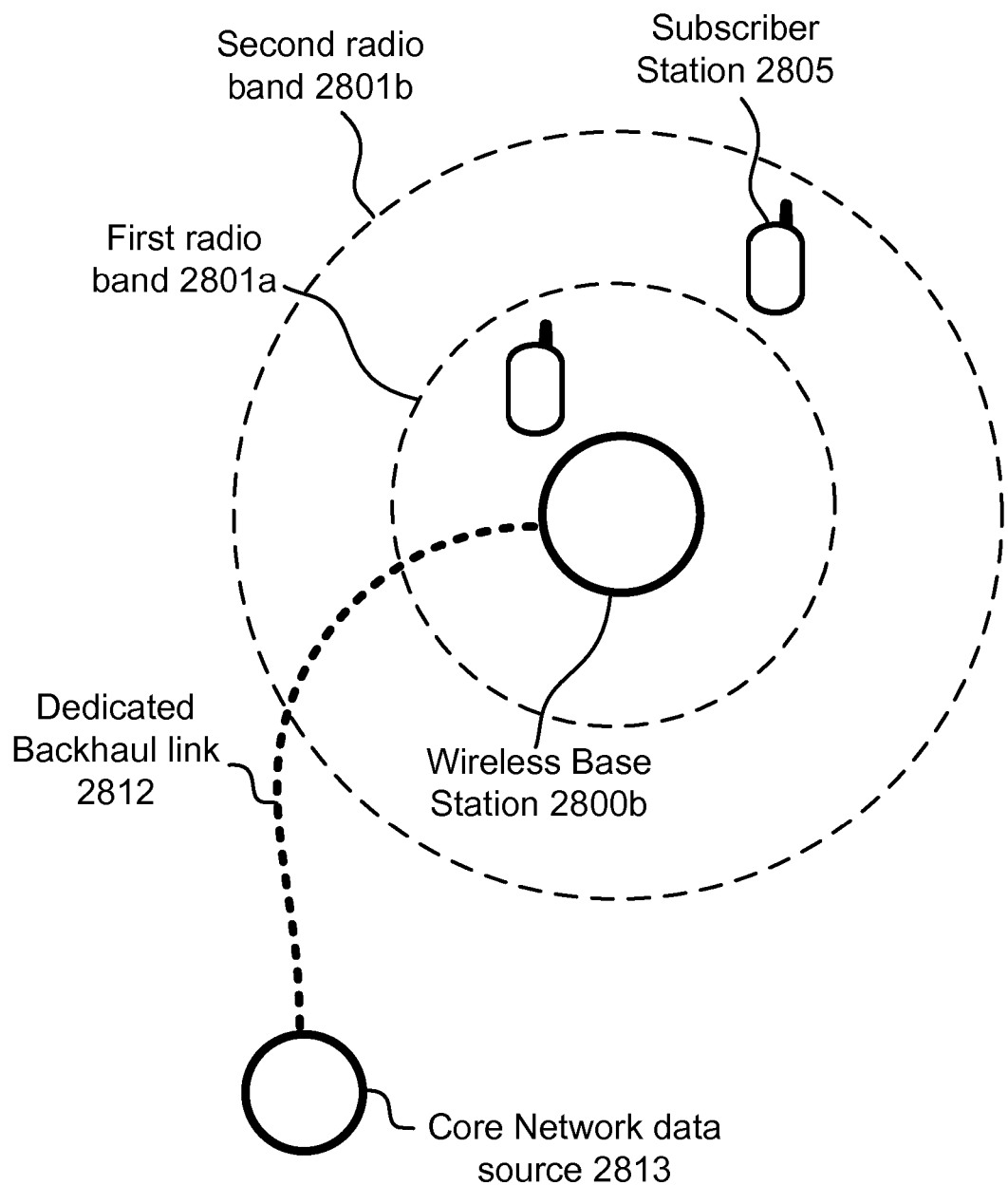
FIG. 42 illustrates one embodiment of a wireless cellular system with at least one Subscriber Station roaming out of the coverage area of a higher frequency band but still within the coverage area of a lower frequency band.

FIG. 42 illustrates one embodiment of components in a system. In FIG. 42, there is one wireless Base Stations, 2800b, operating on at least two frequencies, in which one frequency is at a first radio band 2801a, and the second frequency is at a second radio band 2801b, where the second frequency is lower than the first frequency. A Subscriber Station 2805 is initially located with the coverage area of both the first and the second radio bands 2801a and 2801b, but then migrates into the coverage area of only the second radio band 2801b. In some embodiments, there is a dedicated Backhaul link 2812 between the wireless Base Station 2800b and a Core Network data source 2813 belonging to the second Operator, and the system conveys data sets between the Core Network data source 2813 and the Subscriber Station 2805, using the dedicated Backhaul link 2812 and the second radio band 2801b. Although FIG. 42 illustrates components of a system in which there is only one wireless Base Station 2800b, in alternative embodiments there can be two wireless Base Stations in which one wireless Base Station supports communication via the first radio band 2801a and the other wireless Base Station supports communication via the second radio band 2801b.

Figure 43:
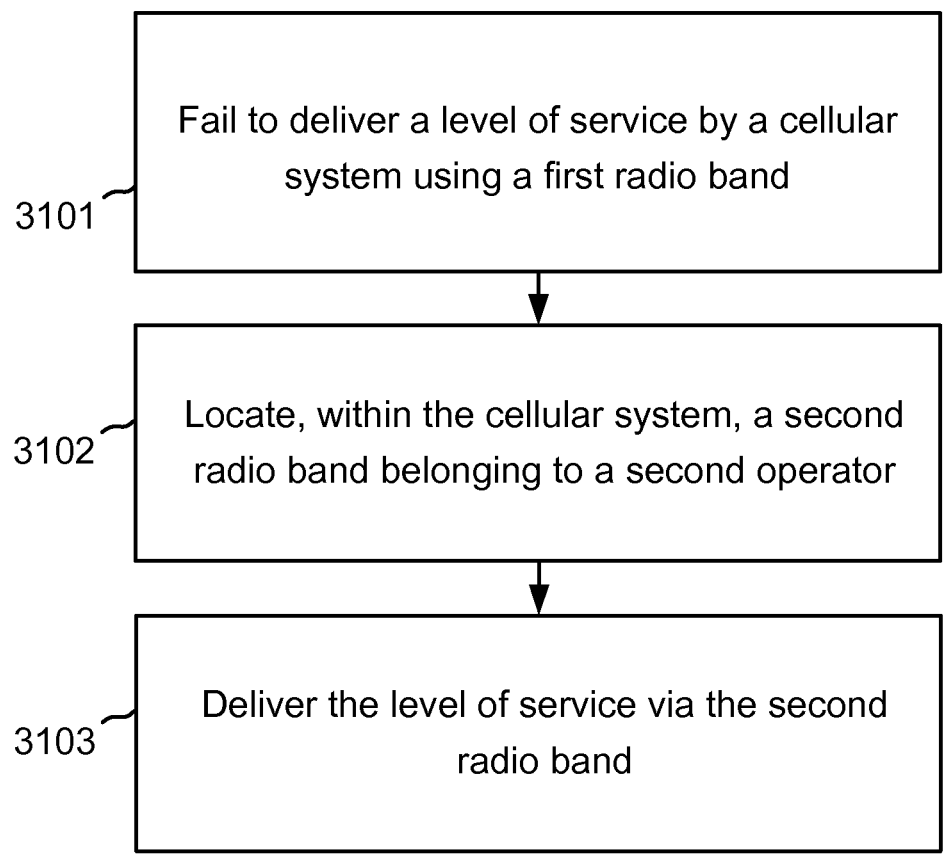
FIG. 43 illustrates one embodiment of the elements of a method for supporting two-band wireless cellular operation by a single wireless cellular system servicing at least two Operators.

FIG. 43 is a diagram illustrating one method for supporting a two-band wireless cellular operation by a single wireless cellular system servicing at least two Operators. In step 3101, a wireless cellular system, using a first radio band 2801a belonging to a first Operator associated with a Subscriber Station 2805, fails to deliver a predetermined level of wireless cellular service to the Subscriber Station 2805. In step 3102, the wireless cellular system locates a second radio band 2801b, belonging to a second Operator, operative to deliver at least the predetermined level of wireless cellular service to the Subscriber Station 2805. In step 3103, the wireless cellular system, using the second radio band 2801b, delivers at least the predetermined level of wireless cellular service to the Subscriber Station 2805.

In a first possible implementation of the method just described for supporting two-band cellular operation by a single wireless cellular system servicing at least two Operators, the wireless cellular system further establishes a dedicated Backhaul link 2812 to a Core Network data source 2813 belonging to the second Operator, and the wireless cellular system further conveys data sets between the Core Network data source 2813 and the Subscriber Station 2805, using the dedicated Backhaul link 2812 and the second radio band 2801b.

In this first possible implementation of the method just described for supporting two-band cellular operation by a single wireless cellular system servicing at least two Operators, a further implementation is that the Backhaul link 2812 is established using a network Tunnel.

In a second possible implementation of the method just described for supporting two-band cellular operation by a single wireless cellular system servicing at least two Operators, the wireless cellular system comprises at least first 2800a and second 2800b wireless Base Stations, where the first wireless Base Station 2800a supports wireless communication via the first radio ban 2801a and the second wireless Base Station supports wireless communication via the second radio band 2801b.

In this second possible implementation of the method just described for supporting two-band cellular operation by a single wireless cellular system servicing at least two Operators, a further implementation is that the wireless cellular system causing the Subscriber Stations 2805 to perform partial roaming between the first wireless Base Station and the second wireless Base Station, before the wireless cellular system delivers at least the predetermined level of wireless cellular service to the Subscriber Station 2805 via the second radio band 2801b.

In a third possible implementation of the method just described for supporting two-band cellular operation by a single wireless cellular system servicing at least two Operators, the wireless cellular system comprises at least a wireless Base Stations 2800b which is operative to support both the first 2801a and the second 2801b radio bands substantially simultaneously.

In this third possible implementation of the method just described for supporting two-band cellular operation by a single wireless cellular system servicing at least two Operators, a further implementation is that the wireless Base Stations 2800b causes the Subscriber Station 2805 to perform partial roaming between the first radio band 2801a and the second radio band 2801b of said wireless Base Station 2800b, before the wireless cellular system delivers at least the predetermined level of wireless cellular service to the Subscriber Station 2805 via the second radio band 2801b.

In a fourth possible implementation of the method just described for supporting two-band cellular operation by a single wireless cellular system servicing at least two Operators, the first radio band 2801a is located higher in frequency than the second radio band 2801b, resulting in the second radio band 2801b having a better reach and better coverage than the first radio band 2801a, thereby allowing the wireless cellular system to use the second radio band 2801b to deliver at least the predetermined level of wireless cellular service to the Subscriber Station 2805 when said Subscriber Station is located substantially out of the coverage area of the first radio band 2801a.

In this fourth possible implementation of the method just described for supporting two-band cellular operation by a single wireless cellular system servicing at least two Operators, a further implementation is that the wireless cellular system comprises at least a wireless Base Stations 2800b which is operative to support both the first 2801a and the second 2801b radio bands substantially simultaneously.

In this fourth possible implementation of the method just described for supporting two-band cellular operation by a single wireless cellular system servicing at least two Operators, a second further implementation is that the first radio band 2801a is located substantially in the 2.3 GHz to 2.6 GHz range, and the second radio band is located substantially in the 700 MHz to 1 GHz range.

In a fifth possible implementation of the method just described for supporting two-band cellular operation by a single wireless cellular system servicing at least two Operators, further the first radio band 2801a is located lower in frequency than the second radio band 2801b, resulting in the second radio band 2801b have a higher capacity than the first radio band 2801a, thereby allowing use of the second radio band 2801b to deliver at least the predetermined level of wireless cellular service to the Subscriber Station 2805.

In this fifth possible implementation of the method just described for supporting two-band cellular operation by a single wireless cellular system servicing at least two Operators, a further implementation is that the wireless cellular system comprises at least a wireless Base Stations 2800b which is operative to support both the first 2801a and the second 2801b radio bands substantially simultaneously.

In this fifth possible implementation of the method just described for supporting two-band cellular operation by a single wireless cellular system servicing at least two Operators, a second further implementation is that the first radio band 2801a is located substantially in the 700 MHz to 1 GHz range, and the second radio band is located substantially in the 2.3 GHz to 2.5 GHz range.

Figure 44:
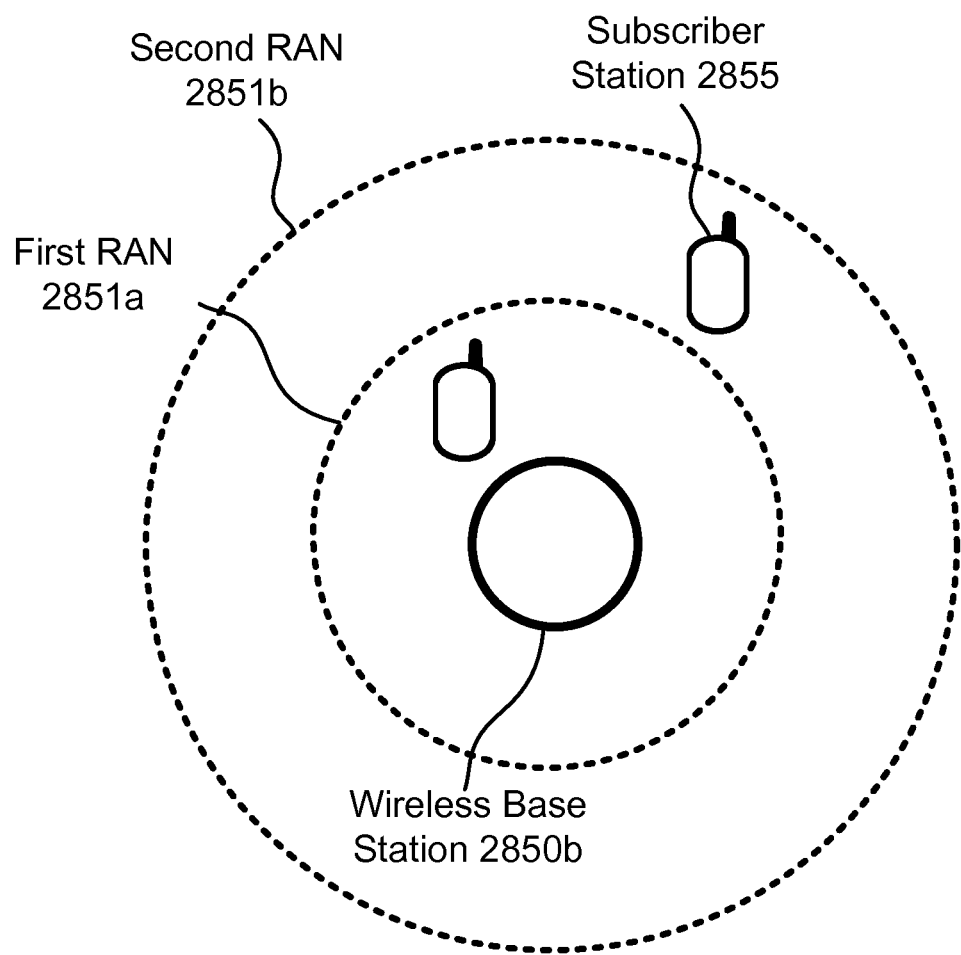
FIG. 44 illustrates one embodiment of a wireless cellular system with two separate Radio Access Networks, in which one RAN operates on a higher frequency band and the second RAN operators on a lower frequency band.

FIG. 44 illustrates one embodiment of components in a system. In FIG. 44, there are one or more wireless Base Stations. FIG. 44 shows one wireless Base Station 2850b, but there could be more than one wireless Base Station. FIG. 44 also shows that the wireless Base Stations will generate, substantially simultaneously, both a first RAN 2851a and a second RAN 2851b. FIG. 44 also illustrates a Subscriber Station 2855 which is substantially outside the coverage area of the first RAN 2851a, but within the coverage area of the second RAN 2851b. In this system each RAN operates on a different radio band, and the first RAN 2851a operates on a radio band that is higher in frequency than the frequency of the second RAN 2851b.

Figure 45:
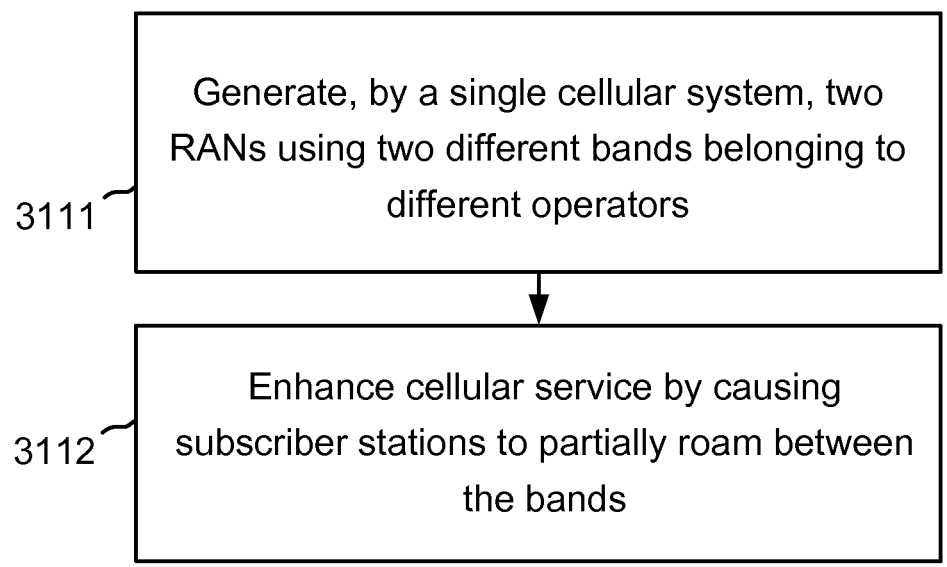
FIG. 45 illustrates one embodiment of the elements of a method for enhancing wireless cellular service provided by at least two Operators.

FIG. 45 is a diagram illustrating one method for enhancing wireless cellular service provided by at least two Operators. In step 3111, a wireless cellular system generates a first Radio Access Network (RAN) 2851a and a second RAN 2851b, using a first radio band and a second radio band, respectively, wherein said radio bands belong to a first Operator and a second Operator, respectively, and the first radio band is located higher in frequency than the second radio band. In step 3112, the wireless cellular enhances a level of wireless cellular service provided by the first Operator, by causing Subscriber Stations 2855 associated with the first Operator, and which are poorly covered by the first RAN 2851a, to perform partial roaming from the first RAN 2851a to the second RAN 2851b.

In a first possible implementation of the method just described for enhancing wireless cellular service provided by at least two Operators, the wireless cellular system enhances a level of wireless cellular service provided by the second Operator, by causing Subscriber Stations associated with the second Operator, and which require a wireless bandwidth not available via the second RAN 2851b, to perform partial roaming from the second RAN 2851b to the first RAN 2851a.

In this first possible implementation of the method just described for enhancing wireless cellular service provided by at least two Operators, a further implementation is that the first radio band is located substantially in the 2.3 GHz to 2.6 GHz range, and the second radio band is located substantially in the 700 MHz to 1 GHz range, thereby allowing the first RAN 2851a to deliver higher wireless bandwidth than the second RAN 2851b.

In a second possible implementation of the method just described for enhancing wireless cellular service provided by at least two Operators, the second radio band is located substantially in the 700 MHz to 1 GHz range, and the first radio band is located substantially in the 2.3 GHz to 2.6 GHz range, thereby allowing the second RAN 2851b to provide better coverage than the first RAN 2851a.

In a third possible implementation of the method just described for enhancing wireless cellular service provided by at least two Operators, the wireless cellular system comprises at least a wireless Base Station 2850b operative to support the first 2851a and second 2851b RANs substantially simultaneously, and the partial roaming is performed by the wireless Base Station 2850b.

Figure 46:
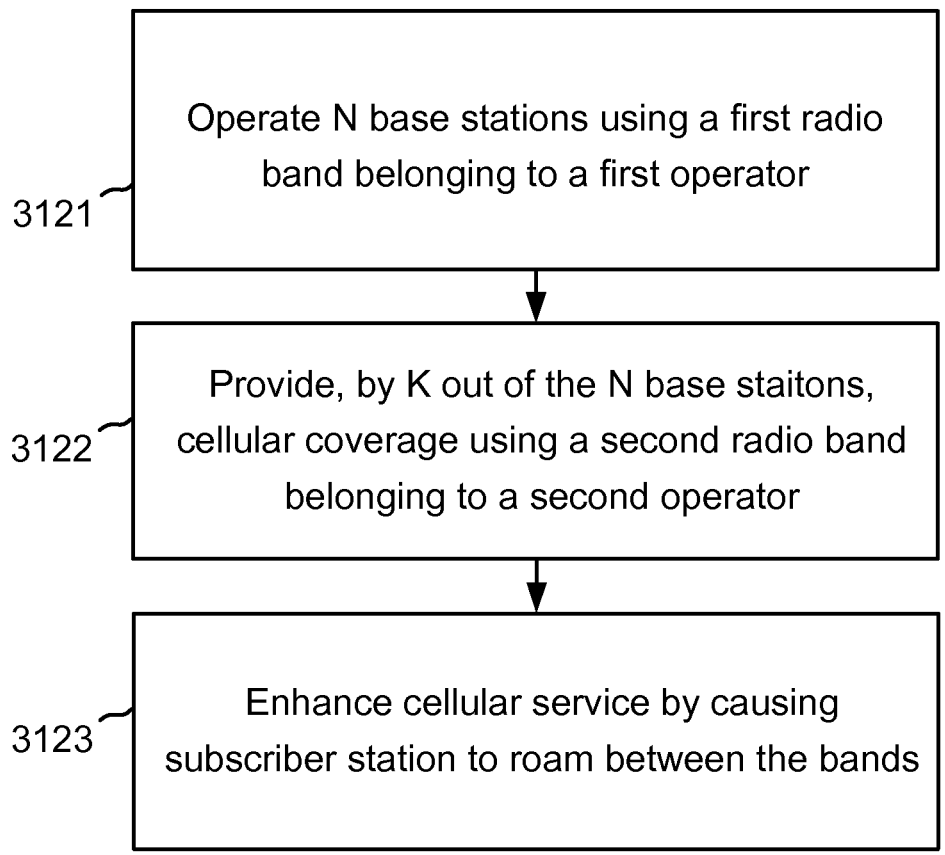
FIG. 46 illustrates one embodiment of the elements of a method for optimizing placement of wireless Base Stations servicing at least two Operators.

FIG. 46 is a diagram illustrating one method for optimizing placement of wireless Base Stations servicing at least two Operators. In step 3121, a wireless cellular system operates N wireless Base Stations deployed across a predetermined geographic area, and the wireless Base Stations are operative to provide wireless cellular coverage in the predetermined area using a first radio band belonging to a first Operator. In step 3122, the wireless cellular system provides wireless cellular coverage in the predetermined area using a second radio band belonging to a second Operator, by configuring K wireless Base Stations out of the N wireless Base Stations to cover wirelessly the predetermined area using a second radio band belonging to the second Operator, wherein K is less than N, and wherein the first radio band is located higher in frequency than the second radio band. In step 3123, the wireless cellular system enhances a level of wireless cellular service provided by the first Operator, by causing Subscriber Stations associated with the first Operator to roam into the second radio band when out of range of the first radio band.

In a first possible implementation of the method just described for optimizing placement of wireless Base Stations servicing at least two Operators, the wireless cellular system enhances a level of wireless cellular service provided by the second Operator, by causing Subscriber Stations associated with the second Operator and which require a wireless bandwidth not available via the second radio band, to roam into the first radio band.

In this first possible implementation of the method just described for optimizing placement of wireless Base Stations servicing at least two Operators, a further implementation is that the roaming into the first radio band is done using partial roaming techniques.

In a second possible implementation of the method just described for optimizing placement of wireless Base Stations servicing at least two Operators, the roaming into the second radio band is done using partial roaming techniques.

In this Detailed Description, numerous specific details are set forth. However, the embodiments of the invention may be practiced without some of these specific details. In other instances, well-known hardware, software, materials, structures and techniques have not been shown in detail in order not to obscure the understanding of this description. In this description, references to "one embodiment" mean that the feature being referred to may be included in at least one embodiment of the invention. Moreover, separate references to "one embodiment" or "some embodiments" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and do not necessarily correspond to discrete hardware elements. While the methods disclosed herein have been described and shown with reference to particular steps performed in a particular order, it is understood that these steps may be combined, sub-divided, or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when an interface is disclosed in an embodiment, the scope of the embodiment is intended to cover also the use of multiple interfaces. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications and variations will be apparent to those skilled in the art. It is to be understood that other embodiments may be utilized and structural changes may be made without departing from the scope of the embodiments. Accordingly, it is intended to embrace all such alternatives, modifications and variations that fall within the spirit and scope of the appended claims and their equivalents.

What is claimed is:

1. A system operative to optimize usage of wireless base stations servicing at least two operators, comprising:
   N wireless base stations deployed across a predetermined area, the wireless base stations operative to provide at least partial wireless cellular coverage in the predetermined area using a first radio band belonging to a first operator, wherein: (i) at least K wireless base stations, out the N wireless base stations, are also operative to provide wireless cellular coverage using a second radio band located substantially in the 700 MHz to 1 GHz range belonging to a second operator, (ii) K<N, and (iii) the first radio band is located in higher band than the second radio band, resulting in the second radio band having a better reach and better coverage than the first radio band, thereby allowing use of the second radio band in delivering at least a predetermined level of wireless cellular service to subscriber stations located substantially out of coverage area of the first radio band;
   wherein the system is configured to enhance a level of wireless cellular service provided by the first operator, by causing subscriber stations associated with the first operator to roam into the second radio band when out of range of the first radio band.

2. The system of claim 1, further configured to enhance a level of wireless cellular service provided by the second operator, by causing subscriber stations associated with the second operator and which require a wireless bandwidth not available via the second radio band, to roam into the first radio band.

3. The system of claim 2, wherein the roaming into the first radio band is done using partial roaming techniques.

4. The system of claim 1, wherein the roaming is done using partial roaming techniques.

5. A method for supporting two-band wireless cellular operation by a single wireless cellular system servicing at least two operators, comprising:
   failing, by a wireless cellular system, to deliver a predetermined level of wireless cellular service to a subscriber station, via a first radio band located substantially in the 2.3 GHz to 2.6 GHz range belonging to a first operator associated with the subscriber station;
   locating, by the wireless cellular system, a second radio band located substantially in the 700 MHz to 1 GHz range belonging to a second operator, operative to deliver at least the predetermined level of wireless cellular service to the subscriber station as a result of the second radio band having a better coverage than the first radio band; and
   delivering, by the wireless cellular system, at least the predetermined level of wireless cellular service to the subscriber station, via the second radio band.

6. The method of claim 5, further comprising:
   establishing, by the wireless cellular system, a dedicated backhaul link to a core network data source belonging to the second operator; and
   conveying data sets, by the wireless cellular system, between the core network data source and the subscriber station, using the dedicated backhaul link and the second radio band.

7. The method of claim 6, wherein the backhaul link is established using a network tunnel.

8. The method of claim 5, wherein:
   the wireless cellular system comprises at least a first and a second wireless base stations (BS), such that the first wireless base station supports wireless cellular communication via the first radio band and the second wireless base station supports wireless cellular communication via the second radio band.

9. The method of claim 8, further comprising: causing the subscriber station, by the wireless cellular system, to perform partial roaming between the first wireless base station and the second wireless base station, prior to delivering at least the predetermined level of wireless cellular service to the subscriber station via the second radio band.

10. The method of claim 5, wherein:
the wireless cellular system comprises at least a wireless base stations station operative to support both the first and the second radio bands substantially simultaneously.

11. The method of claim 10, further comprising: causing the subscriber station, by the wireless base station, to perform partial roaming between the first radio band and the second radio band of said wireless base station, prior to delivering at least the predetermined level of wireless cellular service to the subscriber station via the second radio band.

12. The method of claim 5, wherein the first radio band is located higher in frequency than the second radio band, resulting in the second radio band having a better reach than the first radio band, thereby allowing use of the second radio band in delivering at least the predetermined level of wireless cellular service to the subscriber station located substantially out of the coverage area of the first radio band.

13. The method of claim 12, wherein:
the wireless cellular system comprises at least a wireless base station operative to support both the first and the second radio bands simultaneously.

14. The method of claim 5, wherein the first radio band is located lower in frequency than the second radio band, resulting in the second radio band having a better capacity than the first radio band, thereby allowing use of the second radio band in delivering at least the predetermined level of wireless cellular service to the subscriber station.

15. The method of claim 14, wherein:
the wireless cellular system comprises at least a wireless base station operative to support both the first and the second radio bands simultaneously.

16. The method of claim 14, wherein the first radio band is located substantially in the 700 MHz to 1 GHz range, and the second radio band is located substantially in the 2.3 GHz to 2.6 GHz range.

17. A method for enhancing wireless cellular service provided by at least two operators, comprising:
generating simultaneously a first radio access network and a second radio access network by a wireless cellular system, using a first and a second radio bands respectively, wherein said radio bands belonging to a first and a second operators respectively, and the first radio band is located in higher band than the second radio band located substantially in the 700 MHz to 1 GHz range, resulting in the second radio band having a better coverage than the first radio band, thereby allowing use of the second radio band in delivering at least a predetermined level of wireless cellular service to subscriber stations located substantially out of coverage area of the first radio band; and
enhancing, by the wireless cellular system, a level of wireless cellular service provided by the first operator, by causing subscriber stations associated with the first operator and which are poorly covered by the first radio access network, to perform partial roaming from the first radio access network to the second radio access network.

18. The method of claim 17, further comprising: enhancing, by the wireless cellular system, a level of wireless cellular service provided by the second operator, by causing subscriber stations associated with the second operator and which require a wireless bandwidth not available via the second radio access network, to perform partial roaming from the second radio access network to the first radio access network.

19. The method of claim 18, wherein the first radio band is located substantially in the 2.3 GHz to 2.6 GHz range, and the second radio band is located substantially in the 700 MHz to 1 GHz range, thereby allowing the first radio access network to deliver higher wireless bandwidth than the second radio access network.

20. The method of claim 17, wherein the second radio band is located substantially in the 700 MHz to 1 GHz range, and the first radio band is located substantially in the 2.3 GHz to 2.6 GHz range.

21. The method of claim 17, wherein the wireless cellular system comprises at least a wireless base station operative to support both the first and the second radio access networks substantially simultaneously, and the partial roaming is performed by the wireless base station.

22. A method for optimizing placement of wireless base stations servicing at least two operators, comprising:
operating N wireless base stations deployed across a predetermined area, the wireless base stations operative to provide wireless cellular coverage in the predetermined area using a first radio band belonging to a first operator;
providing wireless cellular coverage in the predetermined area using a second radio band located substantially in the 700 MHz to 1 GHz range belonging to a second operator, by configuring K wireless Base Stations, out of the N wireless base stations, to cover wirelessly the predetermined area using a second radio band belonging to a second operator, wherein K<N, and the first radio band is located in higher band than the second radio band, resulting in the second radio band having a better coverage than the first radio band, thereby allowing use of the second radio band in delivering at least a predetermined level of wireless cellular service to subscriber stations located substantially out of coverage area of the first radio band; and
enhancing a level of wireless cellular service provided by the first operator, by causing subscriber stations associated with the first operator to roam into the second radio band when out of range of the first radio band.

23. The method of claim 22, further comprising: enhancing a level of wireless cellular service provided by the second operator, by causing subscriber stations associated with the second operator and which require a wireless bandwidth not available via the second radio band, to roam into the first radio band.

24. The method of claim 23, wherein the roaming into the first radio band is done using partial roaming techniques.

25. The method of claim 22, wherein the roaming is done using partial roaming techniques.

* * * * *